(12) United States Patent
Meyer et al.

(10) Patent No.: US 8,204,856 B2
(45) Date of Patent: Jun. 19, 2012

(54) DATABASE REPLICATION

(75) Inventors: Scott Meyer, Pacifica, CA (US); Jutta Degener, Berkeley, CA (US); Barak Michener, Berkeley, CA (US); John Giannandrea, Saratoga, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 12/690,696

(22) Filed: Jan. 20, 2010

(65) Prior Publication Data

US 2010/0121817 A1    May 13, 2010

Related U.S. Application Data

(60) Provisional application No. 61/146,240, filed on Jan. 21, 2009.

(51) Int. Cl.
*G06F 17/30* (2006.01)
*G06F 7/00* (2006.01)

(52) U.S. Cl. ................ 707/623; 707/624; 707/802

(58) Field of Classification Search .................. None
See application file for complete search history.

(56) References Cited

U.S. PATENT DOCUMENTS

| | | | |
|---|---|---|---|
| 4,961,139 A | 10/1990 | Hong et al. | |
| 5,418,942 A | 5/1995 | Krawchuk et al. | |
| 5,564,119 A | 10/1996 | Krawchuk et al. | |
| 5,872,973 A | 2/1999 | Mitchell et al. | |
| 5,913,214 A | 6/1999 | Madnick et al. | |
| 6,098,078 A * | 8/2000 | Gehani et al. | 707/610 |
| 6,175,835 B1 | 1/2001 | Shadmon | |
| 6,208,993 B1 | 3/2001 | Shadmon | |
| 6,282,537 B1 | 8/2001 | Madnick et al. | |
| 6,356,916 B1 * | 3/2002 | Yamatari et al. | 709/230 |
| 6,408,282 B1 * | 6/2002 | Buist | 705/37 |
| 6,477,580 B1 | 11/2002 | Bowman-Amuah | |
| 6,529,948 B1 | 3/2003 | Bowman-Amuah | |
| 6,578,041 B1 * | 6/2003 | Lomet | 709/219 |
| 6,626,954 B1 | 9/2003 | Kamachi et al. | |
| 6,640,242 B1 * | 10/2003 | O'Neal et al. | 709/206 |
| 6,799,184 B2 | 9/2004 | Bhatt et al. | |
| 6,915,451 B2 | 7/2005 | Fitzgerald et al. | |
| 7,225,249 B1 | 5/2007 | Barry et al. | |
| 7,240,330 B2 | 7/2007 | Fairweather | |
| 7,305,404 B2 | 12/2007 | Owens et al. | |
| 7,630,986 B1 | 12/2009 | Herz et al. | |

(Continued)

FOREIGN PATENT DOCUMENTS

EP    0350208    1/1990

(Continued)

OTHER PUBLICATIONS

AxelBoldt; *Wikipedia (Everything2)*; Jan. 27, 2002; retrieved online from: "http://meta.wikimedia.org/wiki/Wikipedia_%28Everything2%29".

(Continued)

*Primary Examiner* — Sathyanarayan Pannala
(74) *Attorney, Agent, or Firm* — Fish & Richardson P.C.

(57) ABSTRACT

A new database design is implemented in which everything in the database is modeled with primitives, including the links and nodes for a graph tuple store. A query syntax provides a nested tree of constraints with a single global schema. Various optimization techniques for queries and replication techniques are also described.

14 Claims, 36 Drawing Sheets

U.S. PATENT DOCUMENTS

| | | | |
|---|---|---|---|
| 7,729,904 | B2 | 6/2010 | Bennett |
| 8,032,503 | B2 | 10/2011 | Bouloy et al. |
| 2002/0049810 | A1 | 4/2002 | Fitzgerald et al. |
| 2002/0091702 | A1 | 7/2002 | Mullins |
| 2003/0126136 | A1 | 7/2003 | Omoigui |
| 2003/0163597 | A1 | 8/2003 | Hellman et al. |
| 2003/0179228 | A1 | 9/2003 | Schreiber et al. |
| 2003/0236795 | A1 | 12/2003 | Kemp et al. |
| 2004/0225865 | A1 | 11/2004 | Cox et al. |
| 2004/0230572 | A1 | 11/2004 | Omoigui |
| 2004/0236598 | A1* | 11/2004 | Thomsen ............ 705/1 |
| 2005/0027725 | A1 | 2/2005 | Kagalwala et al. |
| 2005/0050030 | A1 | 3/2005 | Gudbjartsson et al. |
| 2005/0086256 | A1 | 4/2005 | Owens et al. |
| 2005/0210000 | A1 | 9/2005 | Michard |
| 2005/0216421 | A1 | 9/2005 | Barry et al. |
| 2005/0251805 | A1 | 11/2005 | Bamba et al. |
| 2005/0289134 | A1 | 12/2005 | Noguchi |
| 2006/0004703 | A1 | 1/2006 | Spivack et al. |
| 2006/0047615 | A1 | 3/2006 | Ravin et al. |
| 2006/0075120 | A1 | 4/2006 | Smit |
| 2006/0100989 | A1 | 5/2006 | Chinchwadkar et al. |
| 2006/0100995 | A1 | 5/2006 | Albornoz et al. |
| 2006/0173873 | A1 | 8/2006 | Prompt et al. |
| 2006/0212432 | A1 | 9/2006 | Tsai |
| 2006/0218123 | A1 | 9/2006 | Chowdhuri |
| 2007/0061487 | A1 | 3/2007 | Moore et al. |
| 2007/0087756 | A1 | 4/2007 | Hoffberg |
| 2007/0168340 | A1 | 7/2007 | Mahoney et al. |
| 2007/0233627 | A1 | 10/2007 | Dolby et al. |
| 2007/0239694 | A1 | 10/2007 | Singh et al. |
| 2007/0255674 | A1 | 11/2007 | Mahoney |
| 2007/0266384 | A1 | 11/2007 | Labrou et al. |
| 2007/0299836 | A1 | 12/2007 | Hou et al. |
| 2008/0027980 | A1 | 1/2008 | Owens et al. |
| 2008/0033993 | A1 | 2/2008 | Uceda-Sosa |
| 2008/0046474 | A1 | 2/2008 | Sismanis |
| 2008/0109493 | A1* | 5/2008 | Zaifman et al. ............ 707/999.2 |
| 2009/0024590 | A1 | 1/2009 | Sturge et al. |
| 2010/0070448 | A1 | 3/2010 | Omoigui |
| 2010/0121839 | A1 | 5/2010 | Meyer et al. |
| 2010/0174692 | A1 | 7/2010 | Meyer et al. |
| 2011/0093500 | A1 | 4/2011 | Meyer et al. |

FOREIGN PATENT DOCUMENTS

| | | | |
|---|---|---|---|
| EP | 1126681 | A2 | 8/2001 |
| EP | 1229442 | A2 | 8/2002 |
| EP | 1229442 | A3 | 8/2002 |
| EP | 1260916 | A2 | 11/2002 |
| EP | 1260916 | A3 | 11/2002 |
| EP | 1274018 | A2 | 1/2003 |
| EP | 1274018 | A3 | 1/2003 |
| EP | 1640838 | A1 | 3/2006 |
| EP | 1645974 | A1 | 4/2006 |
| EP | 1653308 | A1 | 5/2006 |
| EP | 1653376 | A2 | 5/2006 |
| WO | WO9745800 | | 12/1997 |
| WO | WO9849629 | | 11/1998 |
| WO | WO 99/38094 | | 7/1999 |
| WO | WO 01/08045 | | 2/2001 |
| WO | WO0186421 | A2 | 11/2001 |
| WO | WO0186422 | A2 | 11/2001 |
| WO | WO0186422 | A3 | 11/2001 |
| WO | WO0186424 | A2 | 11/2001 |
| WO | WO0186424 | A3 | 11/2001 |
| WO | WO0186427 | A2 | 11/2001 |
| WO | WO0186427 | A3 | 11/2001 |
| WO | WO0186439 | A2 | 11/2001 |
| WO | WO0186439 | A3 | 11/2001 |
| WO | WO03001413 | | 1/2003 |
| WO | WO2004075466 | | 9/2004 |
| WO | WO2004114153 | A1 | 12/2004 |
| WO | WO20050170775 | A1 | 2/2005 |
| WO | WO 2005/050481 | | 6/2005 |
| WO | WO2005065166 | A2 | 7/2005 |
| WO | WO2005065166 | A3 | 7/2005 |
| WO | WO2005079405 | A2 | 9/2005 |
| WO | WO2005079405 | A3 | 9/2005 |
| WO | WO2005081963 | A2 | 9/2005 |
| WO | WO2005098620 | A2 | 10/2005 |
| WO | WO2006036127 | A1 | 4/2006 |
| WO | WO 2006/076199 | | 7/2006 |
| WO | WO 2006/116649 | | 11/2006 |
| WO | WO 2007/100834 | | 9/2007 |
| WO | WO 2010/085523 | | 7/2010 |

OTHER PUBLICATIONS

Buneman, et al. "Interaction between path and type constraints"; 1998; Dept. of Computer & Information Science, Technical Report No. MS-CIS-98-16; Univ. of Pennsylvania.

Buneman, et al.; "A deterministic model for semi-structured data"; 1998, Univ. of Pennsylvania.

Buneman, et al.; "A query language and optimization techniques for unstructured data"; Jun. 1996; ACM SIGMOD Record, pp. 505-516, vol. 25, Issue 2.

Buneman, et al.; "Adding structure to unstructured data"; Jan. 1997; Database Theory—ICDT '97, pp. 336-350, Springer Berlin/Heidelberg.

Buneman, et al.; "Path constraints in semistructured databases"; Oct. 2000; Journal of Computer and System Sciences, vol. 61, Issue 2, pp. 146-193.

Buneman, et al.; "Semistructured data"; May 1997; Proc. of the Sixteenth ACM SIGACT-SIGMOD-SIGART Symposium on Principles of Database; pp. 117-121; Tucson, Arizona.

Buneman, et al.; "Query optimization for semistructured data using path constraints in a deterministic data model"; Jan. 2000; Research Issues in Structured and Semistructured Database Programming, pp. 208-223, vol. 1949/2000.

Chang, et al.; "Bigtable: a distributed storage system for structured data"; Nov. 2006; Presented at the Proc. of the 7th USENIX Symposium on Operating Systems, OSDI, pp. 205-218.

Chiueh, et al.; "Efficient real-time index updates in text retrieval systems"; Apr. 1999; Computer Science Dept. State Univ. of New York at Stony Brook.

Corby, et al.; "A conceptual graph model for W3C resource description framework"; Aug. 2000; Int'l Conf. on Conceptual Structures; Darmstadt, Germany.

Crysmann, et al.; "An integrated architecture for shallow and deep processing"; Jul. 2002; Proc. of the 40th Annual Meeting of the Association for Computational Linguistics (ACL), pp. 441-448, Philadelphia.

*Cyc Enhancement of Information Extraction*; copyright 2004 Cycorp, Inc., retrieved on Apr. 6, 2008 from: http://cyc.com/technology/whitepapers_dir/IE-Improvement-Whitepaper.pdf.

Cycorp; *Semantic Knowledge Source Integration*; SKSI; retrieved online Apr. 6, 2008, copyright 2002-2010, Cycorp. Inc.; retrieved online from: http://www.cyc.com/cyc/cycrandd/areasofrandd_dir/sksi.

Ellmer, E.; "Object-oriented query languages: analysis and evaluation"; retrieved on Apr. 6, 2008 from website: citeseer.ist.psu.edu/69436.html.

Fan, et al.: "Specifying and reasoning about workflows with path constraints"; Dec. 1999; ICSC '99; China; Lecture Notes in Computer Science: Internet Applications, vol. 1749, Springer Berlin/Heidelberg.

Fernandez, et al.; "Optimizing regular path expressions using graph schemas"; Feb. 1998; Proc. Int'l Conf. on Data Engineering, Orlando, Florida.

Giugno, et al.; "GraphGrep: a fast and universal method for querying graphs"; Aug. 2002; 16th Int'l Conf. on Pattern Recognition (ICPR '02), p. 20112, vol. 2.

Gyssens, et al; "A graph-oriented object database model"; Apr. 1990, Proc. of the 9th ACM SIGACT-SIGMOD-SIGART symposium on Principles of Database Systems; pp. 417-424, Nashville, Tennessee.

Jeays, Mark; *Wikipedia: An Online Collaborative Encyclopedia*; 2002; "http://meta.wikimedia.org/wiki/Wikipedi_-_by_Mark_Jeays%2C_2002".

Joslyn, C.; "Semantic webs: a cyberspatial representational form for cybernetics"; Apr. 1996; Cybernetics and Systems '96, pp. 905-910.

Kumar, et al.; "A database for storage and fast retrieval of structure data: a demonstration"; Mar. 2003; 19th Int'l Conf. on Data Engineering, p. 789, Bangalore, India.

Kuramochi, et al.; "An efficient algorithm for discovering frequent subgraphs"; Jun. 2002; Dept. of Computer Science/Army HPC Research Center, Univ. of Minnesota, Technical Report 02-026.

Lamparter,et al.; *Knowledge extraction from classification schemas*; Oct. 25-29, 2004; International Conferences on Ontologies, Databases and Applications of Semantics (ODBASE) 2004, Proceedings Part 1 (lecture notes in Computer Science vo. 3290) pp. 618-636; retrieved online at: http://www.aifb.uni-karlsruhe.de/WBS/sla/paper/ODBASE04_Lamparter.pdf.

Lee, et al.; *The Semantic Web*; May 17, 2001; Scientific American. com; retrieved online at "http://www.sciam/com/print_version.cfm?articleID=00048144-10D2-1C70-84A9809EC588EF21".

Molnar, et al.; "On verticum-type linear systems with time-dependent linkage"; Jan. 1994; Applied Mathematics and Computation; pp. 89-102, vol. 60, No. 1; Elsevier Science, Inc., New York; retrieved on Apr. 6, 2008 from website: http://www.mathnet.or.kr/mathnet/thesis_content.php?no_314899.

O'Neil, P.; "The SB-tree: an index-sequential structure for high-performance sequential access"; Jun. 1992; Acta Informatica, pp. 241-265, vol. 29; Dept. of Mathematics and Computer Science, Univ. of Massachusetts, Boston.

Ozsoyoglu, et al.; "A new normal form for nested relations"; Mar. 1987; ACM Transactions on Database Systems, pp. 111-136, vol. 12, issue 1; New York.

Pradeep, et al.; "Towards autonomic websites based on learning automata"; May 2005; Int'l World Wide Web Conf., pp. 1044-1045, Chiba, Japan.

Schafer, U.; "What: an XSLT-based infrastructure for the integration of natural language processing components"; Apr. 2003; Language Technology Lab, German Research Center for Artificial Intelligence (DFKI), Saarbrucken, Germany.

Seeger, B; "Tuning access methods to supporting data-intensive queries"; Nov. 1994, Ludwig-Maximilians-Universitat Munchen Institut fur Informatik, retrieved from: citeseer.ist.psu.edu/seeger94tuning.html.

Siegel, et al.; *The Cyc System; Notes on Architecture*; Nov. 2004; Cycorp Inc., Austin, TX; retrieved online at: http://www.cyc.com/technology/whitepapers_dir/Cyc_Architecture_and_API.pdf.

"Service-Oriented Architecture Technology Center"; Jan. 25, 2008; retrieved on Apr. 6, 2008 from website: http:www.oracle.com/technology/tech/soa/index.html.

Srinivasa, et al.; "A flexible retrieval mechanism for structural data using multiple vector spaces"; May 7, 2002; Indian Institute of Information Technology, International Technology Park, Bangalore, India, retrieved from: citeseer.ist.psu.edu/srinivasa02flexible.html.

Srinivasa, et al.; "LWI and Safari: a new index structure and query model for graph databases"; Jan. 2005; In Proc. 11th Int'l Conf. on Management of Data (COMAD 2005), pp. 138-147, India.

Srinivasa, et al.; "Vectorization of structure to index graph databases"; Sep. 2002; Proc. of the IASTED Int'l Conf. on Information Systems and Databases; Tokyo, Japan.

Suciu, D.; "Distributed query evaluation on semistructured data"; 1997; AT&T Laboratories.

TopicMaps.Org Authoring Group; *XML Topic Maps (XTM)* 1.0; Aug. 2006; retrieved on Jun. 9, 2006 "http://topicmaps.org/xtm/#desc-intro".

Vincent, M.; "Semantic foundations of 4NF in relational database design"; Mar. 1999; Acta Informatica; Adelaide, Australia, citeseer.ist.psu.edu/766104.html.

"W3C Semantic Web Activity"; copyright 1994-2010, W3C, retrieved online Apr. 6, 2008 from website: http://www.w3.org/2001/sw/.

Wikipedia; *Object Database*; retrieved online Apr. 6, 2008 from website: "http://en.wikipedia.org/wiki/Object_database".

Wikipedia; *Resource Description Framework*; retrieved online Apr. 6, 2008 from website: "http://en.wikipedia.org/wiki/Resource_Description_Framework".

Wikipedia; *Topic Maps*; retrieved online Apr. 6, 2008 from website: "http://en.wikipedia.org/wiki/Topic_map".

Wong, L.; "Querying nested collections"; 1994; Presented to the Faculties of the Univ. of Pennsylvania in Partial Fulfillment of the Requirements for the Degree of Doctor of Philosophy.

Yan, X.; "Graph Indexing: a frequent structure-based approach"; Jun. 13-18, 2004; Proc. of the ACM SIGMOD Int'l conf. on Management of Data; pp. 335-346, Paris, France.

Zhuge, H.; "Resource space grid: model, method and platform"; Sep. 2004; Concurrency and Computation Practice & Experience; pp. 1385-1413, vol. 16, issue 14, UK.

Auer, S., et al., "What have Innsbruck and Leipzig in common—Extracting Semantic from Wiki Content", Jan. 23, 2007, 15 pages.

Broekstra, blog comment "Current applications seem ver", Feb. 25, 2005 (p. 3 of Ayers, SPARQL Query Language for RDF). lambda-the-ult imate.org [online] [Retrieved on Jul. 27, 2010]. Retrieved from the Internet: <URL: http://lambda-the-ultimate.org/node/549>, 7 pages.

Clark, K., et al., "Serializing SPARQL Query Results in JSON", Feb. 16, 2006, mindswap.org [online] [Retrieved on Jul. 27, 2010]. Retrieved from the Internet: <URL: http://www.mindswap/org/~kendall/sparql-results-json/>, 8 pgs.

"Cyc Enhancement of Information Extraction", Cycorp, Inc., 2004, Whitepaper, 4 pages.

"Semantic Knowledge Source Integration", Cycorp, Inc., 2004, 1 page.

International Preliminary Report on Patentability from International Application No. PCT/US2009/036991, mailed Sep. 14, 2010, 7 pages.

International Search Report from International Application No. PCT/US2009/036991, mailed Dec. 23, 2009, 2 pages.

Written Opinion of the International Searching Authority from International Application No. PCT/US2009/036991, mailed Dec. 23, 2009, 6 pages.

International Search Report and Written Opinion from PCT Application No. PCT/US/10/21579, mailed May 26, 2010, 16 pages.

International Preliminary Report on Patentability from International Application No. PCT/US/10/21579, mailed Aug. 4, 2011, 11 pages.

Janik et al., Wikipedia in action—Ontological Knowledge in Text Categorization, Aug. 2007.

Lamparter, et al., "Knowledge extraction from classification schemas", Oct. 25-29, 2004; On the Move to Meaningful Internet Systems 2004, OTM Confederated International Coinferences CoopIS, SPA and ODBASE 2004, Proceedings Part 1 (lecture notes in Computer Science vo. 3290), pp. 618-636.

Linksvayer, M., "Querying Wikipedia like a Database", Jan. 23, 2007, gondwanaland.com [online] [Retrieved on Jul. 22, 2010]. Retrieved from the Internet: <URL: http://gondwanaland.com/mlog/2007/01/23/dbpedia/>, 4 pages.

Prud'hommeaux, E., "Persistent RDF Databases", 1999, w3.org [online]. [Retrieved on Jul. 27, 2010]. Retrieved from the Internet: <URL: http://www.w3.org/1999/07/13-persistant-RDF-DB>, 5 pages.

Rice, S., et al., "Defining and Implementing Domains with Multiple Types using Mesodata Modelling Techniques", Australian Computer Society, Inc., Third Asia-Pacific Conference on Conceptual Modelling (APCCM2006), Hobart, Tasmania, Australia, *Conferences in Research and Practice in Information Technology*, vol. 53, 2006, 9 pages.

Völkel, M., et al., "Semantic Wikipedia", International World Wide Web Conference Committee (IW3C2), WWW 2006, May 23-26, 2006, Edinburgh, Scotland, 10 pages.

"W3C Semantic Web", w3.org [online] [Retrieved on Jun. 9, 2006]. Retrieved from the Internet: <URL: http://www.w3.org/2001/sw/>, 7 pages.

"Semantic MediaWiki", meta.wikimedia.org [online] Feb. 27, 2006. [Retrieved on Jul. 23, 2010]. Retrieved from the Internet: <URL: http://meta.wikimedia.org/wiki/Semanlic_MediaWiki>, 4 pages.

"Wikipedia:Administrators", en.wikipedia.org [online]. Mar. 12, 2006. [Retrieved on Jul. 27, 2010]. Retrieved from the Internet: <URL: http://en.wikipedia.org/wiki/Wikipedia:Administrators>, 7 pages.

"Wikipedia:Categorization", en.wikipedia.org [online] Mar. 12, 2007. [Retrieved on Jul. 22, 2010]. Retrieved from the Internet: <URL: http://en.wikipedia.org/wiki/Wikipedia:Categorization>, 22 pages.

"Wikipedia:Categorization of people", en.wikipedia.org [online]. Mar. 2, 2007. [Retrieved on Jul. 22, 2010]. Retrieved from the Internet: <URL: http://en.wikipedia.org/wiki/Wikipedia:Categorization_of_people>, 14 pages.

Abadi, D., et al., "SW-Store: a vertically partitioned DBMS for Semantic Web data management", The VLDB Journal, 2008, vol. 18, pp. 385-406.

Australian Office Action dated Oct. 6, 2011 from Australian Patent Office for AU Application No. 2009223127, 2 pages.

Degener, J., et al., "Optimizing Schema-Last Tuple-Store Queries in Graphd", *SIGMOD* '10, Jun. 6-11, 2010, Indianapolis, Indiana, 2010, pp. 1047-1055.

"Freebase", Wikipedia [online]. [retrieved on Dec. 9, 2011]. Retrieved from the Internet: <URL: http://en/wikipedia.org/wiki/Freebase>, 1 page.

Meyer, S., "A Brief Tour of Graphd", The Freebase Blog [online]. Apr. 9, 2008 [retrieved on Dec. 9, 2011]. Retrieved from the Internet: <URL: http://blog.freebase. coml2008/04/09 1 a-brief-tour -of-graphd1_>, 7 pages.

Wang, C., et al., "Scalable mining of Large Disk-based Graph Databases", *KDD*'04, Aug. 22-25, 2004, Seattle, Washington, 2004, 10 pages.

Weiss, C., et al., "Hexastore: Sextuple Indexing for Semantic Web Data Management", *VLDB* '08, Aug. 24-30, 2008. Aukland, New Zealand, 2008, pp. 1-12.

\* cited by examiner

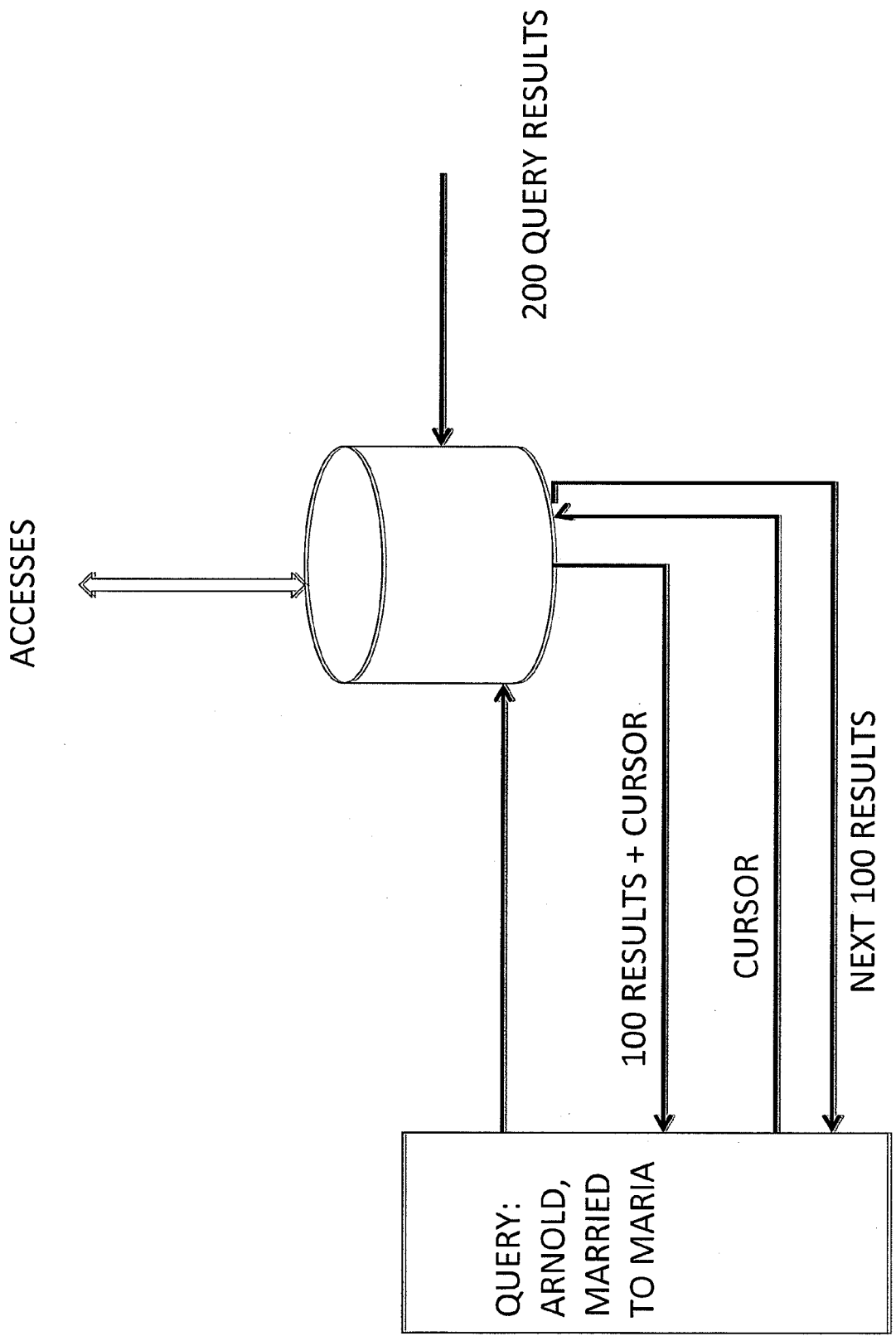

2400

Attach a callback to individual output buffers comprising said log file of primitives, said callback comprising a function pointer to a function within a graph, wherein said callback comprises an up-to-date index for said database, said database comprising a similar index that is incremented as said primitives are written to said database, wherein said callback is satisfied when said database index is up-to-date, as indicated by a match to said up-to-date index, wherein said callback guarantees that what was written to the database is, in fact, written

FIGURE 24

DATABASE REPLICATION

CROSS REFERENCE TO RELATED APPLICATIONS

This application claims priority to U.S. provisional patent application Ser. No. 61/146,240, filed 21 Jan. 2009, which is incorporated herein in its entirety by this reference thereto.

BACKGROUND OF THE INVENTION

1. Technical Field

The invention relates to the organization and use of information. More particularly, the invention relates to a graph store.

2. Description of the Background Art

There is widespread agreement that the amount of knowledge in the world is growing so fast that even experts have trouble keeping up. Today not even the most highly trained professionals—in areas as diverse as science, medicine, law, and engineering—can hope to have more than a general overview of what is known. They spend a large percentage of their time keeping up on the latest information, and often specialize in highly narrow sub-fields because they find it impossible to keep track of broader developments.

Education traditionally meant the acquisition of the knowledge people needed for their working lives. Today, however, a college education can only provide an overview of knowledge in a specialized area, and a set of skills for learning new things as the need arises. Professionals need new tools that allow them to access new knowledge as they need it.

The World Wide Web

In spite of this explosion of knowledge, mechanisms for distributing it have remained pretty much the same for centuries: personal communication, schools, journals, and books. The World Wide Web is the one major new element in the landscape. It has fundamentally changed how knowledge is shared, and has given us a hint of what is possible. Its most important attribute is that it is accessible—it has made it possible for people to not only learn from materials that have now been made available to them, but also to easily contribute to the knowledge of the world in their turn. As a result, the Web's chief feature now is people exuberantly sharing their knowledge.

The Web also affords a new form of communication. Those who grew up with hypertext, or have otherwise become accustomed to it, find the linear arrangement of textbooks and articles confining and inconvenient. In this respect, the Web is clearly better than conventional text.

The Web, however, is lacking in many respects.

It has no mechanism for the vetting of knowledge. There is a lot of information on the Web, but very little guidance as to what is useful or even correct.

There are no good mechanisms for organizing the knowledge in a manner that helps users find the right information for them at any time. Access to the (often inconsistent or incorrect) knowledge on the Web thus is often through search engines, which are all fundamentally based on key word or vocabulary techniques. The documents found by a search engine are likely to be irrelevant, redundant, and often just plain wrong.

A Comparison of Knowledge Sources

There are several aspects to how learners obtain knowledge—they might look at how authoritative the source is, for example, or how recent the information is, or they might want the ability to ask the author a question or to post a comment. Those with knowledge to share might prefer a simple way to publish that knowledge, or they might seek out a well-known publisher to maintain their authority.

While books and journals offer the authority that comes with editors and reviewers, as well as the permanence of a durable product, the Web and newsgroups provide immediacy and currency, as well as the ability to publish without the bother of an editorial process. Table "A" is a summary of the affordances of various forms of publishing.

TABLE A

Affordances of Various Forms of Publishing

|  | THE WEB | NEWS GROUPS | TEXT BOOKS | JOURNALS |
|---|---|---|---|---|
| Peer-to-Peer publishing | Yes | Yes | No | Limited |
| Supports linking | Yes | Limited | No | Limited |
| Ability to add annotations | No | Yes | No | No |
| Vetting and certification | No | Limited | Yes | Yes |
| Supports payment model | Limited | No | Yes | Yes |
| Supports guided learning | Limited | No | Yes | No |

The invention addresses the problem of providing a system that has a very large, e.g. multi-gigabyte, database of knowledge to a very large number of diverse users, which include both human beings and automated processes. There are many aspects of this problem that are significant challenges. Managing a very large database is one of them. Connecting related data objects is another. Providing a mechanism for creating and retrieving metadata about a data object is a third.

In the past, various approaches have been used to solve different parts of this problem. The World Wide Web, for example, is an attempt to provide a very large database to a very large number of users. However, it fails to provide reliability or data security, and provides only a limited amount of metadata, and only in some cases. Large relational database systems tackle the problem of reliability and security very well, but are lacking in the ability to support diverse data and diverse users, as well as in metadata support.

The ideal system should permit the diverse databases that exist today to continue to function, while supporting the development of new data. It should permit a large, diverse set of users to access this data, and to annotate it and otherwise add to it through various types of metadata. Users should be able to obtain a view of the data that is complete, comprehensive, valid, and enhanced based on the metadata.

The system should support data integrity, redundancy, availability, scalability, ease of use, personalization, feedback, controlled access, and multiple data formats. The system must accommodate diverse data and diverse metadata, in addition to diverse user types. The access control system must be sufficiently flexible to give different users access to different portions of the database, with distributed management of the access control. Flexible administration must allow portions of the database to be maintained independently, and must allow for new features to added to the system as it grows.

U.S. patent application Ser. No. 12/049,145, filed 14 Mar. 2008, which is incorporated herein in its entirety by this reference thereto, provides a system to organize knowledge in such a way that users can find it, learn from it, and add to it as needed. In connection with such system, and especially with schema last approaches to information storage and retrieval, two observations are noted:

1. A collaborative database must, of necessity, support the creation or modification of schema long after data have been entered. While the relational model is quite general, current implementations map tables more-or-less directly into btree-based storage. This structure yields optimal performance but renders applications quite brittle. This invention supports a 'Schema Last' approach.

2. A conventional table-of-tuples implementation is problematic, even on a modern column store. The starting point, a table of tuples and indexes with compound keys which are permutations of subject-predicate-object, is well studied and subject to obvious limitations of index size and self-join performance. Attempting to optimize an existing relational store for this tuple access pattern, while possible, is burdened both by compatibility with a relational model that is far more general than needed, and by an SQL interface in which it is difficult to say what is really meant.

It would be advantageous to provide optimization techniques for such systems.

SUMMARY OF THE INVENTION

A new database design is implemented in which everything in the database is modeled with primitives, including the links and nodes for a graph store. A query syntax provides a nested tree of constraints with a single global schema. An aspect of the invention concerns the process of flushing the log preemptively as well as replicating the database. Various optimization techniques for queries are also described.

BRIEF DESCRIPTION OF THE DRAWINGS

FIGS. 19A and 19B are block schematic diagrams showing cursors according to the invention;

FIG. 24 is a further block schematic diagram showing a scheduler according to the invention;

DETAILED DESCRIPTION OF THE INVENTION

A primitive model is provided in which everything in a database is modeled with the primitives, including links and nodes. A query syntax provides a nested tree of constraints with a single global schema. An aspect of the invention concerns the process of flushing the log preemptively. Various optimization techniques are also provided.

An embodiment of the invention is implemented in an application found at freebase.com, which is a data search and query facility that is powered by the proprietary tuple store, i.e. the graph store described herein, and which is referred to as graphd. The present embodiment of graphd is a C/Unix server that processes commands in a simple template-based query language.

Discussion

Figure 2:
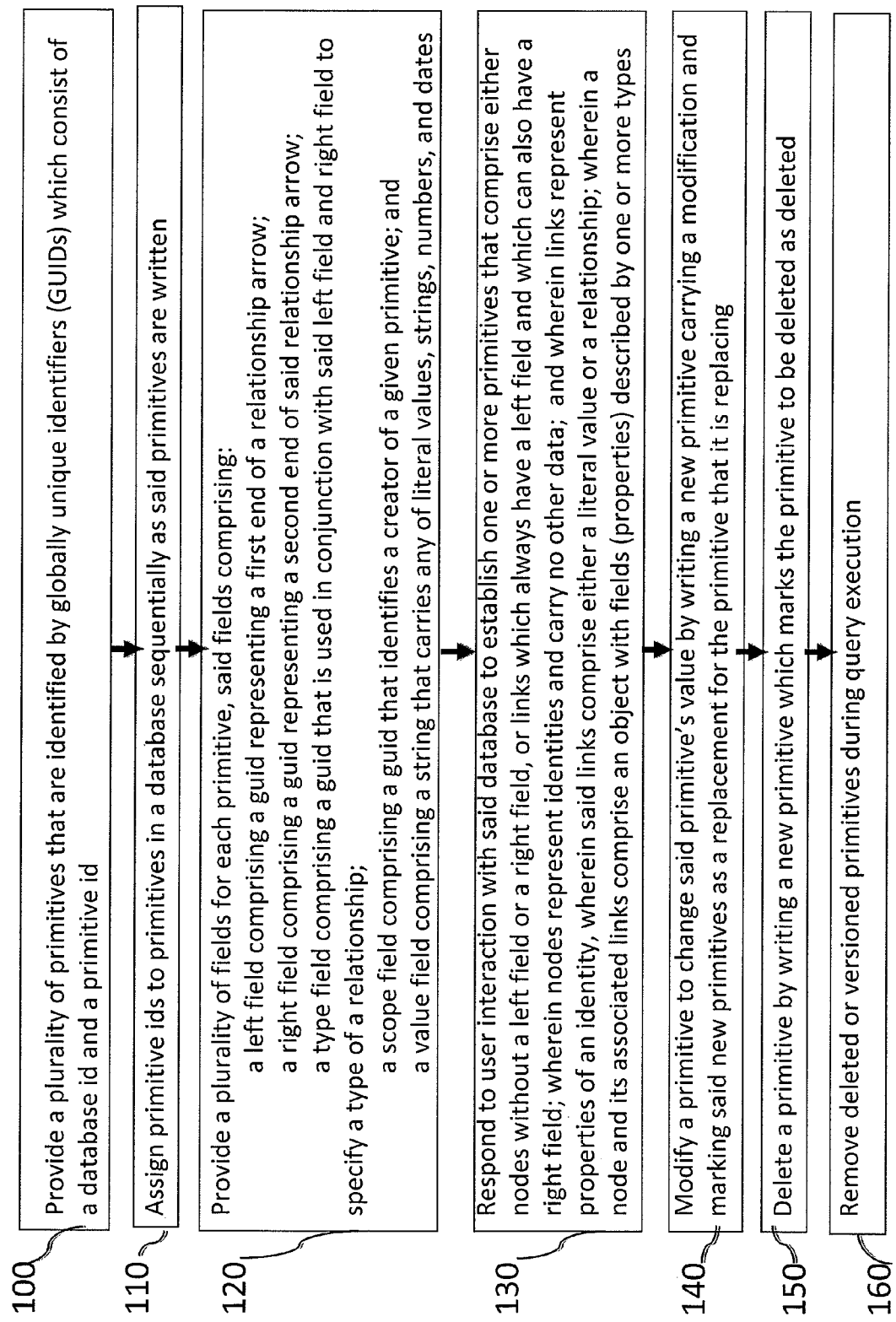
FIG. 2 is a block schematic diagram showing a graph from primitive model according to the invention.

An embodiment of the invention (see FIG. 2) provides a computer implemented method and apparatus for establishing a primitive-based graph database. A processor is configured to providing a plurality of primitives that are identified by globally unique identifiers (GUIDs) which consist of a database id and a primitive id (100). Once written, primitives are read only. The primitives collectively establish a log-structured or append-only database. The processor assigns primitive ids to primitives in the database sequentially as the primitives are written (110) and provides a plurality of fields for each primitive (120). Any or all of the fields may be null. The fields comprise a left field comprising a guid representing a first end of a relationship arrow; a right field comprising a guid representing a second end of said relationship arrow; a type field comprising a guid that is used in conjunction with said left field and right field to specify a type of a relationship; a scope field comprising a guid that identifies a creator of a given primitive; and a value field comprising a string that carries any of literal values, strings, numbers, and dates.

The processor responds (130) to user interaction with the database to establish one or more primitives that comprise either nodes without a left field or a right field, or links which always have a left field and which can also have a right field. Nodes represent identities and carry no other data; links represent properties of an identity, where the links comprise either a literal value or a relationship. A node and its associated links comprise an object with fields (properties) described by one or more types.

The processor modifies a primitive (140) to change the primitive's value by writing a new primitive carrying a modification and marking said new primitives as a replacement for the primitive that it is replacing. The processor deletes a primitive (150) by writing a new primitive which marks the primitive to be deleted as deleted. The processor removes deleted or versioned primitives (160) during query execution.

Tuples

Figure 1A:
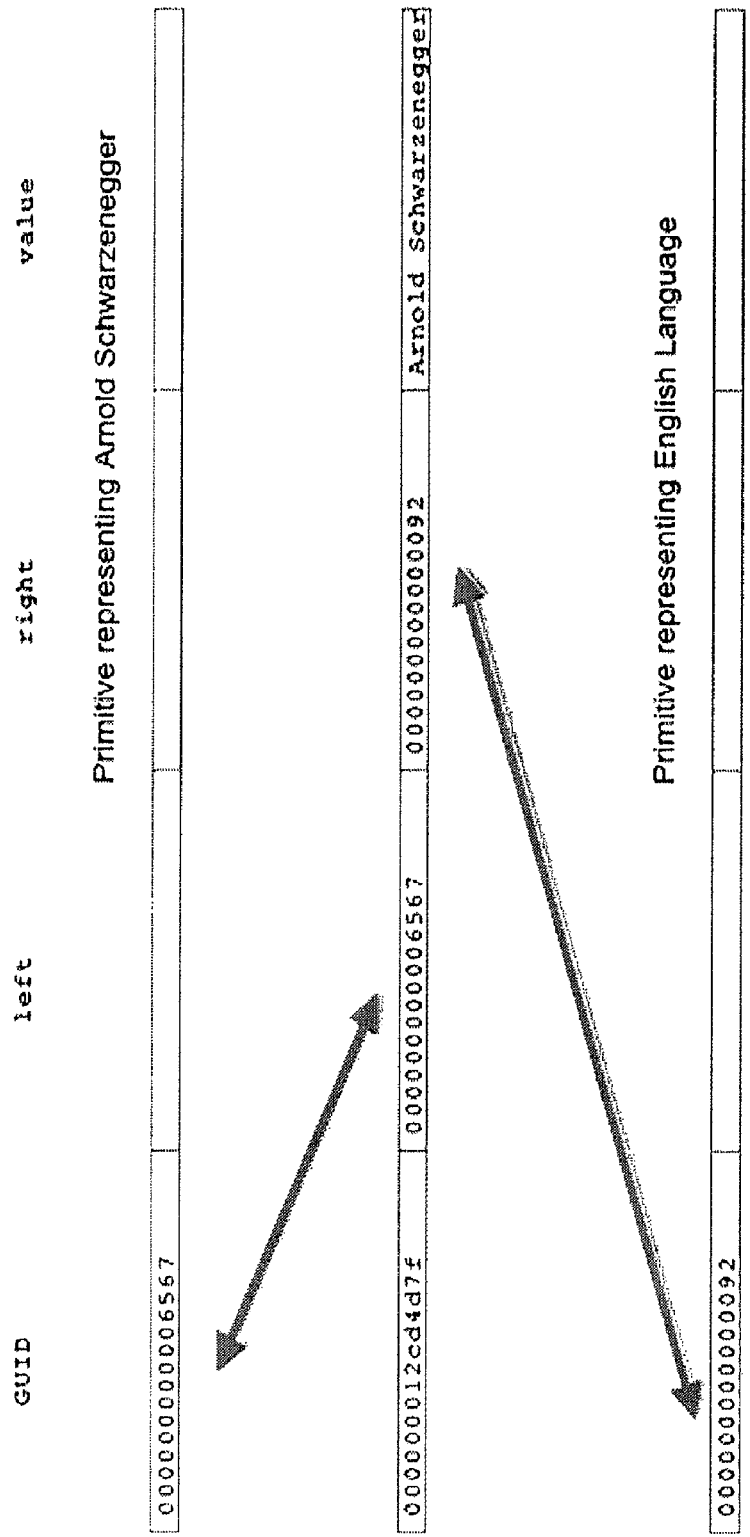
FIGS. 1A and 1B are block schematics diagram showing a graph using primitives according to the invention.
Figure 1B:
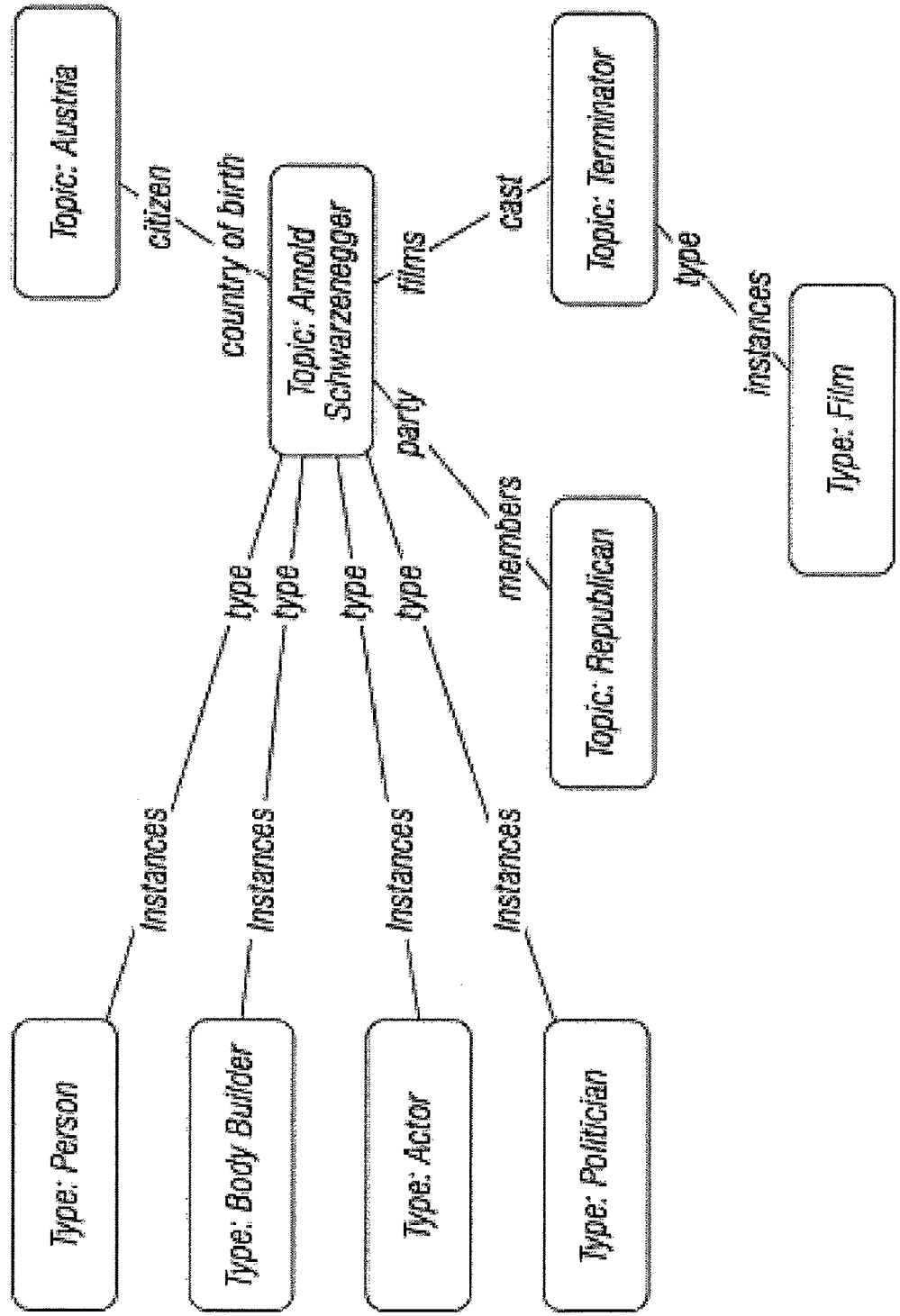

Graphd primitives (see FIGS. 1 and 2) are identified by Globally Unique Identifiers (GUIDs) which consist of a database id and a primitive id. In a database, primitive ids are assigned sequentially as primitives are written. For example, 9202a8c04000641f8000000000006567, is the GUID which corresponds to the person known as "Arnold Schwarzenegger". The front part, 9202a8c04000641f8, is the database id and the back part, 6567, is the primitive id.

Each graphd primitive consists of a number of fields:

Left: A guid, the feathered end of a relationship arrow.
Right: A guid, the pointy end of a relationship arrow.
Type: A guid, used in conjunction with left and right to specify the type of a relationship.
Scope: A guid, identifying the creator of a given primitive.
Value: A string used to carry literal values, strings, numbers, dates, etc.
Any or all of these may be null.

Once written, primitives are read only. Graphd is a log-structured or append-only store. To modify a primitive, for example by changing the value, one writes a new primitive carrying the modification and marks it as a replacement for the old. To delete a primitive, one writes a new primitive which marks the primitive one wishes to delete as deleted. Deleted or versioned primitives are weeded out during query execution.

In addition to many implementation advantages, a log-structured database makes it easy to run queries as of a certain date.

Objects and Identities

With few exceptions, none of which are visible to the user, primitives may be regarded as either nodes, i.e. things without a left or right, or as links which always have a left and usually a right. Nodes such as . . . 6567, are used to represent identities, and carry no other data. Links are used to represent properties of an identity, either a literal value, for example "height," or a relationship, for example "employs/employed by."

Looking at, for example, Arnold, we see a property named / people/person/height meters with a value of 1.88. This is represented by a single tuple whose left is . . . 6567, type is . . . 4561f6b, and value is the UTF8 string "1.88."

A relationship is similar, but has a right instead of a value. The property, such as /type/object/type, which identifies an object as being an instance of a particular type, is represented by a guid . . . c. That Arnold is typed as a person is indicated by a primitive whose left is . . . 6567, type is . . . c, and right is . . . 1237.

At the MQL level, a node and its associated links are regarded as an "object" with fields (properties) described by one or more types. Such objects map naturally into the dictionary-based objects supported by dynamic languages, such as Python and Perl.

While MQL only exposes nodes as identities, the notion of identity is so fundamental that graphd could reasonably be described as an "identity-oriented" database. Giving every piece of data a fixed identity is radically different from the relational model, which deals only with sets of values and leaves the notion of identity up to the application. Working with identities as a first-class notion is essential if schema is to be flexible. Long before we can agree on the exact shape of the data used to represent a person or a building, we can agree that individual people or buildings exist and that they have certain obvious attributes that we might want to record, height, address, builder, etc.

Queries

Figure 3:
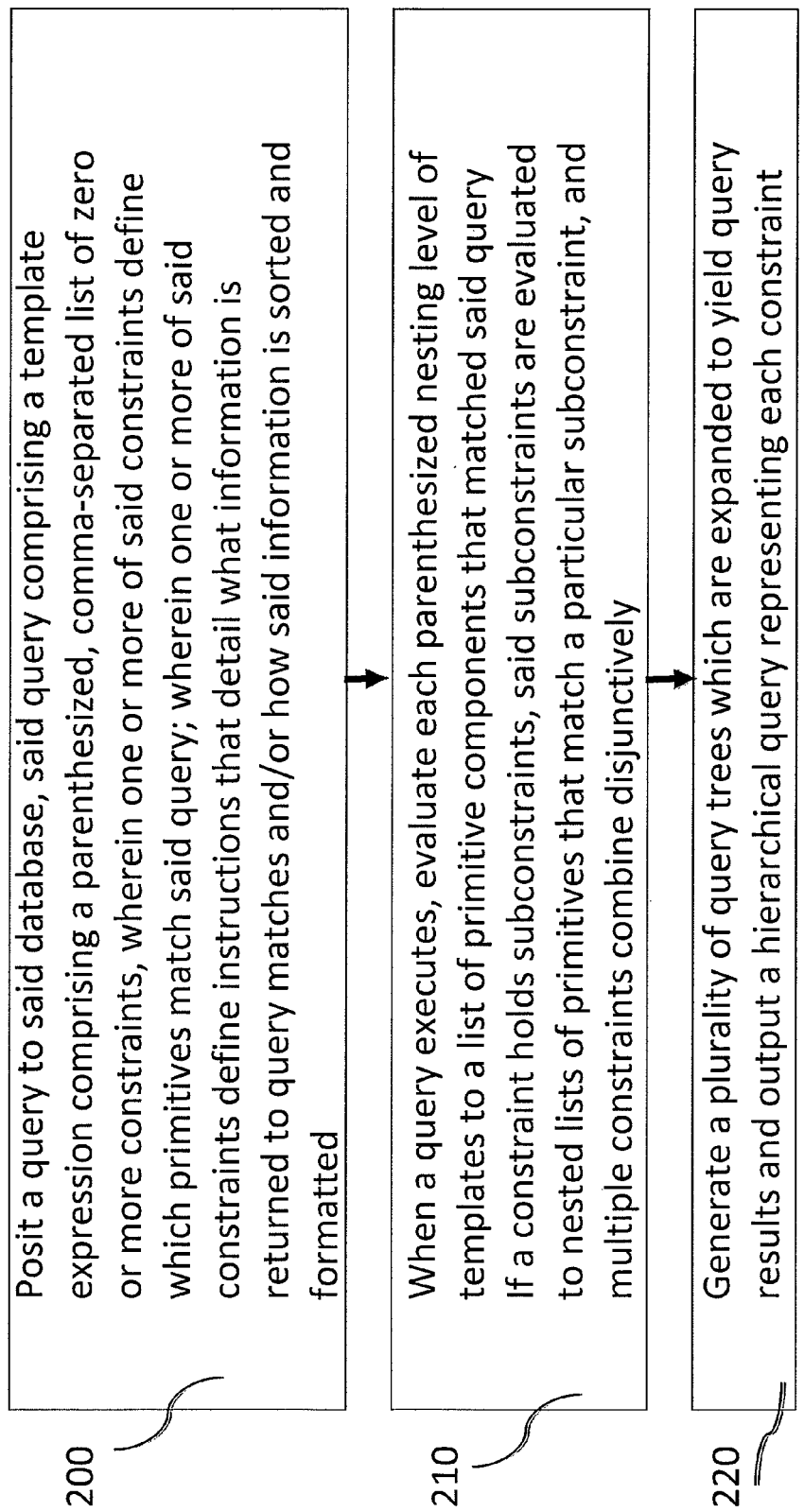
FIG. 3 is a block schematic diagram showing a query model according to the invention.

An embodiment of the invention, illustrated in FIG. 3, provides a query model that operates in connection with a processor configured for positing a query to the database (200). The query comprises a template expression that comprises a parenthesized, comma-separated list of zero or more constraints. One or more of the constraints define which primitives match the query, and one or more of the constraints define instructions that detail what information is returned to query matches and/or how the information is sorted and formatted;

When a query executes (210), each of a plurality of parenthesized nesting levels of templates is evaluated to a list of primitive components that match the query. If a constraint holds subconstraints, the subconstraints are evaluated to nested lists of primitives that match a particular subconstraint. Multiple constraints combine disjunctively.

A plurality of resulting query trees are generated (220) which are expanded to yield the query results.

For example:

Let's ask graphd how tall Arnold is using the MQL query syntax:

```
{
  "query" : {
    "/people/person/height_meters" : null,
    "id" : "/topic/en/arnold_schwarzenegger"
  }
}
```

MQL looks up the GUIDs for "/people/person/height_meters" and "/topic/en/arnold_schwarzenegger" and produces the following graphd query:

```
read
 (guid=9202a8c04000641f8000000000006567 result=contents
   (<- left right=null type=9202a8c04000641f8000000004561f6b)
 )
```

The first thing to notice is that all notion of schema has been compiled away. Unlike with a conventional RDBMS, which preserves the notion of type all the way through query evaluation, i.e. the row-source tree, we ask graphd a question which is expressed entirely in a simple vocabulary of constraints on a universal primitive type. Graphd does not know anything about /people/person or any other type or even the general structure of types.

As with MQL and unlike SQL, the graph query language is template based: the syntax of the query parallels the structure of the desired result. Each parenthesized expression corresponds to a constrained set of primitives. Nested expressions are related to each other via one of the linkage fields. So, the outermost expression,

```
read
   (guid=9202a8c04000641f8000000000006567
   ...
   )
``` specifies that we want to look at exactly one guid, . . . 6567, a node representing Arnold Schwarzenegger. And the inner expression:

```
read
   (<- left right=null type=9202a8c04000641f8000000004561f6b)
``` is looking for any primitive (link) which refers to the primitive satisfying the outer expression with its left and has a type of . . . 4561f6b.

The basis for the query evaluation is a nested-loop join: we take a candidate satisfying the outermost constraint, in this case there is only one, and then look for candidates that match the inner constraint, right=null type= . . . 4561f6b, which also relate to the candidate for the outer expression in the specified way, i.e. with their left.

By itself, a nested-loop join is hopelessly slow. However, there are a variety of optimization techniques (discussed herein) that we can use to reduce the size of the candidate set at each node in the query.

Database

The traditional approach to create a database is to start with a set of tables into which data are stored. The schema of the database defines the structure of the tables. The tables correspond very closely to the underlying storage mechanisms, e.g. hard disks. One problem with this approach is that the design of the data structure has profound implications for the design of an application for accessing data in said data structure. Certain things get fast, certain things get slow, certain information is redundant, there must be carefully structured update routines to keep the database in sync, etc.

One approach is to collect the data and then create the schema last. This makes it easy to change the tables in the data structure. Thus, if the system stores data denormalized in a certain way, it is simple to encode the fact that the data are denormalized in the structure of the database itself, such that the data could be broken into two tables at a later time without having to make that structure explicit.

In an approach that comes up with establishing the schema last, where the system collects data and then, later on, a determination is made on how to organize the data, the first question concerns what the data are about. In the invention, data are collected about identities, where an identity is a mathematical notion that corresponds to some identifiable entity. For example, there is a single thing that corresponds to Arnold Schwarzenegger and there are lots of data that are related to that identity. The identity in this example is the thing that, to the extent that anyone can agree to anything at all, is this person called Arnold Schwarzenegger who can be described in many different ways. There is not any further reduction to be made to an identity. It is the atomic particle of information. Thus, the data are related to that single identity to which one can add types, i.e. the schema, later. The schema becomes a way to talk about the data, not a definition of how the data are stored. In the invention, facts are known about entities in the world and these facts can be grouped in certain ways to create sets of entities which have common sets of facts, referred to as types. An embodiment therefore comprises an identity-based data store, i.e. a graph store.

In an embodiment, e.g. where C-code implements the graph, there is no knowledge of a schema. The graph does not know about any of the types. It does not know about people or authors or publications or any of the types that contributors may come up with. All that the graph knows about are nodes that represent identities, and links that represent data about identities (see FIGS. 1A and 1B). In considering these identities it is also possible to consider sets of identities, e.g. everyone whose first name is Scott. In this example, the table has a column that represents the name Scott and corresponding row IDs, which comprise an array of numbers. Accordingly, there is a single column that comprises the most minimal representation for a set because the column comprises a linear collection of numbers. Representing sets in this way has several advantages. For example, it is easy to perform intersections at unions.

In an embodiment, an entity, such as a person, is represented as a node and various bits of data concerning this person are represented by links to the node. There can be another person and, once again, various bits of data that describe this other person. There can also be a node that does not carry any data. There are links between the nodes that can carry data. The nodes and links are all primitives. When the primitives are written, each primitive has an identifier and, as the primitives are written, it is possible to build up an index that consists of the input sets that are used to drive an optimizer (discussed below). The indexes are typically tables, e.g. hashed, structured, dictionaries.

A higher-level type has a significant amount of structure. At a bottom level, the structure is a node in the graph. For purposes of handling queries, only the identity of a node is of concern. A node is encoded into tuples that represent the links. An ID is assigned to links as they are written. In an embodiment, the IDs increase sequentially. Information about each link is recorded in an index. The indexes detail, for example, all of the links of a particular type. Thus, if a type is the name type, the system can keep track of things, for example, which are names in a dictionary. Primitives are thus added in numerical order and the system appends them onto an array, which provides a sorted set representation that underlies the system. The ID is the manifestation of, for example, the identity of an individual. The only commonality through all the nodes is they all have unique identities. Thus, the only thing that is unique about anything in the system is the ID number.

The node corresponds to an identity in the real world. It is an identity of something that is to be described in the system. Anything accessible in the system must have a node to represent it and, optionally, it can have links that add data about it, such as its relationship to other entities. Accordingly, there is a node, which comprises an identity of some entity, and the identity can have with it various links. These tuples, and each of the links, can define a type with which they can be associated.

In the example where the object is called Arnold, there is an assertion of fact that is substantially independent of the final schema. In other words, the Arnold column can be part of any set of relational information. Thus, there is any number of things that can be used build the schema, but they all devolve down into types associated with the linked tuples. The resulting graph allows the system to keep track in an index of links of type name.

Whenever a primitive is written, the system adds the ID for the primitive to all the sets that are appropriate. There is one set for each kind of linkage. As discussed above, the primitives have a left and a right, and can have a value and have a type. An object is a primitive that has a type but does not have a value. Every link, i.e. a left, has a type that says what sort of link it is. From the standpoint of the database, the system does not know anything about what the type means. All that is known is that the system is asked to constrain the type, e.g. find all of the spouses of the object, e.g. Arnold. Some of the links have values which are literal actual strings that are stored in the link, e.g. names, dates of birth, etc. Some of the links do not have any values, such as an instance of link, which means that an identity is an instance of a particular type. For example, Arnold is a person. For example, there is person and the primitive points to an instance of a type. There is not any value in that case. Rather, this situation typically expresses a relationship.

Accordingly, it is not necessary to have a separate entry for each instance. One just simply says that Arnold is an actor, and he is also a governor, he is also a spouse, etc. and there is an instance of a governor, an instance of an actor, an instance of a spouse, etc. By using indexing I accordance with the invention, it is possible keep track of all of these instances in a simple, uniform manner. This typically comprises an array of IDs that may have a further property, such as being sorted in ascending order, e.g. because as they are created they are added to the index.

ACID

Graphd supports a subset of the traditional database ACID guarantees (see FIGS. 4 and 5): it is optimized for collaborative wiki-style access. We assume a long cycle of read/write interactions, and so provide no built-in read-write atomicity. Instead, we guarantee only that writes of connected subgraphs of primitives are atomic (and durable). In the sense that it never becomes visible to a user, it may be the case that q user's write collides with someone else's. However, the user's input is always preserved, and, if the user desires, it can easily be re-instated by browsing the modification history.

Figure 4:
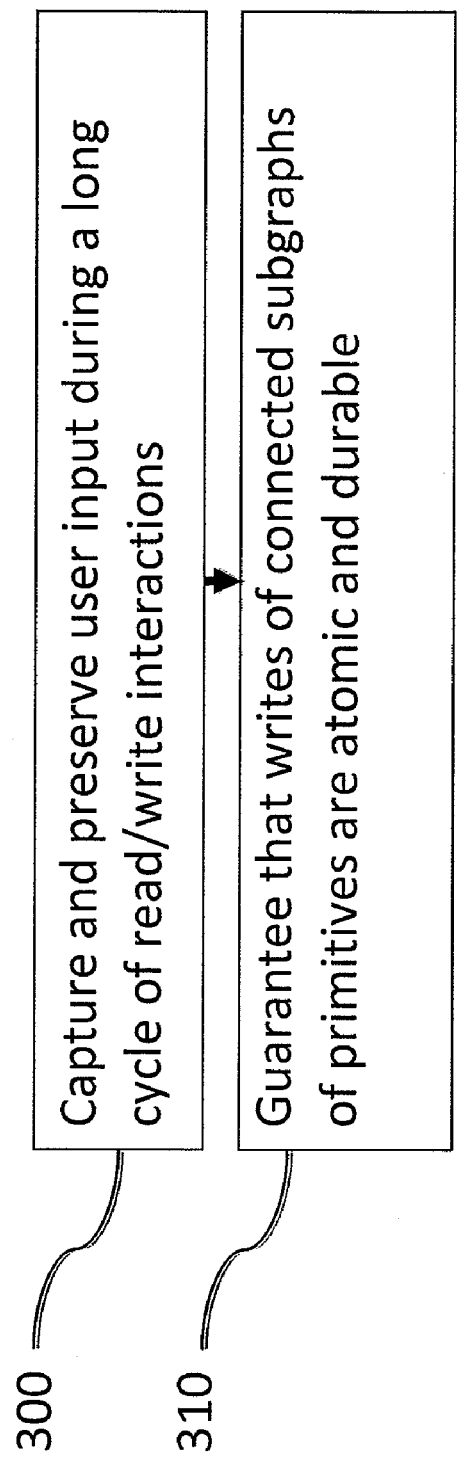
FIG. 4 is a block schematic diagram showing relaxed ACID according to the invention.

For example in FIG. 4, a processor is configured to capture and preserve user input during a long cycle of read/write interactions (300) and guarantee that writes of connected subgraphs of primitives are atomic and durable (310). In this way, the user's input is always preserved, and, if the user desires, it can easily be re-instated by browsing the modification history.

Figure 5:
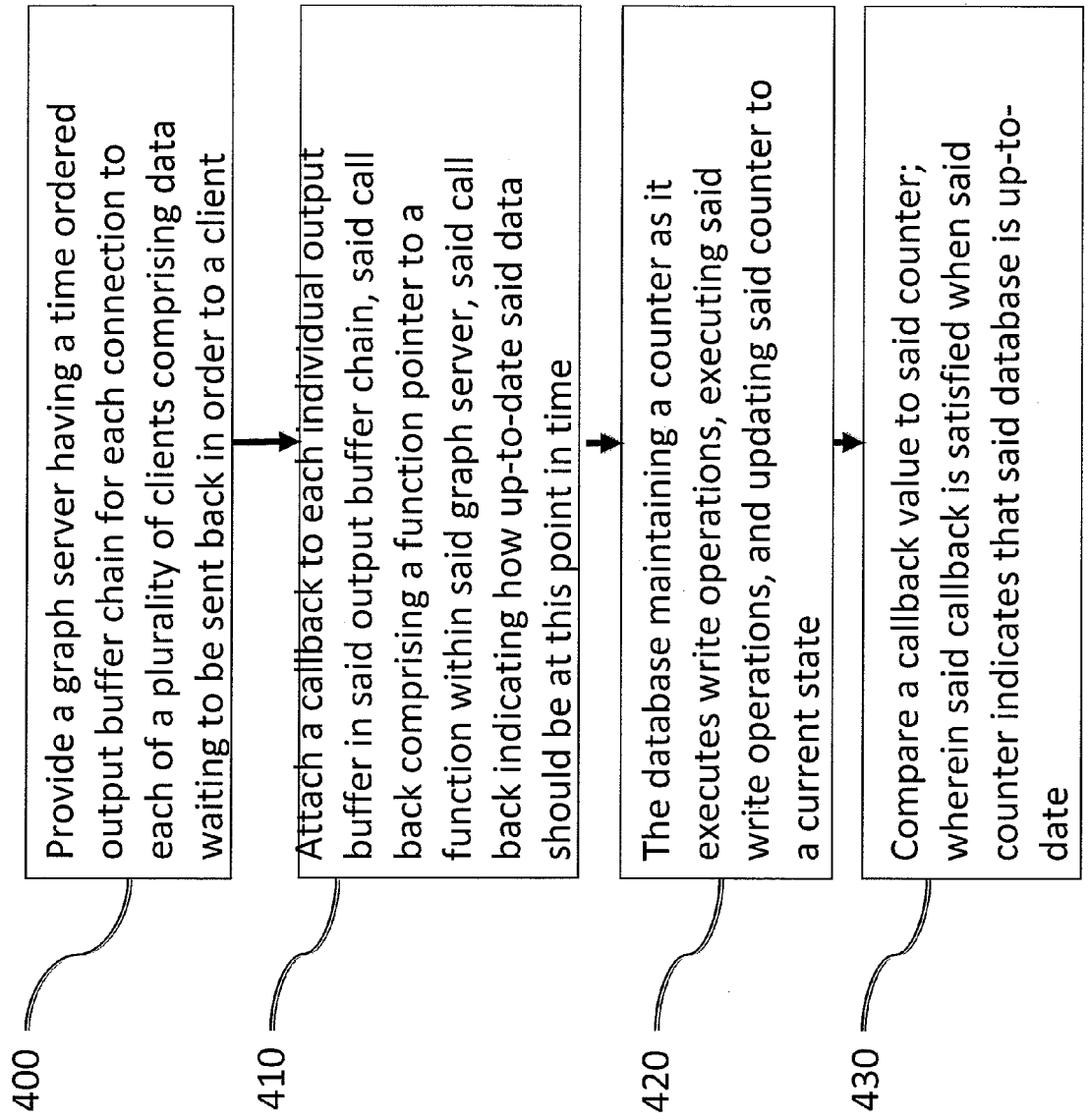
FIG. 5 is a further block schematic diagram showing relaxed ACID according to the invention.

In FIG. 5, the performing of callbacks includes providing a graph server having a time ordered output buffer chain for each connection to each of a plurality of clients comprising data waiting to be sent back in order to a client (400). A callback is callback to each individual output buffer in the output buffer chain (410). The call back comprises a function pointer to a function within the graph server. The call back indicate how up-to-date the data should be at this point in time.

The database maintains a counter as it executes write operations (420). In coordination with the processor, the database executes the write operations, and updates the counter to a current state. A callback value is then compared to the counter (430), and the callback is satisfied when the counter indicates that the database is up-to-date.

Query Optimization

A typical query is for a specific node. Initially, nothing is known about it. There is a link, which refers to the node with its left, and its type, which is its GUID, i.e. a number that corresponds to the node for the type. The node has other links and the type for such links may be, for example, such things as date of birth, etc. There is thus a query, which asks for a node with a link of a particular type whose value is, for example a name, such as Scott; and which asks for another link of another particular type whose value is, for example, a birth date, such as 1964. Thus, a query in one embodiment comprises a nested loop join.

In satisfying the query, instead of using everything in the database as the set of candidates, it is preferred get a smaller set. For example, two things are known about each link. Each link has a particular type that can be looked up. In this example, the type corresponds to the name. There can be an array that has a particular value, and that can be looked up as well. These two arrays can be intersected quite rapidly. When the arrays are intersected, the result is a much, much smaller set. Thus, instead of looking at, for example, 300 million candidates for each part of the query, there remain 5 or 100 or 1,000 candidates, for example. Accordingly, a simple join goes much faster.

A separate search can be made to satisfy both of the links in the query, resulting in two lists or sets of candidates. The system then intersects these two sets or lists of candidates. These sets are candidates for the links, and it is necessary to get the left of the tuple. In this example, the sets for the first link are sorted, straight out of the index. Thus, it is possible to perform an intersection very rapidly for the first link. When this is done, the result is a set of candidates that are represented by the left. When one asks for lefts of this nicely sorted set of candidates, e.g. for the next link to satisfy the query, they do not come out in order. Rather, an unsorted list of candidates is returned. There is no fast algorithm for sorting them. For example, the lists may comprise 1,000 Scotts for one link and 20,000 people who were born on that date for another link. Thus, there are 1,000 unsorted lefts for one query term and 20,000 unsorted lefts for the other query term.

One way to complete the query is to take a candidate from a first list of candidates and check the candidate against the other list of candidates. Another way to complete the query is to take a candidate from the other list of candidates and check the candidate against the first list of candidates. So how to pick? One could select the list having the smallest number. But, the main concern is minimizing calculations, for example by estimating the size of the result set. That is, if an intersection is performed, how big is it, really? Because, for example, if the results of the intersection are almost the same size either way, it is probably a waste of time to even do it. It would be just as fast to pick one list and check the candidates as they come up for the other list. Whereas if the results of the intersection are tiny, then it is really valuable to select one list over the other because this technique reduces the number of candidates which go into the nested join.

Typically, a first step is to decide which of the lists containing sets of candidates to use as a producer and which to of the lists to use as a checker. One way to do this is to compute, or try to compute, the first few items in each set of candidates and record how much this costs in terms of an abstract count. Based on the cost, it is possible to decide whether to use one list as a producer and check on the other list or vice versa. Because real queries are complex and go down many levels, the cost comparison is quite valuable. Thus, this aspect of the invention provides a cost-based optimization that is applied to a universe of nested sets of identity constraints. Here, sets of identities represent a constraint having particular types and values that are combined into the sets. Each node is annotated in the query with a set of candidates, which is typically much smaller than everything that could be queried. In a sense, this embodiment of the invention runs a race and decides which list is more efficient as a producer than the other.

As discussed above in connection with optimization of query resolution during nested joins, it is still not known which list is going to be the winner. If an exhaustive cost-based optimizer is used, then it goes through every permutation. If one is running a production database where it is necessary to do the same job every night, it is completely worthwhile to spend 36 hours in the optimizer figuring out the most optimal way to do this query. But, in the world of the invention, where queries are whatever people think up, it is not practical spend that amount of time. Rather, it is necessary to decide at query time how to optimize the query. This is referred to as an ad hoc query in the database literature. Thus, the invention performs an ad hoc query while, generically, traditional relational technology is good for a production query, where it is worthwhile to spend the time optimizing because the same thing is encountered a million times.

Figure 6:
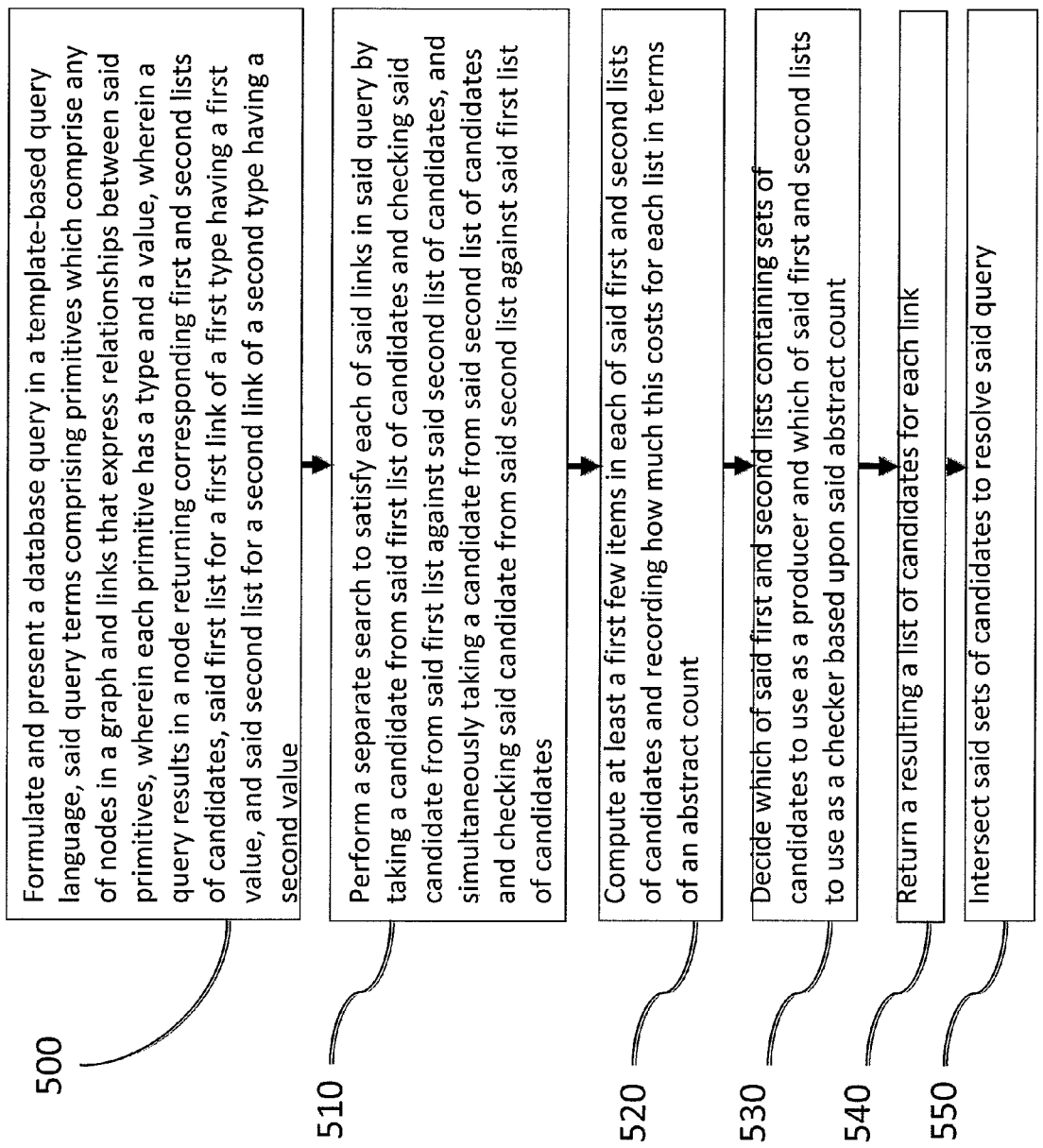
FIG. 6 is a block schematic diagram showing query optimization according to the invention.

Thus, as shown in FIG. 6, this embodiment of the invention performs a cost-based optimization that is applied to a universe of nested sets of identity constraints, where sets of identities represent a constraint having particular types and values that are combined into the sets. A processor implemented step formulates and presents a database query in a template-based query language (500). The query terms comprise primitives which comprise any of nodes in a graph and links that express relationships between the primitives. Each primitive has a type and a value. A query results in a node returning corresponding first and second lists of candidates. The first list for a first link of a first type having a first value, and the second list for a second link of a second type having a second value.

A separate search is performed to satisfy each of the links in the query (510) by taking a candidate from the first list of candidates and checking the candidate from the first list against the second list of candidates, and simultaneously taking a candidate from the second list of candidates and checking the candidate from the second list against the first list of candidates. At least a first few items in each of the first and second lists of candidates are computed (520), and how much this costs is recorded for each list in terms of an abstract count. It is then determined which of the first and second lists containing sets of candidates to use as a producer and which of the first and second lists to use as a checker based upon said abstract count (530). A resulting a list of candidates is returned for each link (540), and the sets of candidates are intersected to resolve said query (550).

Replication

Figure 7A:
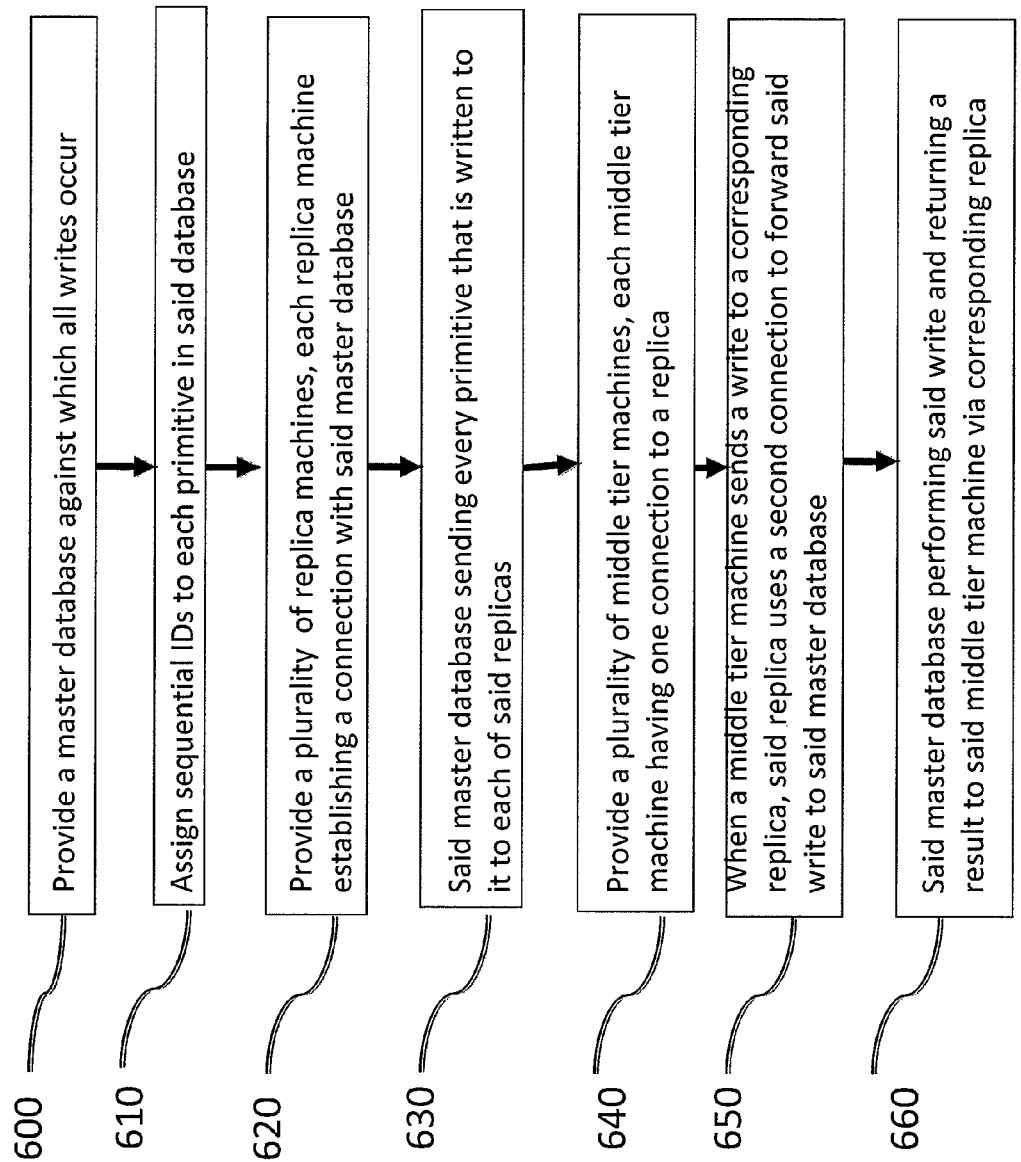
FIGS. 7A and 7B are block schematic diagrams showing replication according to the invention.
Figure 7B:
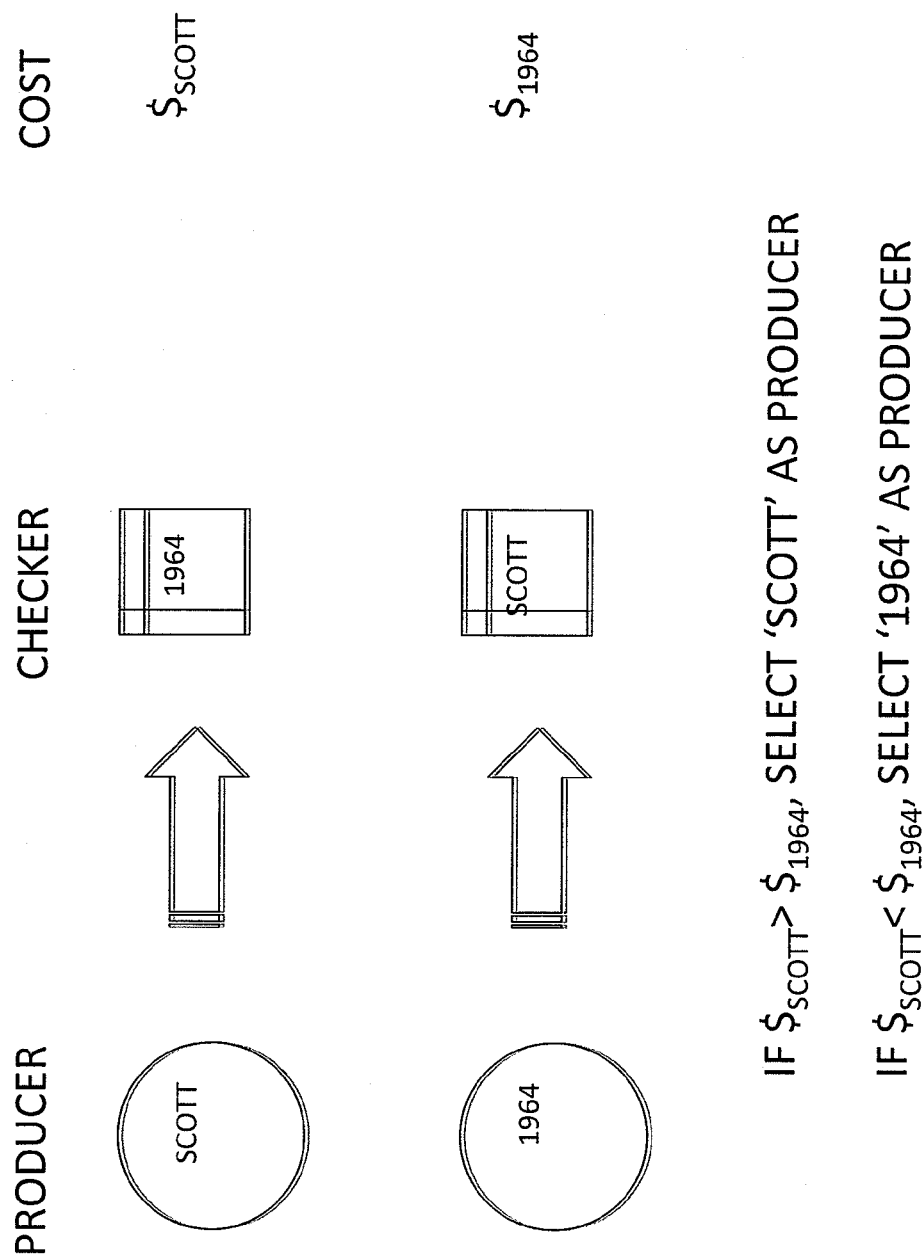

Another embodiment of the invention concerns replication. As shown in FIGS. 7A and 7B, the system comprises a master database against which all writes occur (600). This embodiment of the invention assigns sequential IDs to each item in the database (610). It is desirable to scale the system up beyond a single machine. Thus, in the system there is some number of replica machines (620). In the invention, each replica machine establishes a connection with the master database as a replica. The master database sends every primitive that is written to it to the replicas (630). A key feature of the invention that allows this to work is that, where the write on the master may fail because some constraint is not satisfied, if the write succeeds on the master, then it is known to succeed on the replica. Thus, the replica only needs to write three primitives. It is not concerned about if it would fail halfway through a query or not.

In a situation where it is desired to have the middle tier (640) talk directly to a replica to establish a connection, the question becomes: "What is done with the write?" In one embodiment of the invention, there are two things that could be done. One of the things that could be done is to have the middle tier know when there is a write, and then establish a separate connection so that the write comes back down to the replicas. A disadvantage of this approach is that the middle tier then must know a lot more, such as where the master is, especially because there is a tendency to change masters from time to time. It is preferred to tell the middle tier to go find a database, where any one is as good as another. However, the middle tier is provided with one connection to whatever database it is using. When it sends a write to the replica, the replica cannot process it, but it has a second connection to the master. The middle tier forwards the write along to the master (650). Accordingly, all of the replicas have additional connections. The master does the writes (660) and then the resulting primitives come back out. If there is a replica of a replica, the replication protocol passes the address of the master along, so the replica of a replica also talks directly to the master. Thus, when primitive writes come in, they are written, a response comes back, and then the response goes back out to the middle tier.

Virtual Time

Another problem arises when one writes something. In this case, it is desirable to see that write when a next read is performed (see FIGS. 8 and 9). In this system, there is no transactional guarantee about where the replicas are with respect to the master. So, in particular, one could write something and get a response back, and then try and read it. If one is really quick or replication is slow, the write might not be available. In this regard, the invention provides an approach that relies on the fact that IDs are assigned in sequential order. When a write is performed, one or more IDs are returned. It is known what that ID is because it is encapsulated into a virtual time, i.e. a virtual time. When a write is performed, a virtual time is returned. If one is interested in reading the same thing, that virtual time can be provided as a parameter that indicates it is desired to read something at least as new as the virtual time. Here, the request waits if the replica is not at least caught up to that point. Thus, one could perform a write and get back an ID, e.g. 231. When a read is then performed, it is necessary to receive a primitive that has an ID of at least 231. If the replica has primitives that only go up to 220, it is at least 11 behind. In this case, the system waits to answer the request until it gets the desired primitives, e.g. those with an ID of at least 231.

Figure 8A:
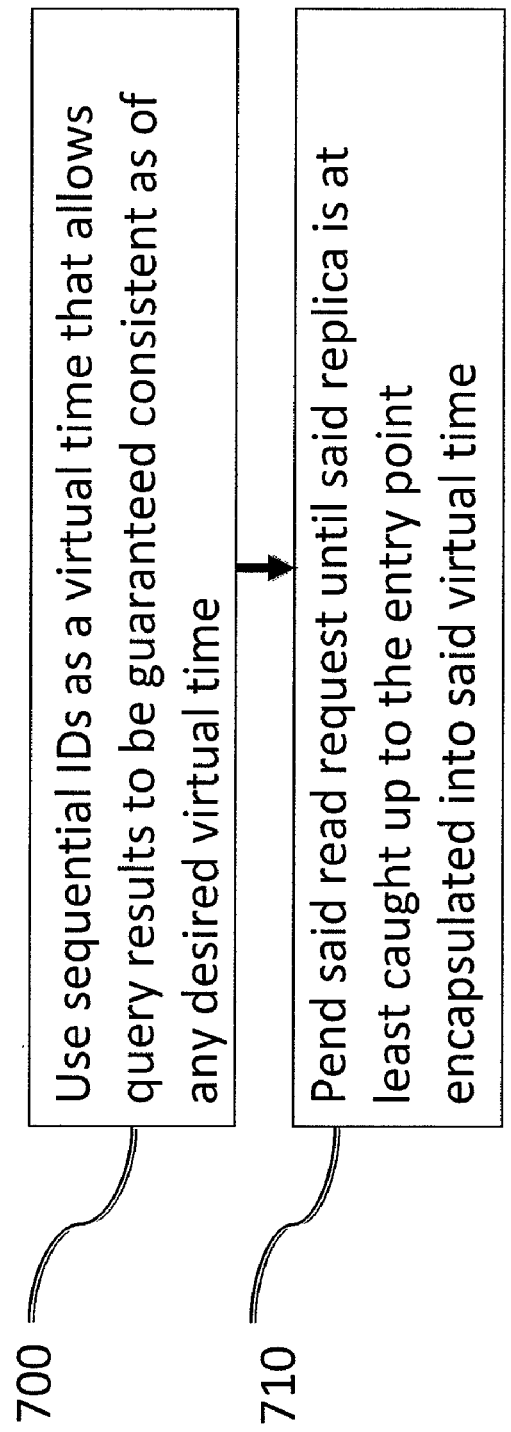
FIGS. 8A and 8B are block schematic diagrams showing virtual time according to the invention.
Figure 8B:
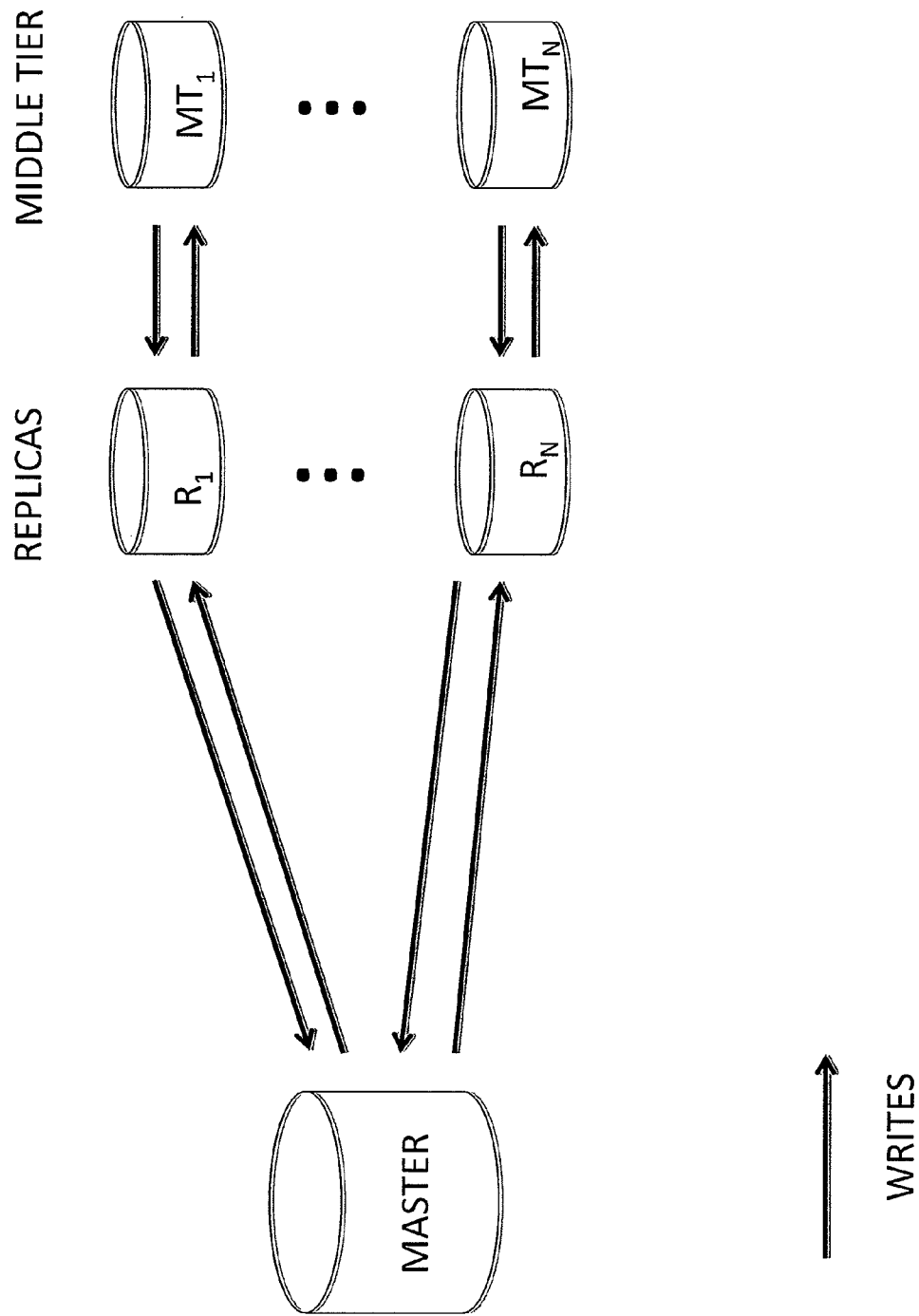
Figure 9:
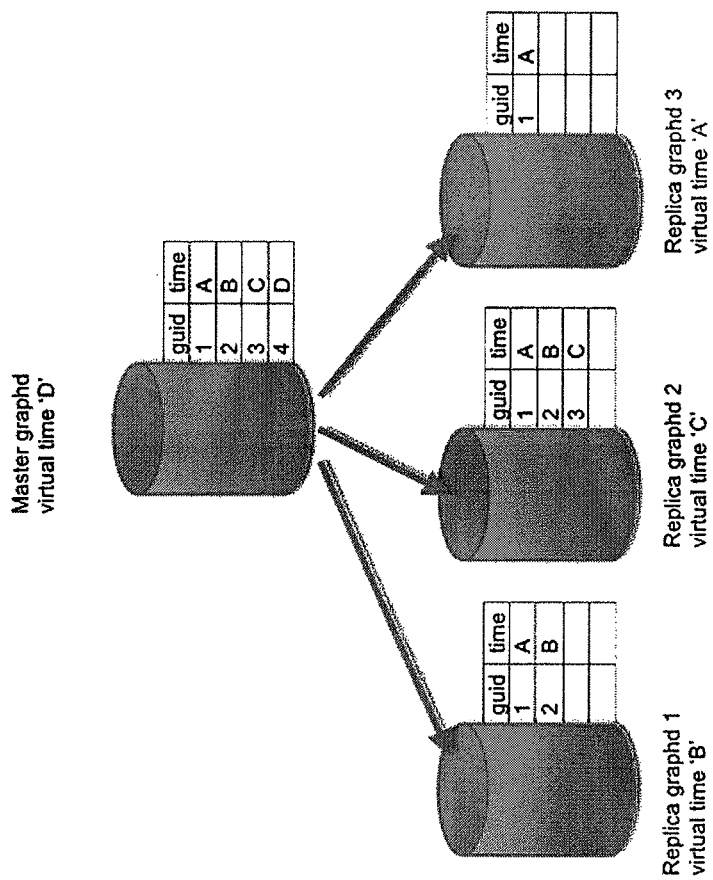
FIG. 9 is a block schematic diagram showing replication and virtual time according to the invention.

As shown in FIGS. 8A and 8B, a processor configured is to use sequential IDs as a virtual time that allows query results to be guaranteed consistent as of any desired virtual time (700), and a read request is pended until a replica is at least caught up to the entry point encapsulated into the virtual time (710).

Index Flushing

The preferred embodiment is a write through arrangement, with nothing stored in a buffer. The virtual time mechanism described above comprises a virtual time technique that is associated with the fundamental structure of the data. An embodiment provides a unique entry point, i.e. touch, that pretends that the system is up to date without actually writing anything. All it does is ask for the current virtual time. Even if one goes all the way back to the master, the result is still out of date almost instantly as more writes come in because writes are happening all the time. If a write is performed to one replica and a touch is performed to another replica, there is some risk that the system would not catch up with itself, unless it was implemented by looking at the master.

Figure 10:
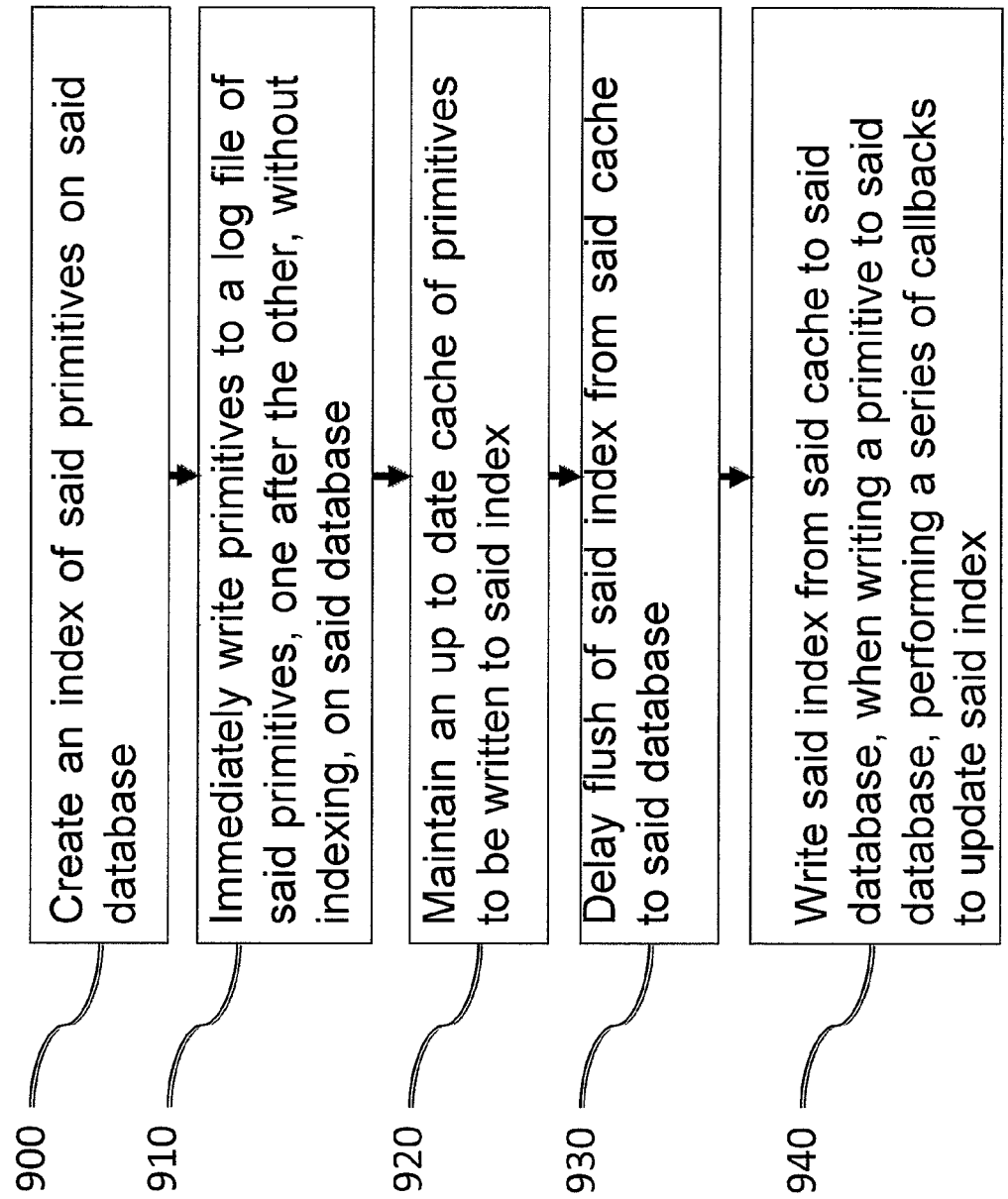
FIG. 10 is a block schematic diagram showing index flushing according to the invention.

As shown in FIG. 10, a processor configured to create an index of primitives on the database (900). The primitives are immediately written to a log file of primitives, one after the other, without indexing, on the database (910). An up-to-date cache of primitives to be written to the index is maintained (920). Flush of the index from the cache to the database is delayed (930), and the index is written from the cache to the database (940). When writing a primitive to the database, a series of callbacks is performed to update the index.

Index Representation

One problem with this index organization, where an index is a table, is that tables have bad locality reference. What that means is if one is looking at something in a table, it is quite probable that the next thing looked at is a long way away from it. If this is first item is stored on a disk, it is necessary to read in a new page to look at the table. What this means is that the set of pages that looked at is very large, and a lot of time is spent bringing them into memory or bringing them into a cache. There is not anything that emerges out of the structure that corresponds to something that actually means anything to a human being. The query sets, however, actually do correspond to actual meaning, e.g. the set of all authors. That is a meaningful set and something that is actually used. This structure is also extremely compact. The advantage of having a compact structure that sits in memory versus a big expanse of pages that must be read through is huge. Thus, this aspect of the invention provides excellent locality of reference with the query sets.

The intermediate results are relatively bulky. They are sub-pieces of the table. What is typically done with the intermediate results is to read something out of the table, and look it up in another table. It is the looking up operation, i.e. the random access that hurts the locality of reference. Once the system has filtered through and got all of the authors, there actually is a set of authors. This comes out of the organization of the identity-organized database, and particularly the tuples are issued. Rather than having just the tuple indices, there are indices of all of the lefts of everything. Thus, the state of anything that could be the subject of a left is instantly known just from the identity. Everything is associated with the identity, so it is not necessary to look for other aspects of that identity elsewhere because, once the system hits one aspect of the identity, it hits everything about that identity. This depends on the specificity and the linkage.

This aspect of the invention, thus, concerns a straightforward way in which the data are stored on disk, and the indexes that allow the system to find data, given some component. As discussed above, the individual data records are tuples consisting of a value, a name, and pointers to other records. Thus, the primitive has a value, i.e. it has a name that is not a text string, it has a data type that says something about the meaning of the thing that makes up the value; and there are four pointers, i.e. scope, type, left, and right, where left and right are meaningless and are used to construct the overall meaning of the records in the view of the application. Type and scope are more restrictive in that the type of a link between the left and right GUID describes the nature of the relationship. This is of interest because the indexing scheme herein described treats type plus left and type plus right as things that are desirable to index because people want to look them up. Thus, if there are three indexes, there is a term lookup where a list of things that relate to something is found.

For example (see FIG. 1), Arnold has a name of Arnold, which connects a featureless node that is identified with the person Arnold and with the language that it has been labeled in, e.g. English. It is known that this is the node Arnold because there is a primitive that points to Arnold with one end. The one side points to the namespace. Suppose the left points to the actual Arnold node, then the right points to English, and together this amounts to the fact that, on a featureless node, this is in fact named Arnold in English. There are three primitives to make up the assertion that Arnold's name in English is Arnold. This is similar to the primitives in the assertion that Arnold is, in fact, a person. There is a primitive that is the type person, similar to how it is known that this primitive is the language English. A fact is created that indicates that this primitive is connected to the type, Leis an instance of, relationship. This group has as a type, i.e. it points with its type arm to some other node, which symbolizes this instance of relationship. Arnold also has a scope because it was inserted at a certain time, and all primitives that are created through the same insertion for the same person through the same process are labeled with the same scope. The scope is typically the user who is writing to the database, i.e. it comes with a lifeline to a record. Thus, the primitive here has a scope and a type.

The example above comprises a tuple in which Arnold has a type, which is the display name that is seen by the user; and in which there is a scope, which is the attribution to the contributor. On the right, it is shown to be in English, and on the left it points to the Arnold thing. The Arnold thing is another tuple, but the Arnold thing is almost completely featureless, other than the scope. It stands for the thing in the real world, which is Arnold. Even that Arnold's name is Arnold in English is an assertion of a fact. On a higher level, if there was another node that represented Maria Shriver, there would be another set of three of these things.

Versioning

Figure 11:
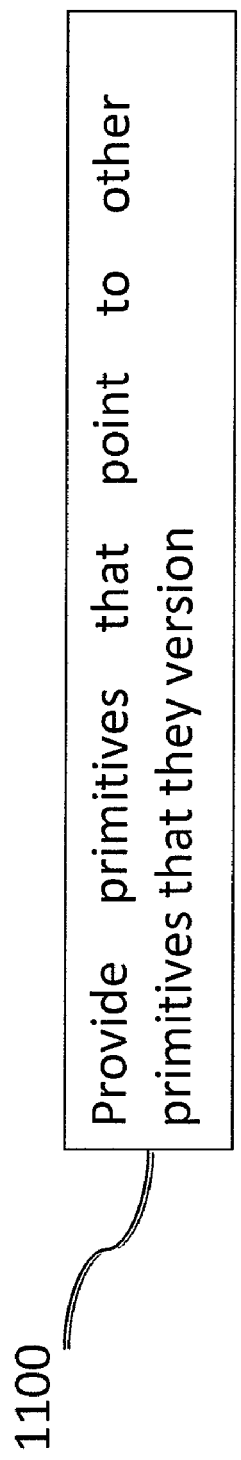
FIG. 11 is a block schematic diagram showing versioning according to the invention.

As shown in FIG. 11, primitives also point to other primitives that they version (1100). If one wants to rename Arnold to Bob, another display name is written, and a link is put through the Arnold node in the same way that the Arnold tag was named. As soon as Bob is inserted, Arnold is no longer valid. The retrieve from the database can be positioned whether or not a node has been versioned. It can be asked: "Does anybody else function in the same way?" Then it can be asked whether anybody wants to be the left hand, or the right hand, or the scope, and so on. If a double database query is performed and one of the nodes that is about to be retrieved has been versioned, it is known that the system cannot return this value. It must find another one. These lookups at retrieval time amount to always finding the newest version of the data, but never throwing away the old version. Thus, this aspect of the invention provides an audit trail. If there are indexes pointing to something else with a previous pointer, that other thing, i.e. the something else, at some point asks: "Does anybody point to me?" That is quickly answerable because the system keeps an index of who points to whom that can be used to trace these relationships down in reverse. This is referred to as a reverse index. Take, for example, a sequence of three in time, the first one having the second one point to it, and the third one pointing to a third one. The second one has a pointer that says: "Here is the previous." It is known not to go to that because it is previous and the system does not do that unless an investigation is being performed.

Figure 12:
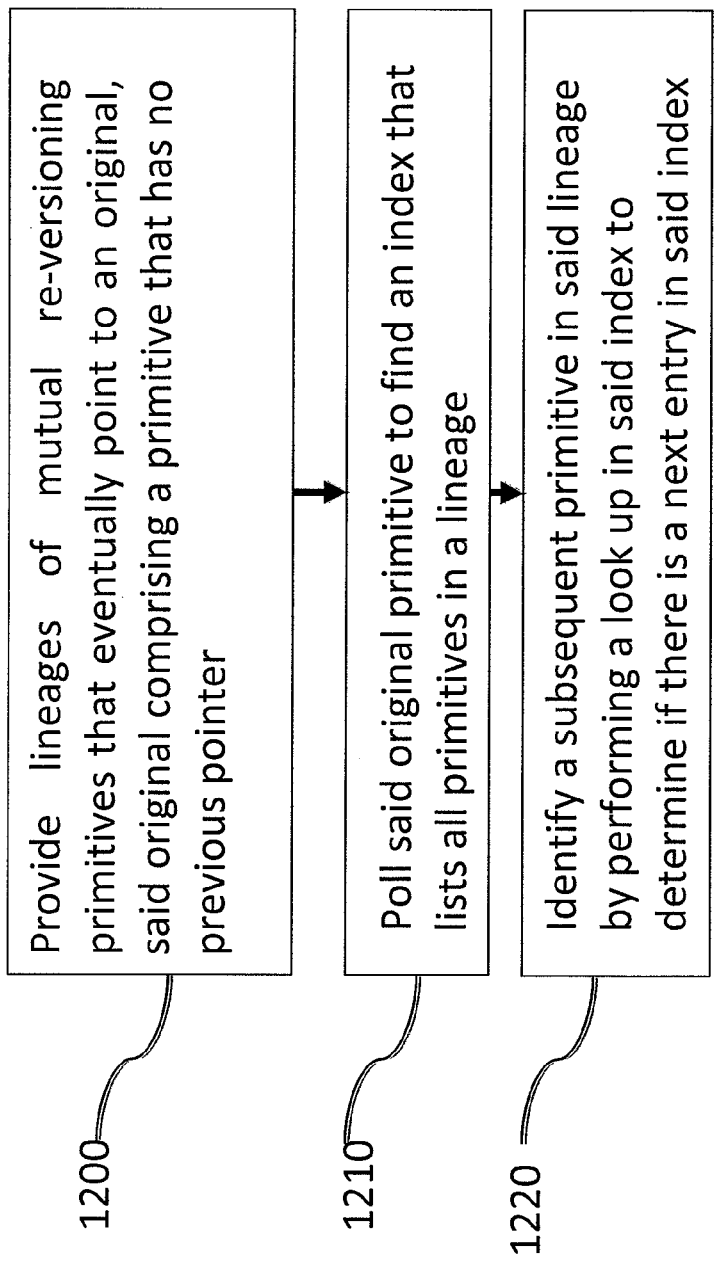
FIG. 12 is a block schematic diagram showing versioning according to the invention.

FIG. 12 illustrates how this works underneath. There are lineages of mutual re-versioning pointers or primitives that eventually go to an original (1200). The original is the one that has no previous pointer. The original can be polled to find a table that the system maintains that is not in the primitives. This is part of the index information that the system is compiling. This index lists all primitives in the lineage, or everybody that has version (1210). When referring to a previous pointer, what is actually happening is that the primitive knows which lineage it is in and where it is in this progression of linear versions. So, Arnold, Bob, renamed to Charles, would all point to the same lineage table, and Arnold would know that he is the original because there is no predecessor. There are no pointers to subsequent individuals.

Figure 13:
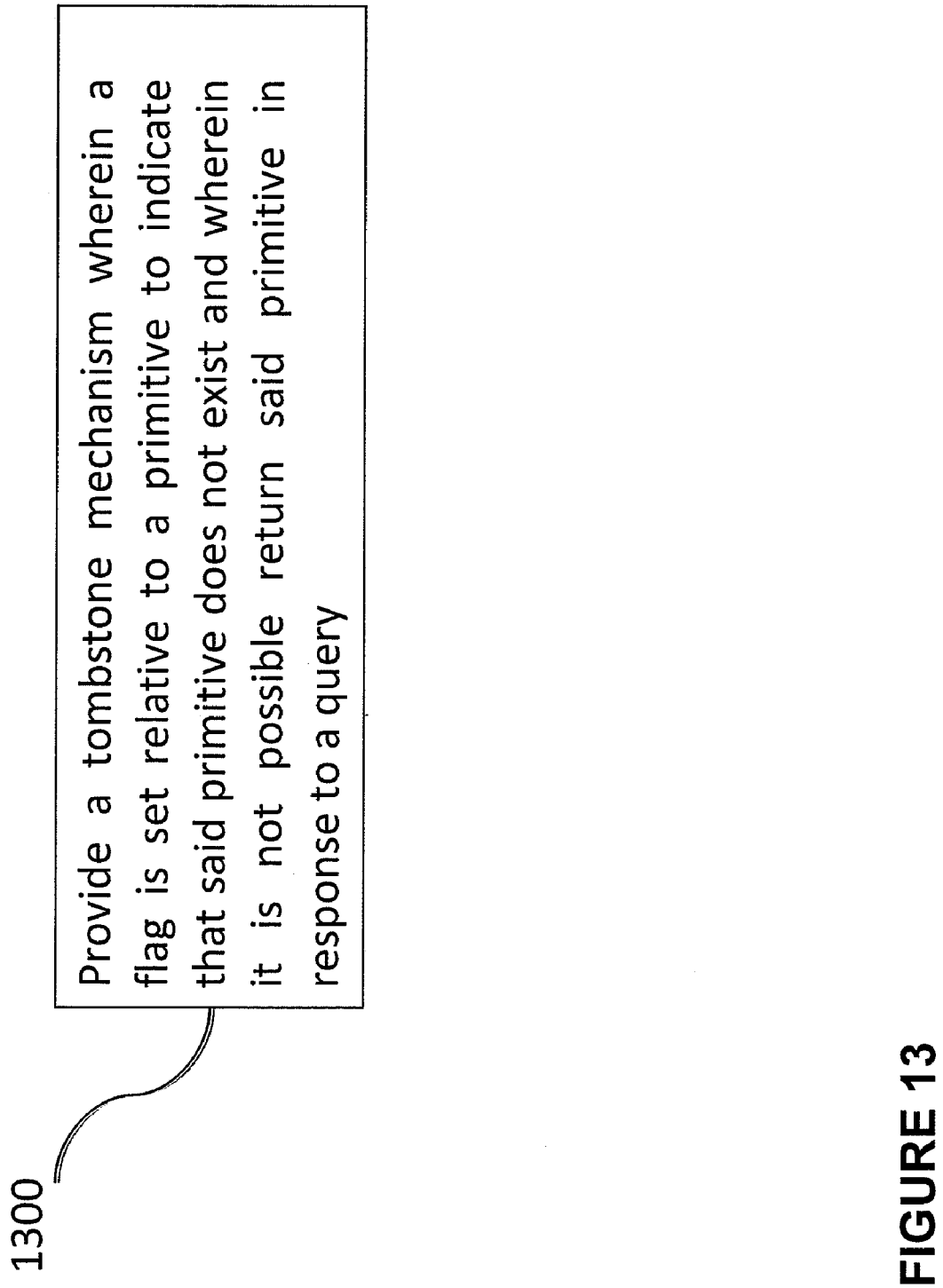
FIG. 13 is a further block schematic diagram showing versioning according to the invention.

Take the example above, where the previous arrow is coming up and another arrow is coming in from another one. The one that is in the center knows the previous ones. To find out if there is a subsequent one (1220), go to the table. In the table, one can look up the index and there is an entry, i.e. the next position in the index. Thus, this is not the last word on the subject. All the boxes have unique identifiers, e.g. GUIDs, and all of the GUIDs for everything, including the versioned things, are in one large namespace. There is also a second mechanism. To remove a tag, version it as if it were to be changed, but tag the replacement with a fact that says: "I don't really exist." As shown in FIG. 13, this amounts to a tombstone mechanism (1300). That item can be versioned again to reconstitute, e.g. Bob, so it is not a permanent death. Whenever any primitive is retrieved, it is necessary to check to see if that flag is set, in which case the item does not actually exist and it is not possible return it. This is determined by looking up in the index whether anything points to it. The indexes are centrally maintained. When writing a primitive to the database, it gets handed off to a series of callbacks that update the indexes.

Figure 14:
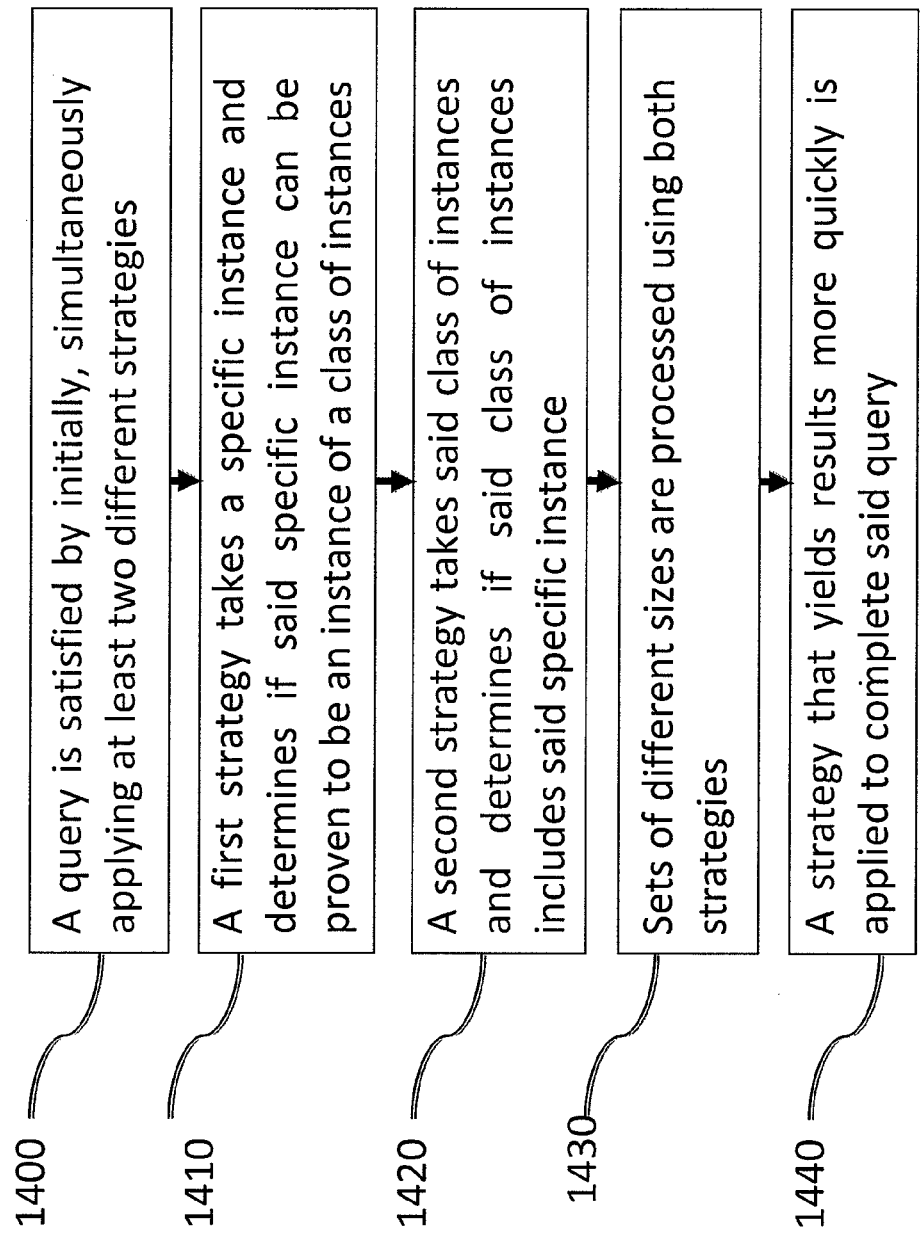
FIG. 14 is a further block schematic diagram showing versioning according to the invention.

A key point of the invention, as shown in FIG. 14, is that the primitives are nested, stacked, or combined to formulate a query. The example above starts with the uppermost piece, which in this case is Arnold, and the uppermost piece turns into the set of everything that matches it. Then, in each element of the set of the things connected to the specific element of the top set there is a respective instance of pointers. Suppose there is a query for Arnold who is married to Maria. The first thing that is going to happen is that the upper primitive is Arnold. The system then tags all of the Arnolds, and asks for Arnolds with an instance of Maria, for example, i.e. all the instances that do not have Maria get pruned out. Different constraints more effectively prune the set than do other constraints. As discussed above, to satisfy the query the system tries two different strategies (1400): one strategy takes an Arnold instance and sees if it can be proven to be an instance of person (1410); and the other strategy takes the first instance and sees if it is easy to prove that it has the name Arnold (1420). The system can process sets of different sizes on both sides (1430), but they might yield results faster depending on, for example, proving that Arnold is a person is going to be more successful than proving that a person is Arnold (1440). For example, the system may try for five matching results, where whichever strategy gets the first five wins becomes the strategy for the whole query. In this example, the system processes by Arnold, i.e. it looks up the instance of person, because Arnold is a common name. At that point, a clear pool of candidates appears, and the system then matches these candidates. For example, Arnold is a more common name than Ford, and this fact might change the direction of processing, which is important because there is a very large data set in the system that is full of real world data.

Iterators

Figure 15A:
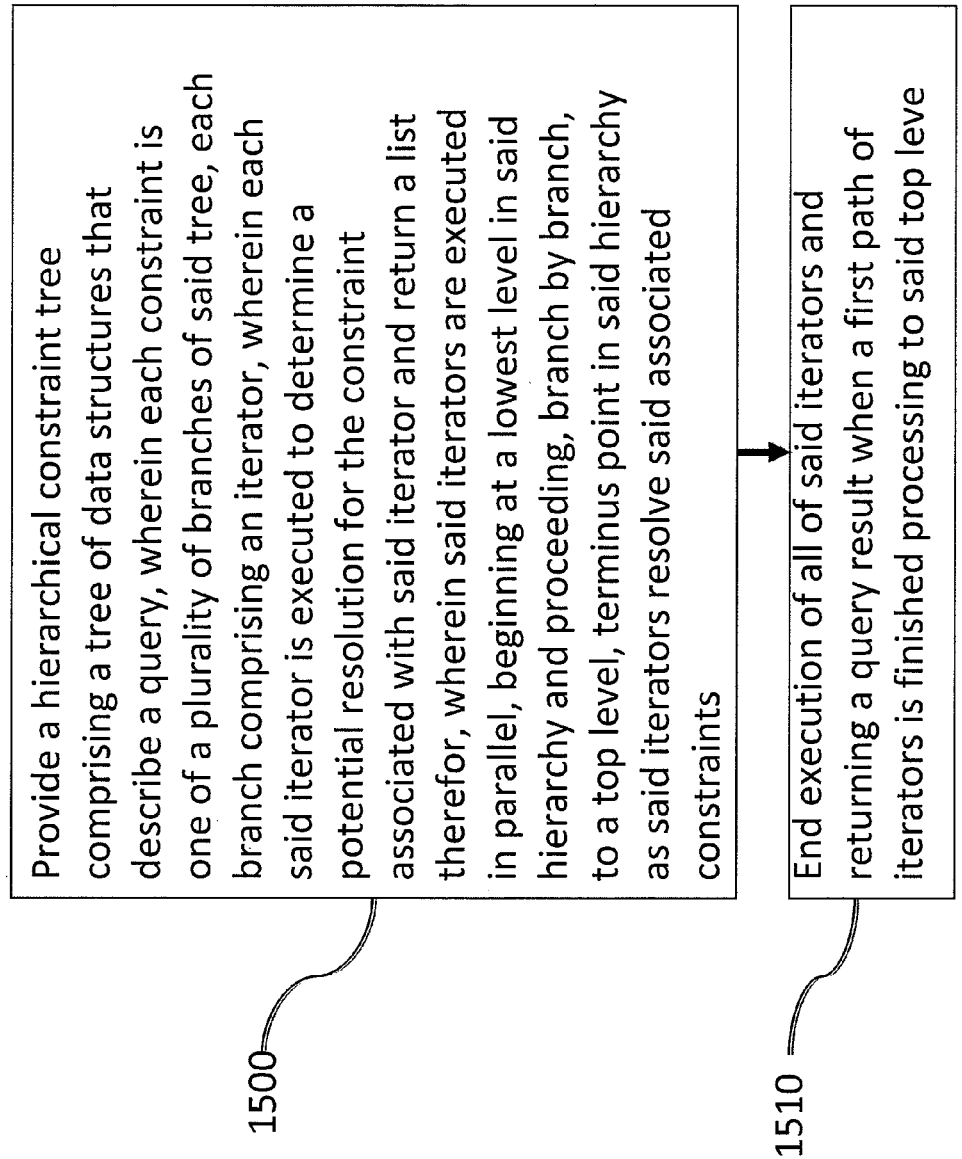
FIGS. 15A and 15B are block schematic diagrams showing iterators according to the invention.
Figure 15B:
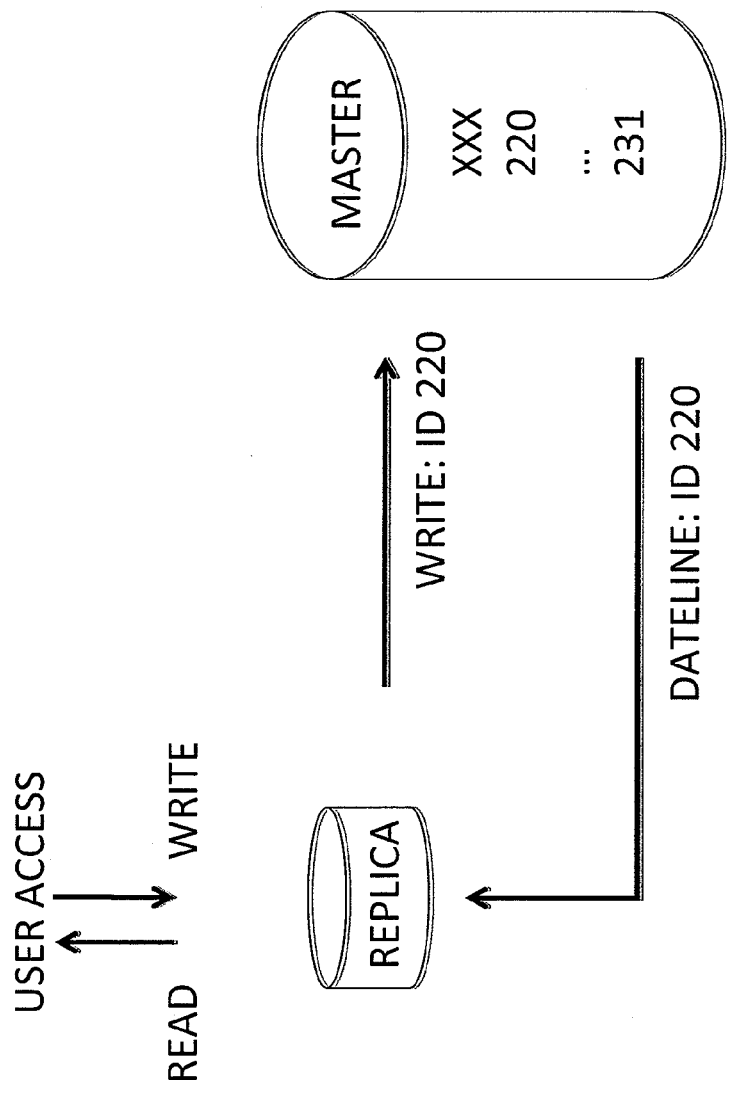

Different optimization strategies work with different queries. This is particularly important because the case of a person called Arnold is a simple query, but where there is a complicated nested query, such as music for movies in which Winona Ryder appears, such as "The Breakfast Club," such query can take a long time to resolve because the set of movies that Winona Ryder appeared in is difficult to determine quickly. Resolution of such query does not just involve choosing between two branches because there could been branches in the resolution of query. The constraint tree in this example, and as shown in FIGS. 15A and 15B, is a tree of data structures that describe what the user wrote in their query. Each of these constraints is elevated with iterator trees, referred to as iterators, which are basic elements of the query optimization scheme disclosed herein. The iterator trees notice such things as the fact that there is a table, or that everybody who is valuable is Arnold. It is necessary to identify something that has an entry in the table. It is known what this type is because there is a table of things that have that type, and it is necessary to find something that is in all tables returned by the query. One aspect of the invention provided an "and iterator" that intersects each of these tables. There are several strategies for doing this, depending on how big the tables are and how much they actually intersect. Thus, an iterator can be added to each constraint (1500). All of these iterators know about their particular piece of the hierarchy. They do not know everything. As one moves up through the constraint tree, the iterators are used to build up larger branches until the tree is complicated and has copies of the iterators. They are not just copies; they are actually preserved links. If there is a copy of a branch and it learns about what the branch actually looks like, e.g. how much the query terms intersect or what is a good strategy for computing this particular branch, then the iterators remember this. They have a common background storage, e.g. a cache, that they all use to optimize processing. Once they do this again, e.g. a third time, one branch already knows how to resolve a term. The result is a complicated, multi-armed iterator. At the top level, there is an iterator that is determining which of three sub-arms to lead with to produce IDs, and that then checks them against the other arms or branches. In this example, the iterator runs three races in parallel: one race between three candidates in parallel. Each of these is, in turn, also trying to figure out how to do its production. Thus, each of the arms, in turn, also runs races in parallel and so on. With all of this iterating going on, at some point there must be a resolution. Because the determinations get easier and easier as the system goes down the tree, eventually there are only, e.g. five values, or it is known that Winona Ryder only appeared in 20 movies, and it returns a table of the 20 movies. At this point, resolving the next query term is easy. The systems pulls out the ID numbers, e.g. for the 20 movies, and checks them against the other query terms. At that point, one branch is finished processing and the races end (1510). The current iterator becomes more efficient in turn. This determination percolates up, but at the same time that this is happening, there can be a completely different subbranch where two complicated lists of terms are being processed but, in the end, they determine that there is no overlap at all. At this point, the top level iterator realizes that it has no results for this branch. The result set is empty; it sends a message to the client: "We're over." The process of percolating up results about Winona Ryder movies is stopped.

Budget

Figure 16A:
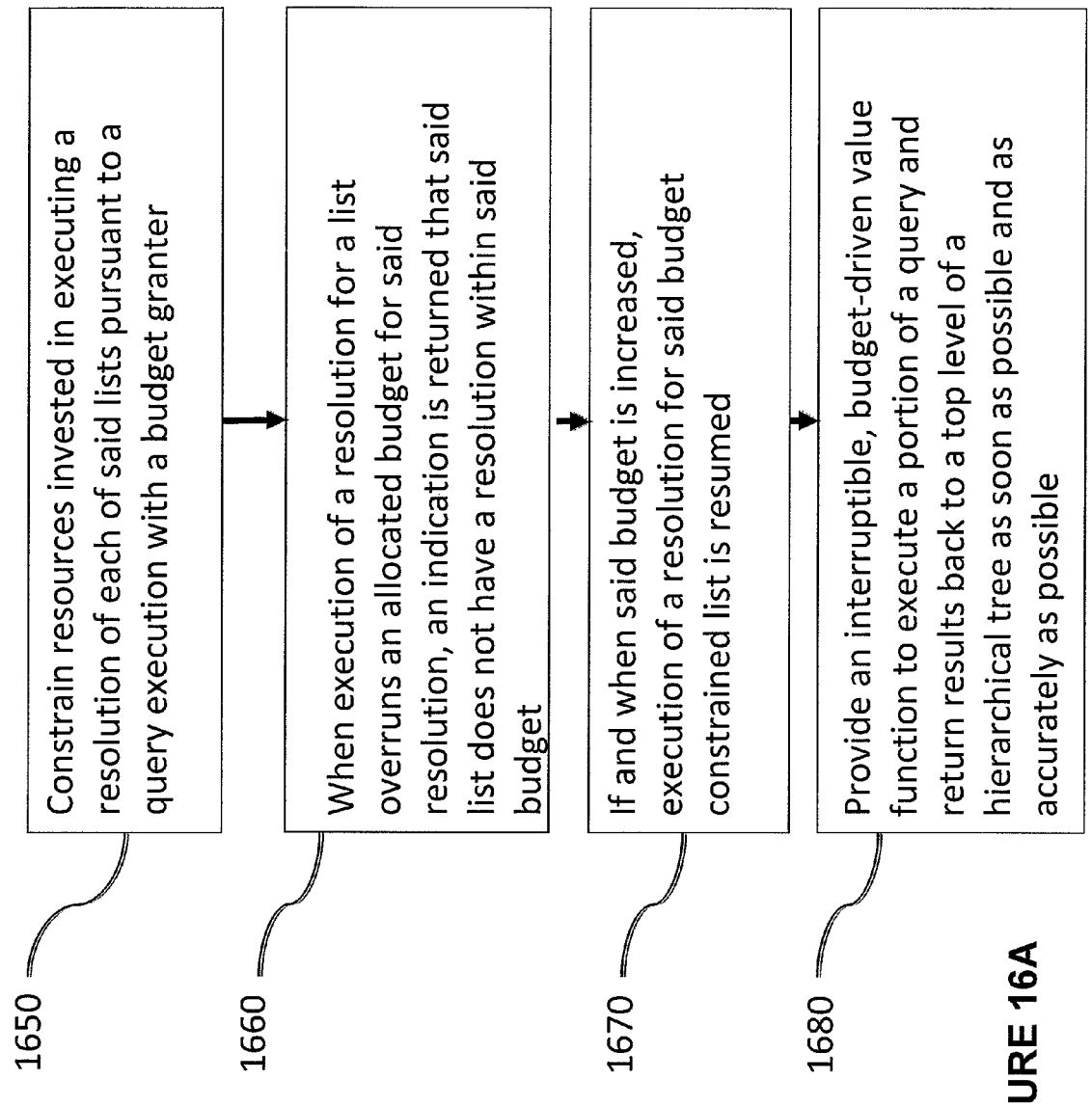
FIGS. 16A and 16B are block schematic diagrams showing budget according to the invention.
Figure 16B:
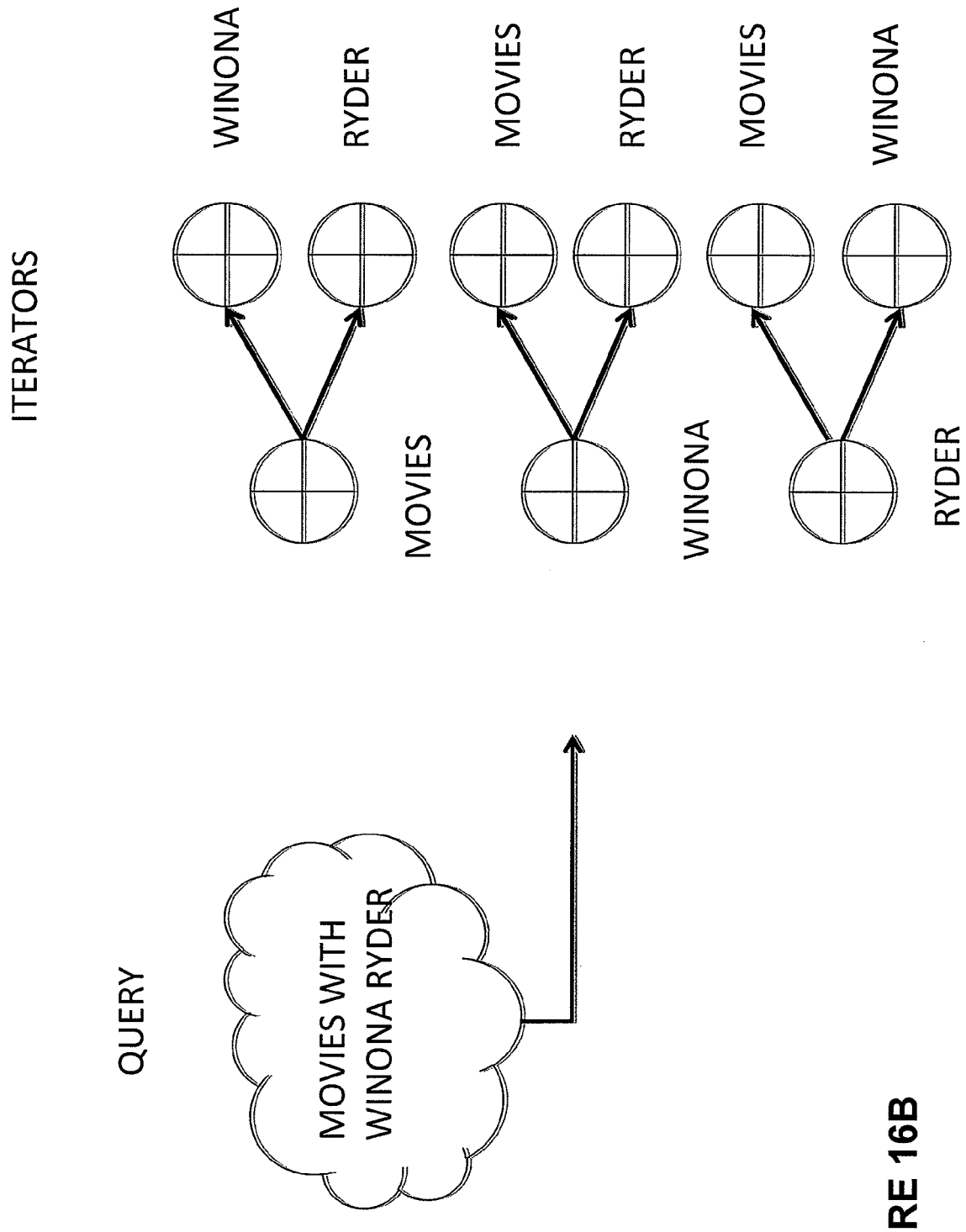

When answering individual questions about optimization, it is necessary to constrain how many resources are invested in an operation. In an embodiment of the invention shown in FIGS. 16A and 16B, all of these operations, i.e. all of the functions that are called, have a budget granter (1600). This is not a fictional unit; in an embodiment this unit is expressed in terms of dollars, although it has nothing to do with real dollars. When one of the investigations overruns an allocated budget, it returns and indicates that it does not have a result yet (1660). Once there is more budget (1670), then there can be more research. This use of interruptible, budget-driven value functions (1680) tries to execute its portion of a query and get results back to the top level of the tree as soon as possible, but also as accurately as possible.

Figure 17:
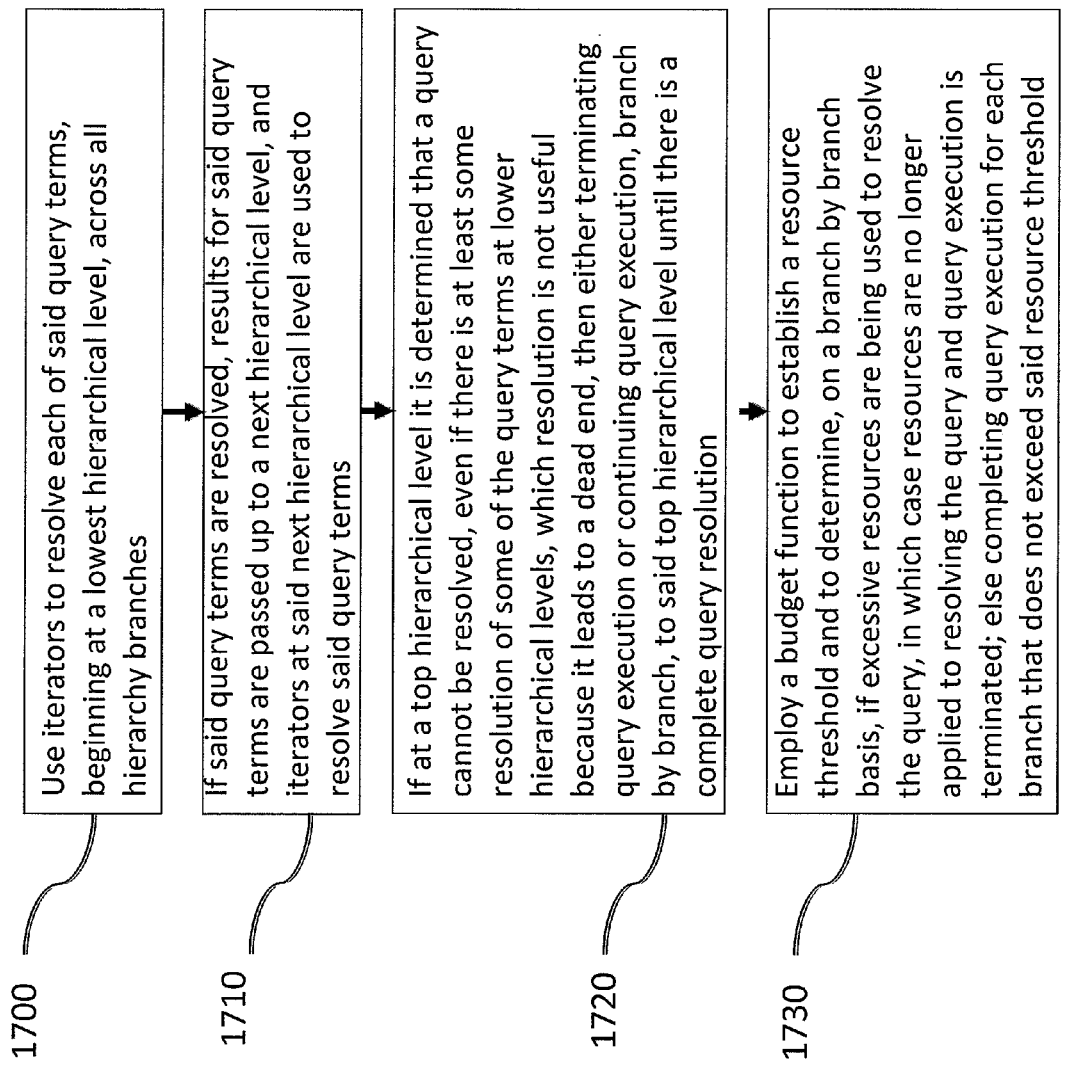
FIG. 17 is a block schematic diagram showing transforming of sets according to the invention.

Thus, this aspect of the invention, as shown in FIG. 17, tries to resolve the query terms at the lowest level first across the various branches where the iterators are resolving these iterations (1700). As the query terms get resolved in a positive way (1710), they get passed up to the next level, which then starts to run its test also. As this is working its way up, if at the top it is determined that the query cannot be resolved (1720), even if there are some correct results below, but they are not useful because they lead to a dead end, then the system can either call the search off or it could keep passing itself up, branch by branch, to the top of the tree until there is a resolution. At the same time, there is a budget function (1730) that may determine that the system is putting too many units into the query. In such case, the system stalls the resources going into the search and does not search anymore.

There is also a worst-case strategy in which every branch is tried until it reaches an end. This approach can be efficient if it turns out that all of the terms match. Alternatively, a read query can be performed, e.g. read ( ) trying every branch. In any event, it is always desirable to produce a result. Key to this aspect of the invention is a question of efficiency, i.e. allocating resources where they do the most good, improving response time as quickly as possible, and narrowing down the search space as quickly as possible.

Thus, an embodiment of the invention comprises the use of a strategy that employs multiple optimizations at the same time. In a further embodiment, the result sets are a subset of all the possible results of a constraint. In other words, the system is not always asking for everything that matches a query term. For example, a query might ask for five movies that starred Winona Ryder. If there were 30 such movies, it is still important to find five quickly and then not look for any more. That is, the search hit the constraint of returning only five movies.

Freezing and Thawing

Figure 18A:
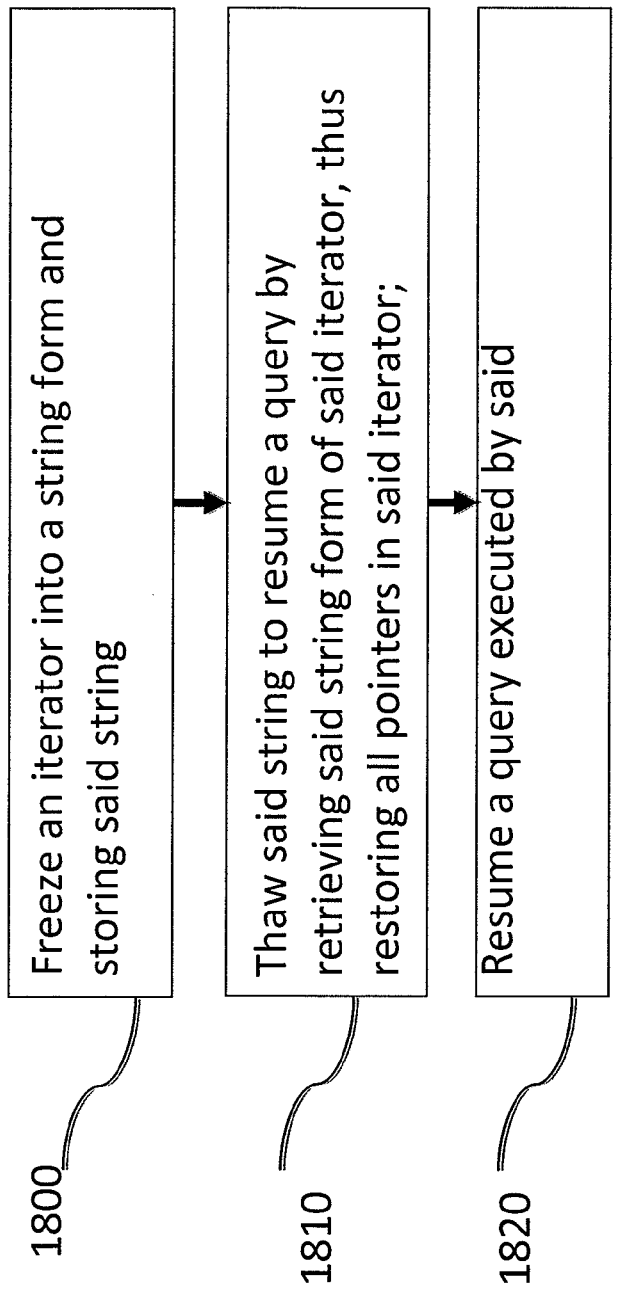
FIGS. 18A-18C are block schematic diagrams showing freezing and thawing according to the invention.
Figure 18B:
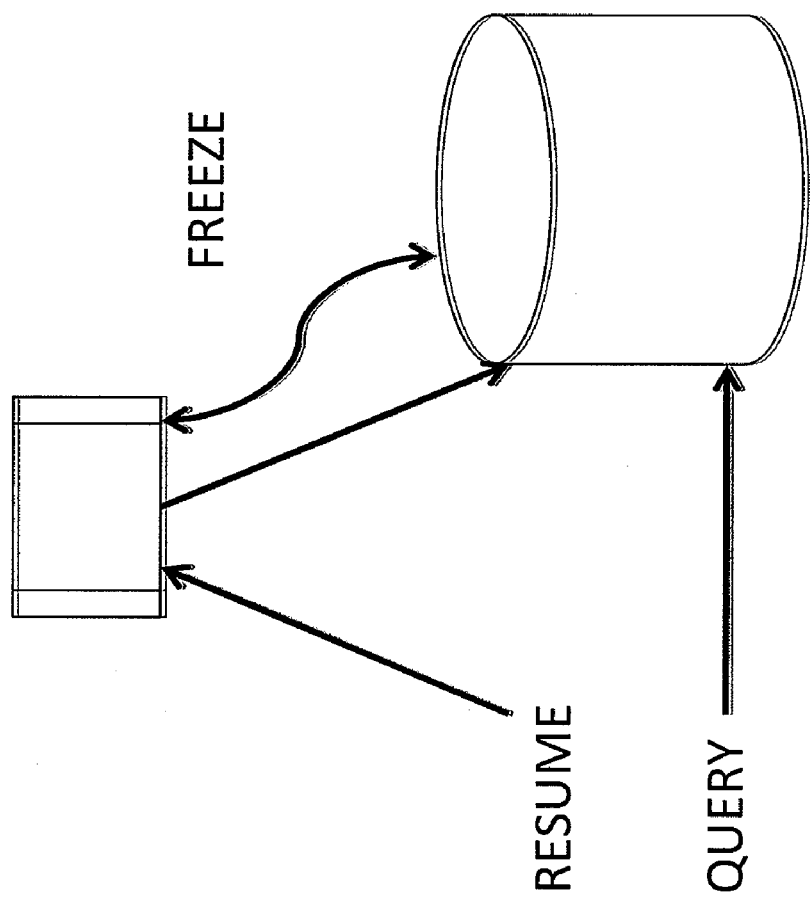
Figure 18C:
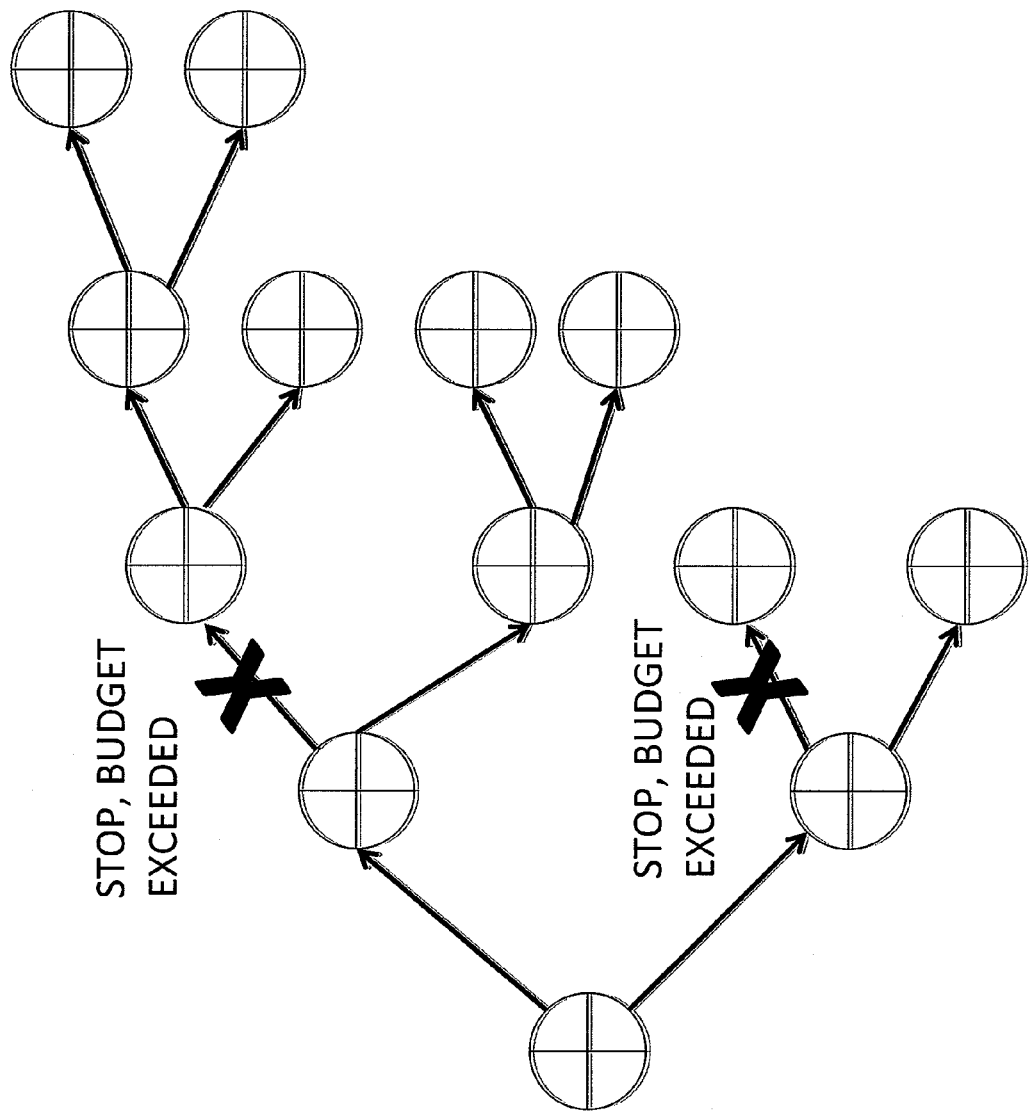

Another embodiment of the invention concerns optimizer freezing and thawing. Optimizers are data structures that are interpreted by code. They contain conduits to the database proper, onto the disk, which is mapped to the memory. Data structures point to the memory, but first come to the mapped disk. This means that if a read does not finish quickly, it blocks write access to the disk because it is not possible to change the data structures while still pointing to them. It is not desirable for any one call to block access by everybody else. In this embodiment, as shown in FIGS. 18A-18C, a scheme is employed to freeze the iterators. That is, the iterators are pickled into string form and then the string is stored somewhere (1800). Then, the system thaws the string later on, once it wants to resume the query (1810). The iterator is thus thawed from its string form back into the iterator shape, restoring all the pointers, and then the system begins running the operation again (1820).

Cursors

Another aspect of the invention concerns the use of cursors. In this embodiment, if it a client desires to get a very large result set from the database, for example all of the people, where there are half a million people in the database, the client would not want them all at once because the client would not want to digest that large an output. It would take too long to give the client the answer and digesting the answer would take too long and require too much memory. One feature in the database in this embodiment, in the example above, returns a desired portion of the total result, such as 100 at a time, or 1,000 at a time. If there are more results available, the system indicates this fact and the client can give the system a token, i.e. a cursor. The cursor mechanism is used to temporarily suspend long-lived accesses. In the example above, the client pulls up 100 results from the result set, and then the query is suspended. During this period of suspension, the users can write keep working in the database. The database is not waiting for the entire result, e.g. 3,000, to be returned to the client. The client gets everything that was in the database when the query was started. If there were 200 people and the client asked for 100 of the 200, then the client receives the 100 plus the cursor. If someone adds one to the database while outputting of the results is suspended, and then the client goes back to the database, e.g. five minutes later, with the cursor to get the other 100 results, the client gets the other 100 results, but only the original 200 results and not item number 201.

This aspect of the invention provides a way of relaxing the consistency guarantee so that many people can use the database at the same time. Thus, a client can take a long time to finish retrieving query results without blocking database access by other people. Thus, this embodiment of the invention provides a load balancing technique that operates by relaxing the consistency guarantee in return for letting many people use the database at the same time. When reading the database, it is not desirable to block other people from writing. What is important to the client at the point that the query is posited is to get the results for the query at that time. If the client retrieves a result of all of the people in the database as of a certain point in time, it is possible to identify the point in time and then, later on, present a query to identify what has been added to the database since the previous query.

Figure 19A:
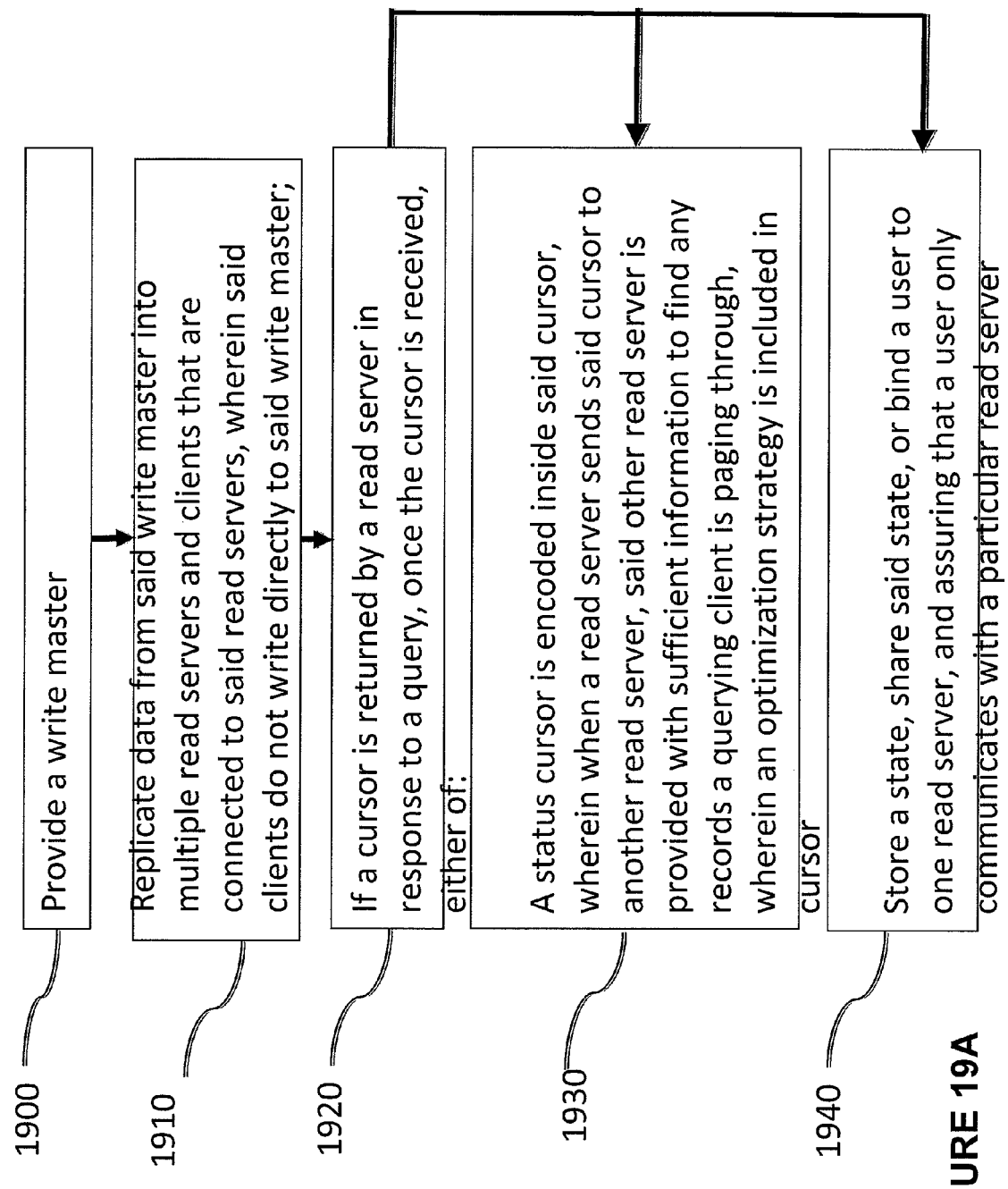

As shown in FIGS. 19A and 19B, a distributed system includes a write master (1900). The data from the write master is replicated out into multiple read servers and the clients connect to the read servers (1910). The clients do not write directly to the write master. They access the database and, if the client writes something, the read server that it is talking to forwards the write through to the write master, which then updates the database. If there is a query and a cursor is returned by any of the read servers (1920), once the cursor is received, one of the next, e.g. 100, read clients that the querying client is paging through might be talking to another read client that did not give the querying party that cursor. At that point, there are two possible strategies:

One strategy provides a status cursor (1930), where all the needed information is encoded inside the cursor, and by sending that cursor to another read server, that other read server is given enough information to find the records that the querying client is paging through. The cursor in this case includes information about the chosen optimization. As discussed above, where resolution of a query involves an optimization, e.g. trying to intersect two sets, one for each query term, there is a contest. In this embodiment, the optimization strategy is rolled up into the cursor so that the strategy can be sent to another read server that did not produce the cursor. The information is based on the database only, it is not based on some internal state of the read server.

The other strategy stores a state (1940), shares that state or binds the user to one read server, and makes sure that the user always talks to that same read server.

One strategy in a presently preferred embodiment of the invention is an opportunistic mix of stateless and stateful. There is a stateless component that insufficient to reconstruct the last operation, and then there is a stateful part that, for the same read server, allows that client go and look more information up that which it has stored. For instance, if the system is in the middle of intersecting large sets of numbers with one another because a query asks for a person who is also a race car driver and born in Monaco, it is necessary to intersect all sets of query-related data. The result set is too large to return to the client. It would take a long time to send it by TCP. It would be a very large and difficult to return to the client in a URL or as an HTTP result. The set could be stored locally for a while, depending upon how much traffic there is. If the client returns to the results, and if not too much time has passed, the client can look the results up and restart the query much more quickly. But if the system loses the results, it takes too long to return them, or the client is talking to a different read server, then the system reconstructs the query, and then resumes it. In a preferred embodiment, there is a GUID of the person type and there is a table of everything that this instance of person leads to, i.e. a table of primitives. The table is only added to at the end thereof. This means that if the present position in the table is known, then that location is valid because, when new primitives are created, their numbers, i.e. their IDs, are larger than those that are already in the table. In this case, the cursor starts at a certain location and thus indicates the position of client in the table. One can go back to a completely different replica halfway through the half million person set mentioned above, and pick up where the process stopped because the read servers all have the same hard set of ID numbers.

Figure 20:
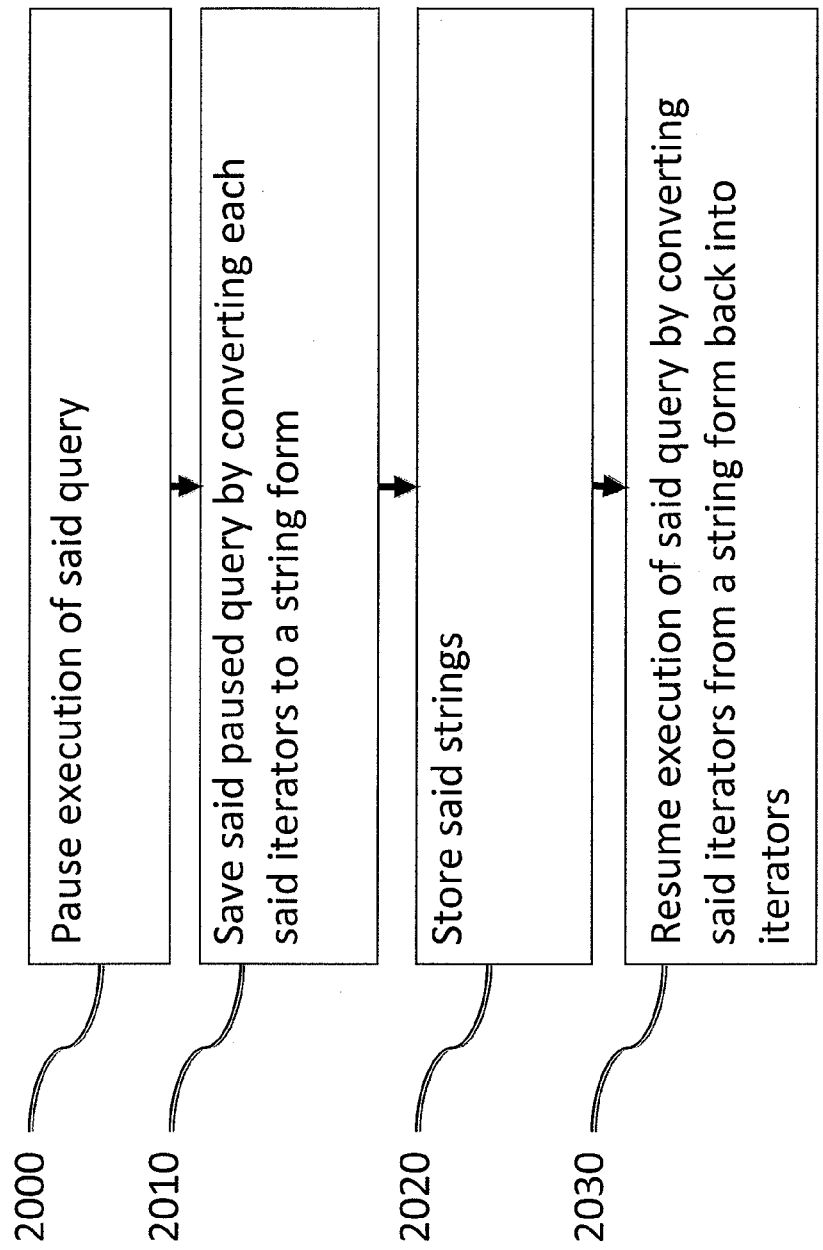
FIG. 20 is a block schematic diagram showing suspended cursors according to the invention.

The notion of suspended cursors is shown in FIG. 20, where a processor pauses execution of a query (2000). The paused query is saved by converting each the iterators to a string form (2010). The strings are stored (2020), and execution of the query is resumed by converting the iterators from a string form back into iterators (2030).

Figure 21:
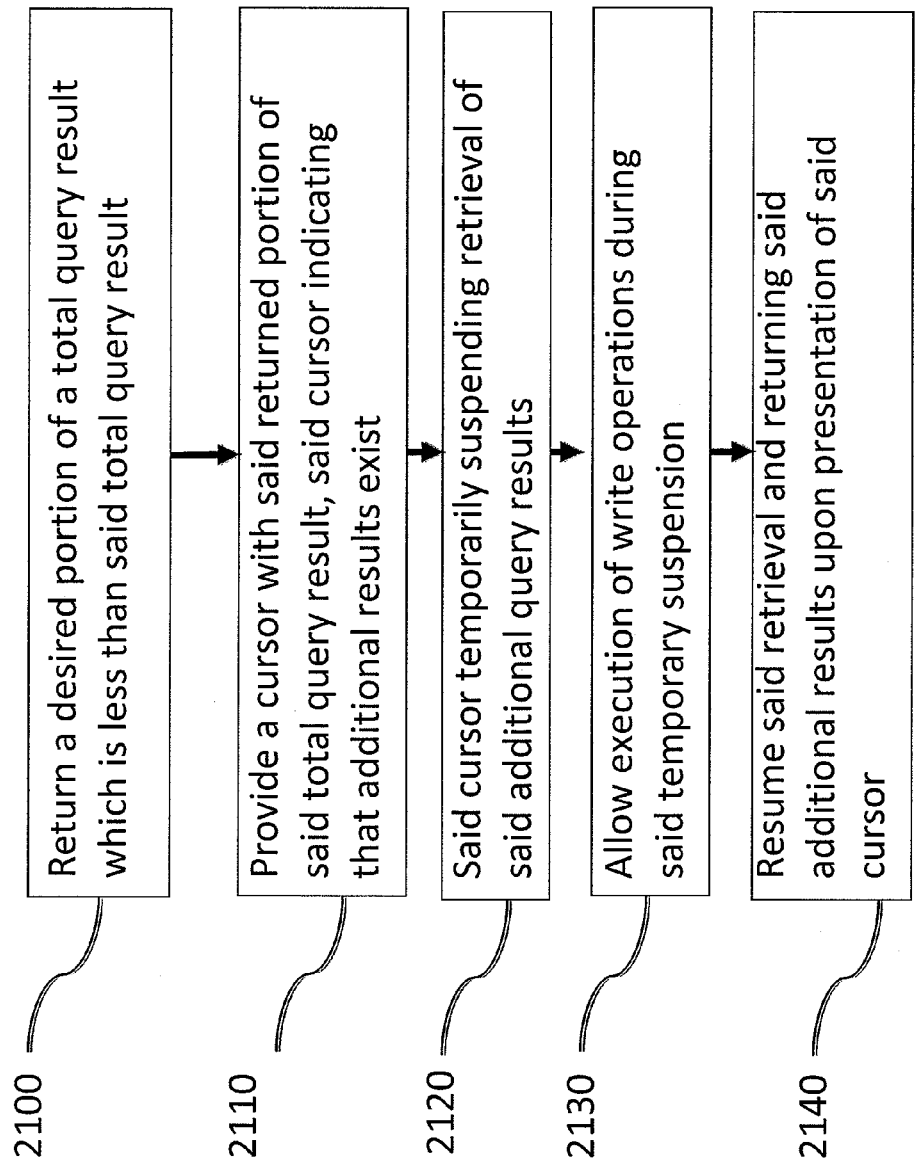
FIG. 21 is a block schematic diagram showing cursor paging according to the invention.

FIG. 21 provides an example of cursor paging, where a processor configured to return a desired portion of a total query result which is less than the total query result (2100). A cursor is provided with the returned portion of the total query result (2110). The cursor indicates that additional results exist. The cursor temporarily suspends retrieval of the additional query results (2120) and execution of write operations is allowed during the temporary suspension (2130). Retrieval is resumed and additional results are returned upon presentation of the cursor (2140).

Figure 22:
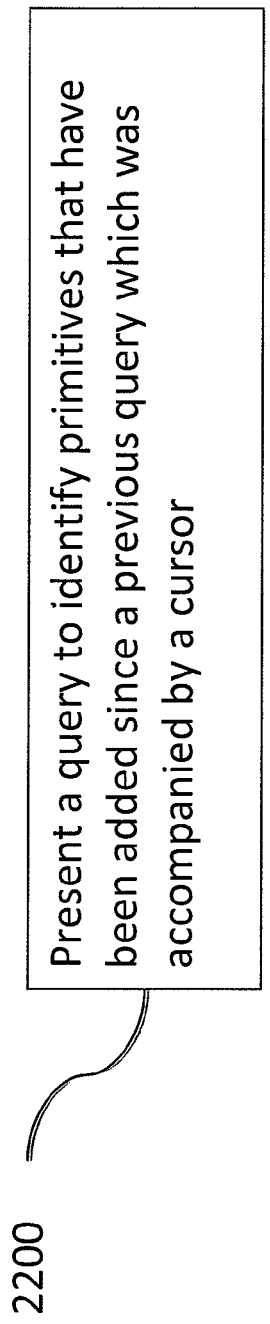
FIG. 22 is a block schematic diagram showing cursors and virtual time according to the invention.

FIG. 22 provides an example of cursors and virtual time. As shown, a query is presented to identify primitives that have been added since a previous query which was accompanied by a cursor (2200).

Scheduler

Figure 23:
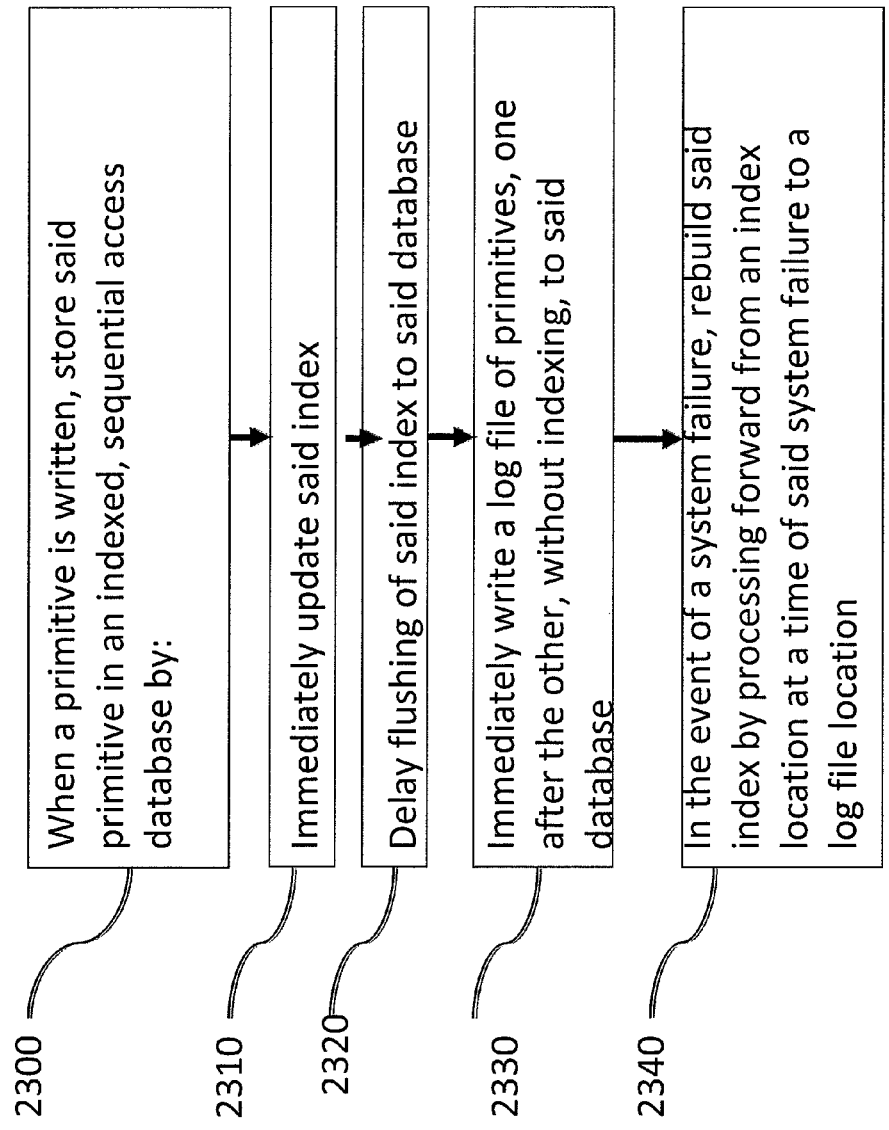
FIG. 23 is a block schematic diagram showing a scheduler according to the invention.

There is a marked difference between what is stored in the database and the indices that are built as a byproduct of loading that up with a particular location in the graph. There is a difference between what is in the data model and what remains in that data model through future versions of the graph, as well as the new location when that data is loaded, which comprises the indices that are made to effect certain kinds of queries. The idea with the indexes is if somebody turns off the power on the machine that the graph is run on, and the graph before that sent an OK reply to somebody who sent in a write, one can turn off the power on the machine at any point after that and still recover that primitive. As shown in FIG. 23, when the primitive is written, it is stored in an index sequential access database that has all the primitives (2300), and at that point the system can recover. Then the indexes are updated (2310). These updates may or may not go through. They may or not actually have hit the disk by the time the power is turned off, but it is known how up to date the indexes are. The indexes are updated in kind of jerky movements—100 things at a time, 200 things at a time—and the system remembers how far it was. For example, one machine may be up to primitive number, e.g. 512, and the primitive table that contains everything is up to 680 from the disk. In this case, it is necessary to take the primitives 513 to 680 and feed them through this mechanism again.

This very basic kind of security allows relaxation in flushing of these indexes to disk. It is still necessary to make sure that the index actually measures how up to date they really are, but this can be done when there is time in the system and with the right primitives. It is not necessary to do that before sending the alternate back, which allows the system to be relatively speedy without losing reliability. In the preferred embodiment of the invention, the index processing happens immediately. What is delayed is the flush of this index of information to disk. Thus, the state of memory is always up to date as long as the server is running, and it can immediately answer queries that require the indexes to be answered. That information only makes it to disk once there is room to write, and that can be delayed. The log file of the primitives, one after the other, without indexing, is written to disk immediately (2330). Then, if there is power loss (2340), it is necessary to go back to flushing the actual indexes to disks so that there is a permanent record of the indexes. It is possible to go back and find that the indexes have only gotten flushed so far, but at a log file, then process from that point forward. It is also possible to rebuild all the indices from scratch.

Uniquely, the graph server as a process has an output buffer for each connection to each client process. This is not a single output buffer. It is an output buffer chain. The client process can have sent multiple quants; the system writes and then gets all the replies back. That is more efficient than doing it one at a time because it is not necessary to wait a whole roundtrip.

At any one point in time, there are many of these time connections. Each time connection has an output buffers chain of character data that waits to be sent back in order to the client. An embodiment of the invention, shown in FIG. 24, attaches a callback to the individual output buffers that is a function pointer to a function within the graph (2400). The callback knows how up-to-date the data should be at this point. The code wrote a reply, indicating that the data are written data to disk, and it knows this if that "OK" goes out, indicated that at least that much data was written to the disk. The process might understand that the system is up to primitive 480; while there is a process that knows it must be up to 512; and there is another process that knows it must be up to 514, and so on.

In this example, the callback must be up-to-date up to 480. It goes to the database proper and it is the database itself that has a similar counter rollover as it writes to disk. The database knows that it is not up-to-date yet. It starts writing everything to disk, waiting for all the data to be identically encoded. Then, it updates its counter to its current state, which might be, for example, 530. At this point, the callback is satisfied because it is now up-to-date. Thus, these characters can get sent to the client. The system is not making false promises anymore, although it was making false promises when it wrote the "OK." It is through the callback that it is possible to guarantee that what was written is, in fact, written.

Even when the writes are completed, the system waits before saying "OK" to make sure that the database is caught up. The system only waits if it remembers where it must be at this point and, if it is not there yet, i.e. if it is not up to where it needs to be, then at that point it writes everything is has. It is not just catching up to its work, but it is doing all the work at that point. Because there is a significant latency in operating systems to flush things to disk, it is more efficient to do all that it is necessary to do at some point in the future. Thus, once the system commits to doing anything, it should do everything. The system must reply to the client. There is a buffer chain with several things in it that have been written, but before it is sent back to the client it is desirable to make certain that it has been written to disk. If it has not been written to disk, then the system writes everything to disk for everything. Thus, the whole buffer chain is written to disk so that now everything is caught up on disk and can be sent out to the client. The client does not have to be worried about things disappearing somewhere in the ether. As soon as the system gets ahead of yourself in what it is about to send to the client, it stops and takes a one-time hit to commit everything.

It is desirable to keep the log file on disk so that if there is a collapse, it is possible to go back and reconstitute the system. The client has to rely on the fact that this has taken place. There is a large collection of 100 million things and people come along and ask questions. When a user performs a query, the user submits a list of constraints. Constraints are expressions that must be satisfied for the query to be satisfied. By import, the user gets back everything that satisfies these expressions. This can be something, such as the value should be Arnold. In this particular case, it is desirable to get back with this query such things as a node, e.g. the Arnold node. In this example, it is necessary to ask about nodes that are pointed to with the left side by nodes with Arnold. That is one thing that is known, i.e. Arnold. Another thing that is known is that it is a person. There can also be another node pointing with its left side to where it is known that the type is an instance of something. It is known that there is a node, and it is known that two things point to it with their lefts. There can be multiple lefts that end in the same place. An aspect of the invention builds up a set of constraints to help find the subset of the primitives that are of interest in a particular case. The primitives encompass value, name, a timestamp, etc. One can stack them or can nest them. In the end, what is desired is a sub-graph in an overall connector database graph of primitives with a specific primitive that it is anchoring to. The query is satisfied when the system finds all of the matching sub-graphs and returns them.

Graph Repository Data Model

This is the data model for the graph repository, as expressed in its access protocols and in guarantees that the repository makes about its internal state. The graph database is a collection of small fixed-sized structures we call "primitives." Dealing with the graph database means creating and querying primitives.

A presently preferred data model is described in detail in Appendix "1" hereto.

Graph Repository Protocol

The graph repository protocol mainly alternates synchronous request from client to server with synchronous replies from server to client.

A presently preferred graph repository protocol is described in detail in Appendix "2" hereto.

Tuple Syntax

When sending tuples back and forth, they are encoded as a space-separated, parenthesized list of values. A presently preferred tuple syntax is described in detail in Appendix "3" hereto.

Template Expression Grammar

This grammar is part of interface requests that match networks of links and nodes in some manner. They're used with the "read" command to access primitives; a variation is used with the "write" command to create new primitives. A presently preferred template grammar is described in detail in Appendix "4" hereto.

Simple Search Expressions

Appendix 5 describes the search expression language for the graph repository's string ~=operator during "read" queries.

The Uncopying Tokenizer

The Uncopying tokenizer is written in such a way to almost never copy the data in query strings. This makes things fast, because it doesn't shuffle data structures about quite as much; it uses less memory; and it uses memory mostly in more efficient fixed block sizes, rather than allocating many small objects.

A presently preferred uncopying tokenizer is described in detail in Appendix "6" hereto.

Concentric Graphs

Appendix "7" hereto addresses a presently preferred design for multiple "concentric" graphd's where one graphd instance contains a superset of the data in another running instance.

Figure 25:
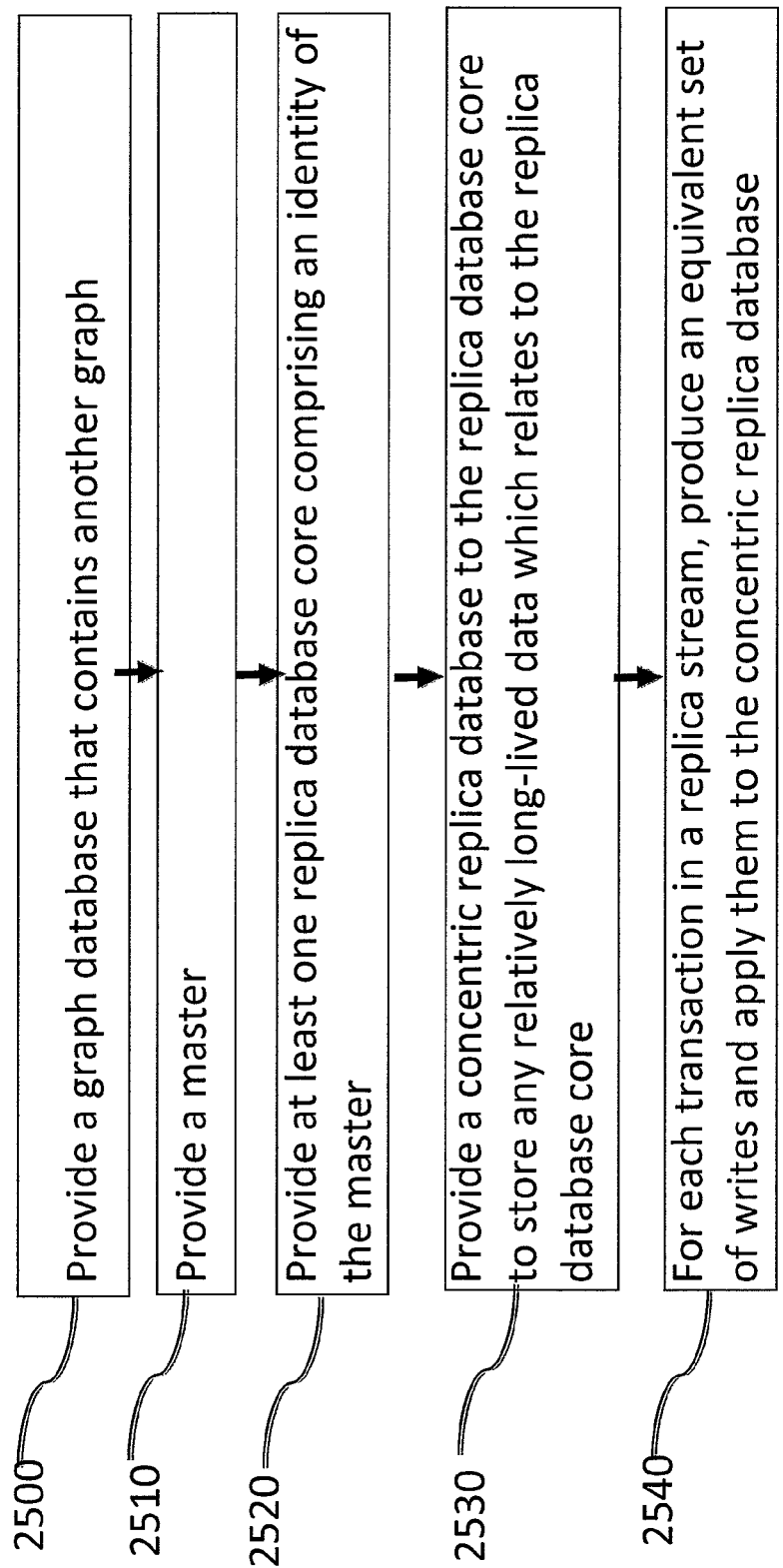
FIG. 25 is a block schematic diagram showing a concentric graph according to the invention.

As shown in FIG. 25, a graph database contains another graph database (2500). A master database is provided (2510) and at least one replica database core comprising an identity of said master database is also provided (2520). A concentric replica database to said replica database core is provided (2530) to store any relatively long-lived data which relates to the replica database core. For each transaction in a replica stream, an equivalent set of writes is produced and applied to the concentric replica database (2540). Thus, the concentric replica database comprises a superset of the master database.

Optimizer

Appendix "8" hereto addresses the optimizer design.

Handling Poison Queries

Appendix "9" hereto addresses the handling of poison queries.

Figure 26:
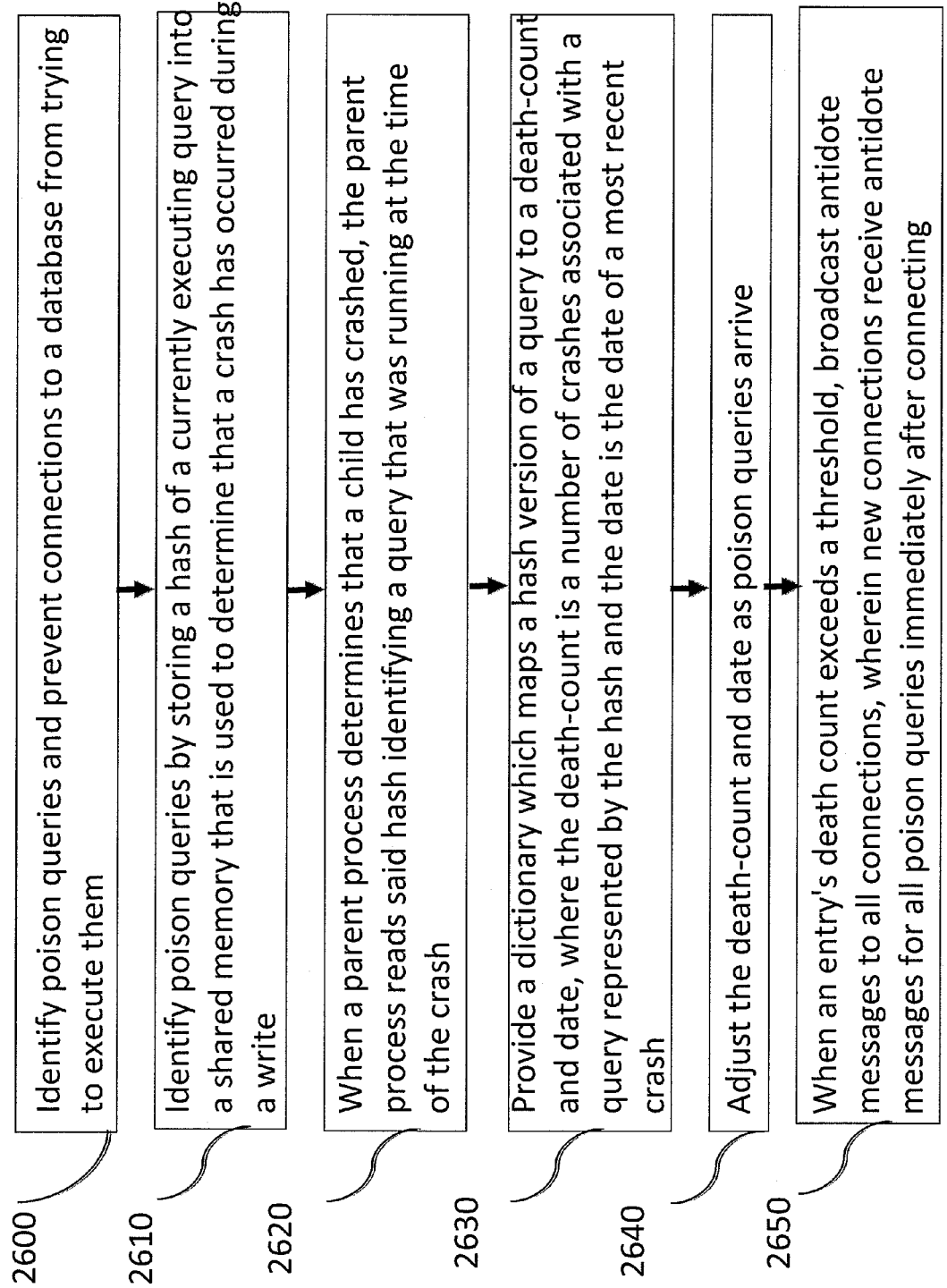
FIG. 26 is a block schematic diagram showing poison queries according to the invention.

As shown in FIG. 26, a method is provided for identifying poison queries and preventing connections to a database from trying to execute them (2600). A processor is configured for identifying poison queries by storing a hash of a currently executing query into a shared memory that is used to determine that a crash has occurred during a write (2610). When a parent process determines that a child has crashed, the parent process reading the hash identifies a query that was running at the time of the crash (2620). A dictionary is provided which maps a hash version of a query to a death-count and date (2630), where the death-count is a number of crashes associated with a query represented by the hash and the date is the date of a most recent crash. The death-count and date is adjusted as poison queries arrive (2640). When an entry's death count exceeds a threshold, antidote messages are broadcast to all connections (2650). New connections receive antidote messages for all poison queries immediately after connecting (2660).

SMP Graph

Appendix "10" hereto addresses a presently preferred graphd design for a multi processor CPU.

Figure 27:
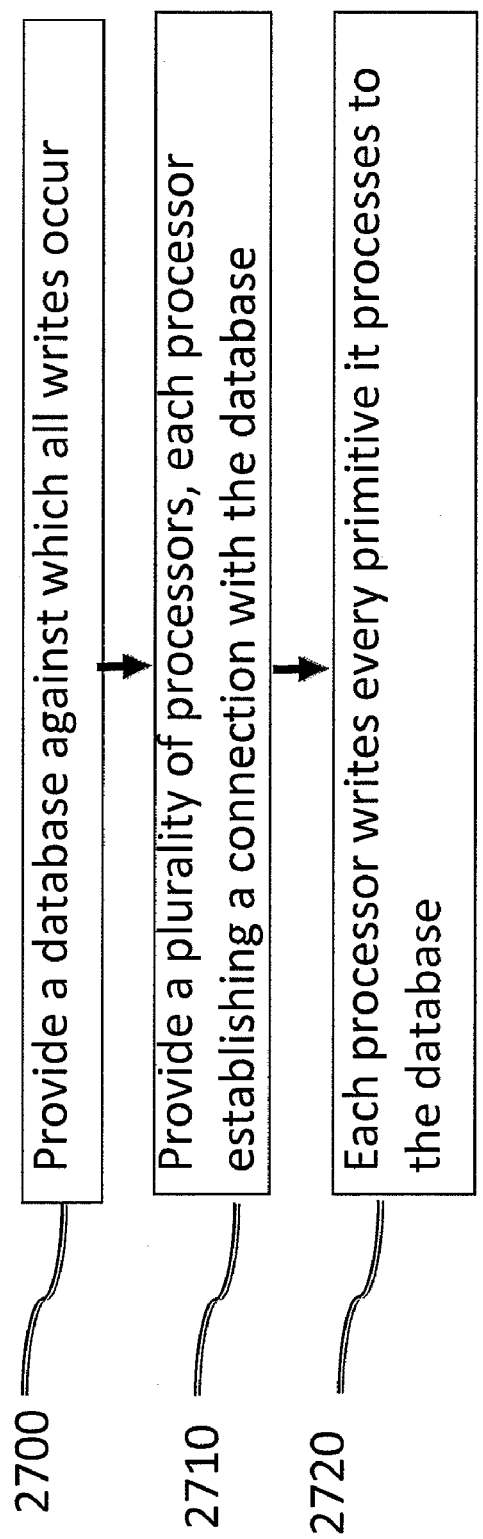
FIG. 27 is a block schematic diagram showing SMP according to the invention.

As shown in FIG. 27, a parallel processing method for a database includes a database against which all writes occur (2700). A plurality of processors are provided, each processor establishing a connection with the database (2710), where each processor writes every primitive it processes to the database (2720).

Machine Implementation

Figure 28:
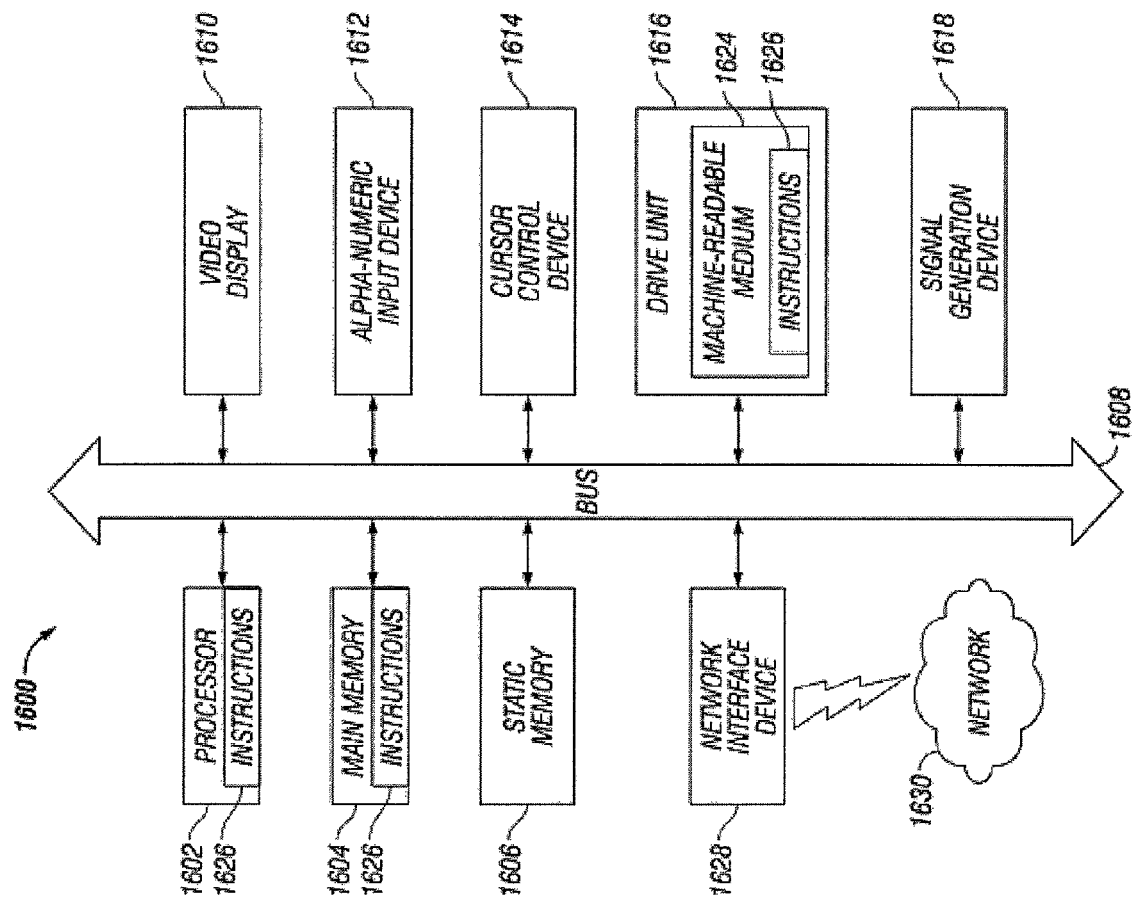
FIG. 28 is a block schematic diagram of a machine in the exemplary form of a computer system within which a set of instructions may be programmed to cause the machine to execute the logic steps of the invention.

FIG. 28 is a block schematic diagram of a machine in the exemplary form of a computer system 1600 within which a set of instructions may be programmed to cause the machine to execute the logic steps of the invention. In alternative embodiments, the machine may comprise a network router, a network switch, a network bridge, personal digital assistant (PDA), a cellular telephone, a Web appliance or any machine capable of executing a sequence of instructions that specify actions to be taken by that machine.

The computer system 1600 includes a processor 1602, a main memory 1604 and a static memory 1606, which communicate with each other via a bus 1608. The computer system 1600 may further include a display unit 1610, for example, a liquid crystal display (LCD) or a cathode ray tube (CRT). The computer system 1600 also includes an alphanumeric input device 1612, for example, a keyboard; a cursor control device 1614, for example, a mouse; a disk drive unit

1616, a signal generation device 1618, for example, a speaker, and a network interface device 1620.

The disk drive unit 1616 includes a machine-readable medium 1624 on which is stored a set of executable instructions, i.e. software, 1626 embodying any one, or all, of the methodologies described herein below. The software 1626 is also shown to reside, completely or at least partially, within the main memory 1604 and/or within the processor 1602. The software 1626 may further be transmitted or received over a network 1628, 1630 by means of a network interface device 1620.

In contrast to the system 1600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complimentary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

APPENDIX "1" GRAPH REPOSITORY DATA MODEL

Graph Repository Data Model

This is the data model for the graph repository, as expressed in its access protocols and in guarantees that the repository makes about its internal state.

SUMMARY

The graph database is a collection of small fixed-sized structures we call "primitives". Dealing with the graph database means creating and querying primitives.

There are two kinds of primitives: nodes and links. A link is like a node, but has two more fields—pointers to a left and a right node.

1. Common Primitive Components

All primitives have the following pieces in common:

1.1 GUID: 128-Bit Integer.

A nonzero, globally unique ID. A primitive that is modified implicitly changes its GUID. (In other words, a GUID completely identifies one "version" of a primitive.)

A GUID has two parts:
a "version" part that is either random or a timestamp;
an "identity" part that stays the same for all versions of a primitive.

(The underlying identity relationship, while persistent, is defined only by the application—two primitives are versions of the same application-thing if and only if the application says they are.)

It is possible for the graph repository to test in short, constant time whether two GUIDs are versions of the same thing.

The version-independent identity fields of objects are the same if and only if the application said so. (That is, those version-independent identity fields are unique, too.)

The graph repository can easily (in constant time) find the current version of any GUID presented to it, even if the primitive owner of the GUID itself no longer exists in the repository.

1.2 Timestamp: 64-Bit Integer.

A timestamp with sub-second resolution.

Each node or link created on one local system has a unique timestamp. Primitives created in sequential synchronous requests have timestamps as one would expect (the one that's created second has a timestamp that is higher than that of the one created first.)

1.3 Type: String.

An arbitrary octetstring that does not contain nullbytes.

Many primitives are expected to have the same type, and the number of types in the system is bounded by the complexity of the system's structure.

The application could standardize on a naming schema that keeps types from different independent applications separate, but the graph repository doesn't enforce that, and there are good arguments for doing that on an object level. (See cvs:graph/doc/gr-type.txt.)

1.4 Name: String.

For the graph repository, that's an arbitrary octetstring that does not contain nullbytes. Many primitives are expected to have the same name.

There are primitives that don't have a name; that's different from having a name that is the empty string (" ").

The name often plays the role of "units" to the value; most of the semantic names given to nodes and links should really be types.

1.5 Datatype: Enumerated Tag.

One of a small number of built-in data types that controls the interpretation of the following value field. There are primitives that don't have a datatype (or a null datatype.)

Datatypes are:
string—an UTF-8 string.
integer—a 64-bit signed integer
float—a floating point value of unspecified precision
timestamp—a 64-bit time stamp value, fit for comparison with primitive's timestamps and use as a boundary in searches
URL—an us-ascii string that encodes a URL, for example an internal URL pointing to a text or data fragment in a nearby repository GUID—a 128-bit internal GUID or null
bytestring—a string of 8-bit bytes that can contain any values, including \0

1.6 Value: Octet String.

The meaning of a value is encoded explicitly in the "datatype" component. The range of values for each type is expected to vary extensively. (I.e. while it's efficient to hash names and types, it may not be efficient to hash all values, and its number is bounded by the number of nodes and links in the system, not by the system's complexity.)

Primitives don't have a value if and only if they also don't have a datatype.

1.7 Archival: Boolean.

If true, the rest of the information in the primitive encodes user input and should be archived. (This is the default.) If the flag is set to false, the information has been algorithmically derived from other information in the graph and should not, or need not, be archived.

The opposite of "archival" is called "ephemeral".

1.8 Live: Boolean.

If true, the rest of the information in the primitive is part of the current database state. (This is the default.) If the flag is set to false, the entry is a "tombstone", merely taking the place of an entry that was there previously and that has been deleted.

(That is, all it does is announce to the world that it is no longer valid.)

Entries without the "live bit" are by default filtered out of queries, but when mirroring systems or subscribing to updates, they are useful in announcing to a listener that a primitive is no longer part of the application's idea of reality.

The opposite of "live" is called "deleted".

1.9 Scope: GUID

A pointer to a node of a special type—admin.scope—that defines the access privileges for this primitive.

Scopes can refer to other scopes in a strict hierarchy, but each primitive is in exactly one scope.

2. Link Components

In addition to the common pieces, links also contain the following:

2.1 Left, Right: 128-Bit Integers

If non-zero, the integers are GUIDs intended to refer to other primitives. The link is thought of as "connecting" those primitives.

Depending on the nature of the link, there may be a semantic to the directionality (e.g., is-parent-of) or not (are-friends).

When directionality is not implied by a link, the link is still directional in the database, but queries that use it will specify expressions that allow links to go in one or the other direction. (E.g., using the "<->" meta-constraint syntax.)

The left GUID must be non-zero. The right GUID may or may not be zero.

APPENDIX "2" GRAPH REPOSITORY PROTOCOL

Graph Repository Protocol

1. Intro

This is the functional specification of the protocol used to access the graph repository.

The protocol mainly alternates synchronous request from client to server with synchronous replies from server to client.

```
request:
        read-request
    / write-request
    / dump-request
    / restore-request
    / cancel-request
    / set-request
    / status-request
    / replica-request
    / replica-write-request
    / sync-request
reply:
        read-reply
    / write-reply
    / dump-reply
    / restore-reply
    / cancel-reply
    / error-reply
    / set-reply
    / status-reply
    / replica-reply
```

The server can also asynchronously notify a client about an error that leads to it shutting down, but that's going to be seen as an error response to the next command by the client.

(However, smart clients that are able to deal with incoming asynchronous notifications from the server can notice that early and recover from a server restart without causing a delay visible to the user.)

1.1 Request Boundaries

Requests and responses are terminated by a newline outside of a string literal or a parenthesized list.

1.1.1 Pipelining

Requests can be pipelined. Unless the application semantics demand it, a request submitter does not have to wait to receive a reply before submitting the next request. Nevertheless, replies do arrive in the order of requests; to break up requests with large responses, use paging.

1.1.2 Spanning Transport Boundaries

Requests can span message boundaries of the underlying transport system. A request or reply can be larger than what one "write" call to a TCP connection can dispose of without blocking.

The system can impose a maximum request or response size.

2. Errors

Any request can result in an error on a couple of different levels. The request may have been syntactically incorrect; the user may have exceeded their allowance in storage time or space; the repository may be shutting down; etc.

Errors are sent to the client in two parts: a machine-readable code, and a more detailed human-readable error message filling in details of the code.

```
error-reply:
        "error" error-label reply-modifiers string
error-label:
        "BADCURSOR"
    / "COST"
    / "VIRTUAL TIME"
    / "EMPTY"
    / "EXISTS"
    / "NOTREPLICA"
    / "OUTDATED"
    / "READONLY"
    / "RESTORE"
    / "SEMANTICS"
    / "SHUTDOWN"
    / "SYNTAX"
```

```
            / "SYSTEM"
            / "TOOBIG"
            / "TOOMANY"
        string: <double-quoted string>
```

Error labels and their meanings:
badcursor
    the cursor parameter in a request could not be decoded.
cost
    the allowance specified in the cost=".." parameter was exceeded by the request.
virtual time
    a virtual time parameter includes an instance ID that doesn't match that of the database.
empty
    a request didn't match anything, or referenced primitives that don't exist.
exists
    a write request had "unique" constraints that conflicted with existing primitives.
notreplica
    an operation that only makes sense on a replica server has been attempted on a non-replica server
readonly
    access to the server has been set to read-only.
restore
    access to the server has been set to restore-only. The client should retry its request after a few seconds.
outdated
    a write( ) is trying to version a GUID that has already been versioned by another write( ).
shutdown
    the system is being shut down; reconnect after a little while. The client should disconnect and try to reconnect after a few seconds.
syntax
    the request was syntactically wrong.
system
    notify the server's system administrator.
toobig
    a primitive the server tried to write was too big, or one of the strings involved in the primitive were too long to be encoded.
    Currently, the primitive size limit is about 32 k, but details depend on the amount of compression for one primitive.
    Value strings up to 4 k, and name strings up to 200 bytes, should never present a problem.
toomany
    the number of matching primitives exceeded a specified maximum count 3. Request Modifiers Certain parameters can be set on any request. They're specified as an optional space-separated list after the request's verb.

```
request-modifiers:
        request-modifier request-modifiers
        / request-modifier
request-modifier:
        "timeout" "=" seconds
        / "id" "=" atom
        / "virtual time" "=" string
        / "asof" "=" ( string / guid / timestamp )
        / "cost" "=" string
        / "loglevel" "=" ( loglevel / "(" loglevels ")" )
loglevels: loglevel loglevels / ""
loglevel: "verbose" / "debug" / "detail"
        / "info" / "fail" / "overview" / "error" / "fatal"
        / "tile" / "query" / <other module-specific loglevels>
        ; "spew" is an alias for "verbose".
seconds:
        +digits
```

Request modifiers and their meanings:
asof
    Read-accesses happening in the course of this request should be executed as if the database had the indicated virtual time.
    The virtual time can be specified in three ways:
        a string virtual time, as returned by the virtual time request modifier, below.
        a GUID; the read-access is executed as of the state just after the primitive had been added to the system.
        a timestamp; the read access is executed as if it were the time of that timestamp.
    (In order for the last one to work, timestamps of primitives added to the repository later must be greater than timestamps of primitives added earlier.)
cost
    Request that the cost of the request be reported, and (optionally) place a limit on the amount of work the request can take.
virtual time
    Request a virtual time result, and demand an up-to-date server reply.
    The "virtual time" is a compound "odometer reading" that characterizes how up-to-date a server is. It is useful in ensuring consistency between "read" and "write" requests in a distributed system.
    A client that writes can ask for a virtual time to be returned (by passing in virtual time=" "). It saves that virtual time, and then reuses it in a "read" request that follows the "write". Even if the "read" request hits a server other than the one that received the "write", the virtual time has enough information to allow the server to judge whether it is "behind", and to cause it catch up if needed.
id
    The request can be cancelled by executing a cancel request with the same id. Its response will have the same "id=" modifier that was sent in the request.
loglevel
    While processing the request, increase the server loglevel to the specified levels. The keywords for the loglevels are the same as for the server "log-level" configuration parameter.
timeout
    If the request ends up taking longer than <seconds>, the system makes a best effort to return a timeout error and partial results.

4. Reply Modifiers

Certain parameters can be set on any reply. They're specified as an optional comma-separated list after the reply's data.

```
reply-modifiers:
        reply-modifier
        / reply-modifier reply-modifiers
```

```
reply-modifier:
        "redirect" "=" url
        / "timeout"
        / "id" "=" atom
        / "cost" "=" string
        / "virtual time" "=" string
```

Reply modifiers and their meanings:
redirect
  The server says: for this kind of query, you should really connect to the other server at "url"
virtual time
  The value of this modifier can be handed to a server to request that it be at least this up-to-date before attempting to fill a request.
timeout
  The request timed out. The results may or may not be partial.
id
  The request that this is a reply to was tagged with this id. Currently, replies correspond synchronously to requests. (They come back in the order the requests were received.) If we ever introduce an asynchronous modifier that allows replies to overtake each other, this will be needed.
cost
  The true cost of the request. The string contains a space-separated list of name-value pairs.

| | |
|---|---|
| tu | time/user, number of milliseconds graphd spent executing in user mode while computing the answer to this request. |
| ts | time/system, number of milliseconds graphd spent executing in system mode while computing the answer to this requests. "Executing in system mode" almost always means "reading a lot of data from disk". |
| tr | time/real, number of milliseconds graphd spent executing to answer this query in general. This number will get larger on a system that is busy with other things, even if graphd isn't involved in them. |
| te | time/end-to-end, number of milliseconds from parsing the quest to formatting its result. Unlike "tr", "te" includes time the request was suspended while the server was working on completely different requests. In an idle server, "tr" is very close to "te". In a busy server, "tr" should stay the same, and "te" should go up. |
| pr | page reclaims, a benevolent form of page fault that doesn't actually do any work because the page is still in the local cache. |
| pf | page faults, the thing we're trying to minimize. Higher pf will usually be accompanied by a higher ts. |
| dw | primitive data writes. Usually, these will be what you expect, except for queries that create implicit type links and type system fragments. |
| dr | primitive data reads—how many single primitive structs were read from disk (for example, as part of dismissing them as candiates for a qualified search). |
| in | index size reads—how many indices were looked up with their starting address and size. |
| ir | index element reads—how many times a single id was read from an index. |
| iw | index element write—how many times an element was added to an index. |
| va | value allocations—how many times a (possibly temporary or transient) result data structure was allocated |
| ma | memory allocations (in bytes)—how many bytes are allocated at the end of the request |
| mm | memory maximum (in bytes)—the largest number of bytes allocated for the request at any one time |
| mt | memory total (in bytes)—all allocations added up, disregarding calls to free or implied frees through realloc. |
| fa | fragment allocations—how many chunks of memory are allocated at the end of the request. One call to malloc( ) creates one fragment. |
| fm | fragment maximum—how many chunks of memory are allocated at most at any one time. |
| ft | fragment total—how many calls were made to allocate request-specific memory, disregarding calls to free it up? |

5. Read
  read-request:
    "read" [request-modifiers] template
  For the template-grammar, see cvs:graph/doc/gr-template.txt
  read-reply:
    "ok" [reply-modifiers] list-tuple
  The data returned by the list request is a list of lists and scalars. The meaning of the list elements depends on the result=clause in the template request; see cvs:graph/doc/gr-template.txt, section 14.1.

```
list-tuple:
        "(" [tuples] ")"
tuples:
        tuple tuples
        / tuple
tuple:
        literal-part
```

6. Write
  The write request is similar to the read request, with certain restrictions and changes to the template.
    write-request:
      "write" [request-modifiers] literal-expression
    GUIDs of new primitives are returned as a tuple.
    write-reply:
      "ok" [reply-modifiers] tuple
  6.1 Write Templates
  The syntax used to write is a closely restricted subset of the syntax used to read.
    literal-expression:
      "(" [literal-parts] ")"
  Write templates do not have instructions associated with them.

```
literal-parts:
        literal-parts literal-part
        / literal-part
literal-part:
        meta-literal
        / guid-literal
        / timestamp-literal
        / valuetype-literal
        / string-literal
        / numeric-literal   ; not yet implemented
        / primitive-literal
        / linkage-literal
        / live-literal
        / archival-literal
```

```
        / unique-literal
        / key-literal
        / comparator-literal
```

6.1.1 Meta Literal

Like meta-constraints (see gr-template.txt section 2), but without "any".

```
        meta-literal:
                "->"
                / "<-"
                / "node"
```

The default meta literal is "node"; it is meaningless and might as well be omitted.

6.1.2 Valuetype Literal

When writing, valuetypes and datatypes are completely synonymous. ("Datatype" is the old, symbolic notation; valuetype is the new, numeric notation.)

Both accept small integers in the range 1 . . . 255 and the symbolic datatype names null(1), string(2), integer(3), float (4), guid(5), timestamp(6), url(7), bytestring(8), Boolean(9).

(It is a good idea to switch to using the numbers, rather than the symbolic names, but both work.)

```
        valuetype-literal:
                "valuetype" "=" valuetype
                / "datatype" "=" valuetype
        valuetype: "string"
                / "integer"
                / "float"
                / "timestamp"
                / "url"
                / "guid"
                / "bytestring"
                / "Boolean"
                / "null"
                / <a small integer between 1 and 255.>
```

If neither a value nor a valuetype is specified, the valuetype defaults to "null", or 1. If a value is specified in an insert request, but no valuetype, the valuetype defaults to "string", or 2.

Other than that, value types do not influence the behavior of graphd with respect to the values in any way. They are not evaluated when comparing values or matching them. For all practical purposes, they are simply a small integer that is stored in the primitive for arbitrary use by the application.

6.1.3 GUID Literal

```
        guid-literal:
                "guid" "=" guid
                / "guid" "~=" guid
```

Written like a guid-constraint, i.e. "guid=123.." or "guid ~=123.."

If a GUID constraint is present in a "write" request, the newly written primitive is intended to version, that is, to implicitly delete and take the place of, another primitive.

If the operator is =, the most recent version of the primitive must be the one with the specified GUID. If the operator is ~=, the specified GUID may have been replaced by another primitive in the mean time (and that one, in turn, by others); whatever the most recent primitive in this lineage is versioned.

(In other words, = is pessimistic, ~= is opportunistic, to race conditions. If someone else has gotten in the meantime and versioned things, = fails, while ~= will just quietly do the right thing.)

If no GUID is specified, the system generates a new GUID. The new GUID will not match any other existing GUID when compared with ~= or =.

6.1.4 Timestamp Literal

Similar to timestamp-constraints, but only real timestamps are allowed as literals (not the "generational" operators "newest" or "oldest"). The only possible operator is "=".

```
timestamp-literal:
        "timestamp" "=" timestamp
timestamp:
        y?yyyy ["-" mm ["-" dd ["T" hh [":" mm [":" ss ["." +n ]]]]]] ["Z"]
```

Unspecified parts of the timestamp are set to the minimum allowed by the type. (I.e. 1 for months and days, 0 for hours, minutes, seconds.)

If no timestamp literal is supplied for a tuple, it defaults to the current time.

The timezone is optional; if it is supplied, it must be "Z", standing for UTC.

6.1.5 String Literal

Similar to string-constraints, but without matching. The specified string is simply assigned.

```
        string-literal:
                literal
                / stringexpression "=" literal
        stringexpression:
                "type"
                / "name"
                / "value"
```

If there's no stringexpression=prefix, it defaults to "type=". (In other words, (person) creates a new node of type person.)

If an "url" string literal is specified, the datatype is implicitly forced to "url". It is an error to both have a "url" string literal and a datatype other than "url".

6.1.6 Primitive Literal

Like primitive-constraints, primitive-literals recursively specify groups of links or nodes that are implicitly connected to their containing expression.

```
        primitive-literal:
                "(" "<-" linkage [literal-parts] ")"
                / [ linkage "->" ] "(" [literal-parts] ")"
        linkage: "left"
                / "right"
                / "scope"
                / "typeguid"
```

The linkage→ or ←linkage specifies how the containing and the contained primitive are connected. It can be omitted once if the outer primitive is tagged with "→" or "←" (which implies a form of attachment between outer and inner primitive.)

6.1.7 Flag Literal

Flag literals concern flags set for the primitive. There are two flags, "archival" and "live". Both are "true" by default.

```
live-literal:
    "live" "=" bool
archival-literal:
    "archival" "=" bool
bool:  "true" / "false"
```

By default, entries are considered archive-worthy. By default, they're also intended as data additions to the database state, not as markers for deleted records.

6.1.8 Linkage Literal

This is similar to 6.1.6 Primitive Literal, but only connects the primitive to an existing other primitive with a given GUID, without actually creating that primitive.

```
linkage-literal:
    linkage "=" guid
    / linkage "~=" guid
```

It is an error to specify a left (source) guid for a "←" link that encloses a primitive or a "→" link that is not at the outermost level. It is an error to specify a right (destination) guid for a "←" link that isn't at the toplevel, or for a "→" link that contains other primitives.

6.1.9 Uniqueness Literal

The uniqueness literal places a restrictions on the write expression that contains it. If the part of a write expression that is tagged with a "unique=" modifier already exists at the time the write request is executed, the write request fails.

```
unique-literal:
    "unique" "=" "(" [unique-instruction-items] ")"
    / "unique" "=" unique-instruction-item
unique-instruction-items:
    unique-instruction-item unique-instruction-items
    / unique-instruction-item
unique-instruction-item:
    "name"
    / "typeguid"
    / "datatype"
    / "value"
    / "left"
    / "right"
    / "scope"
    / "timestamp"
```

Note that in spite of similar grammar to the "result" instruction, uniqueness checks are limited to a smaller set of features.

The unique modifier has two effects: it turns on the existence-testing as a precondition for the write to succeed; and it specifies what it means for something to "already exist"—do the type and name have to match? Type, name, and value? Just the value?

6.1.9.1 Use of Unique to Construct Namespaces.

The normal use of unique is in the construction of namespaces. Each namespace has a well-known headnode.

Unique labels are implemented as links between the named object and the namespace headnode. When inserting the links, they are inserted with a unique qualifier that includes the namespace and the value; expressing that the value has to be unique within the namespace.

6.1.9.2 Unique Clustering

Uniqueness expressions can stretch across multiple primitives.

Any group of primitives that
(a) are connected to each other,
(b) are all tagged with "unique" in some way,
(c) and whose unique tags include the links between them are one "unique cluster" that can independently match or fail.

6.1.9.2.1 Example: A Cluster with Two Primitives

The command
write (name="Pat" unique=right right→(name="Kim" unique=name))

contains a single unique cluster, made up of the nodes tagged Pat and Kim. Pat and Kim both have unique tags, and the link between them is part of Pat's unique set.

6.1.9.2.2 Example: Separate Clusters

If I swap Pat's "unique" feature set from "right" to "name"
write (name="Pat" unique=name right→(name="Kim" unique=name))

I get two clusters. Pat and Kim must both be unique, but their connection—Pat's right—isn't part of Pat's unique set.

6.1.9.2.3 Effects of Clustering on the Outcome

Given the database created by
write (name="Pat")
write (name="Kim")
the write in example 6.1.9.2.1 succeeds, but the one in 6.1.9.2.2 fails. The first write was matching a complete cluster of Pat→Kim; the second write was matching Pat and Kim individually, and would then have connected the results.

6.1.10 Key Literal

Key literals, used only in write requests, help roll a familiar sequence of operations into one: a "read" to see if something is already there, a versioning of the old or insertion of a new value with a "unique" modifier, and a final "read" to get the new GUIDs of the destination.

```
key-literal:
    "key" "=" "(" [key-instruction-items] ")"
    / "key" "=" key-instruction-item
key-instruction-items:
    key-instruction-item key-instruction-items
    / key-instruction-item
key-instruction-item:
    "name"
    / "typeguid"
    / "datatype"
    / "value"
    / "left"
    / "right"
    / "scope"
    / "timestamp"
```

The key literal designates those parts of a template that identify a location in the graph (an "lvalue"); the remainder of the template describes the state that the caller wants that location to have, with the understanding that insertion, versioning, and partial addition can be used to bring about that state.

If there's no primitive that matches the "key" constraint, the "write" call inserts the primitive, just as a write call without key constraint would.

If the primitive exists with all the values just as described in the "write" call, the call returns the GUID of the existing primitive.

Finally, if the key fields match, but some of the rest don't, the "write" call makes the minimal set of versioning changes and additions needed to bring about the desired state, and returns the set of GUIDs from the finished mix of old, versioned, and new.

6.1.10.1 Key Clusters

Key primitives cluster just like unique primitives. Each cluster contains the largest possible connected group of primitives that each have keys and are connected with links that are covered by keys. If a read query built from the cluster parts matches, the cluster matches, and will either version or just reuse the primitive network. (Each member of the key cluster versions its own corresponding member of the matched set, if needed.)

6.1.10.2 Pointed-To Unkeyed Expression Clusters

If a keyed primitive points to an unkeyed primitive, and that unkeyed primitive and those it points to already exist in the requested form in the database, the unkeyed primitive is not created over again if the pointing, keyed, primitive exists.

6.1.10.3 Keys and ~= Don't Mix

Because keys already imply versioning of a previous match, keys cannot occur in graphd constraints that also contain ~=GUID literals.

6.1.11 Comparator Literal

The comparator literal influences the way unique- or key comparators compare values while checking for existence of a value. Its syntax is exactly the same as the comparator constraint syntax.

```
comparator-literal:
    comparator-constraint
```

See gr-template.txt for details.

7. Cancel

```
cancel-request:
    "cancel" request-modifiers
```

A "cancel" request is an announcement from the client that it will not parse (i.e., throw away, skip) the results.

It gives a server that is in the middle of calculating a reply leeway to stop calculating it and just send a perfunctory "ok" or "error" response, and a server that is in the middle of formatting the response to a reply leeway to stop formatting it, close the string it is currently formatting (if any), and terminate the reply with a single newline. The reply does not have to be syntactically correct or a complete list.

8. Connection Establishment

When a client connects to the server, there's a brief handshake period in which they both agree on their respective identities, transport layer protection, and protocol versions. [Needs filling in.]

9. Status

A "status" request asks various modules in the graphd interior for information about their status and operation. This is intended as a testing and monitoring tool; the operations should be fast enough to not significantly affect server speed or functioning.

```
status-request:
    "status" [request-modifiers] "(" status-request-items ")"
status-request-items:
    status-request-item status-request-items
    / "
status-request-item:
    "access"
    / "connection" / "connection" / "conn"
    / "core"
    / "database" / "db"
    / "diary"
    / "loglevel"
    / "memory" / "mem"
    / "replica" / "rep"
    / "sync"
    / "version"
status-reply:
    "ok" [reply-modifiers] "(" status-reply-items ")"
status-reply-items:
    status-reply-item status-reply-items
    / "
```

The items in the connection reply occur in the order of the corresponding keywords in the request.

```
status-reply-item:
    status-access-reply
    / status-connection-reply
    / status-core-reply
    / status-database-reply
    / status-diary-reply
    / status-loglevel-reply
    / status-memory-reply
    / status-replica-reply
    / status-sync-reply
    / status-version-reply
```

9.1 Connection Reply

The connection reply is a parenthesized list of per-connection data, one for each connection (or "session") to the server.

```
status-connection_reply:
    "(" status-connection-reply-items ")"
status-connection-reply-items:
    status-connection-reply-item status-connection-reply-items
    / ""
status-connection-reply-item:
    "("
        <"> <ip-address> ":" <port> <"> ; the peer's IP address
        <"> ("status" / "read" / "write" / "connect") <">
                                   ; the most recent action
        <"> ("RUN" / "I/O" / "MEM") <">; what is it waiting for?
        timestamp         ; start time, in GMT
        timestamp         ; most recent action, in GMT
        number            ; bytes received
        number            ; bytes sent
        number            ; requests received
        number            ; requests sent
        number            ; milliseconds computed
        string            ; the full command
        number            ; session-id
        number            ; request-id
    ")"
```

9.2 Database Reply

The database reply is a parenthesized list of name/value pairs. For their meaning, consult the gstatus.1 manual page.

```
status-database-reply:
    "(" status-database-reply-items ")"
status-database-reply-items:
    status-database-reply-item status-database-reply-items
    / ""
status-database-reply-item:
    "(" status-database-name status-database-value ")"
status-database-name:
    string
status-database-value:
    string
```

9.3 Memory Reply

The memory reply is just a list of strings; the strings are produced by the memory trace module of graphd, if graphd is started with the "-t" option. Otherwise, the memory reply is null.

```
status-memory-reply:
        null
        / "(" status-memory-reply-items ")"
status-memory-reply-items:
        status-memory-reply-items status-memory-reply-item
        / ""
status-memory-reply-item:
        string
```

The strings internally have a form dictated by the memory trace module (cm_trace( )); typically, something like 0x5cf7d8[4168], allocated "srv-buffer-pool.c", line 243

9.4 Access Reply

The access reply lists the current global server access level, as set with the "set" command.

```
status-access-reply:
        access-option          ; see section 12, "Set"
```

9.5 Loglevel Reply

The loglevel reply lists, as a parenthesized list, the loglevels and -facilities currently in effect.

Note that if the status reply comes from a session that has a session specific loglevel, that loglevel, not the server-global level, will be returned.

```
status-loglevel-reply:
        "(" loglevels ")"
```

9.6 Core Reply

A Boolean value, indicating whether the server is currently inclined to dump core on programmer error or not.

```
status-core-reply:
        bool
```

The value can be changed with the "set" command.

9.7 Sync Reply

A Boolean value, indicating whether the server is currently guaranteeing that any data has been saved to permanent storage when a command returns.

```
status-sync-reply:
        bool
```

The value can be changed with the "set" command.

9.8 Cost Reply

A string value. The string is a (possibly empty) series of space-separated name=value pairs. The names are the same as in the "cost" request parameter; where present, they define global limits for any request in the system.

```
status-cost-reply:
        string
```

The value can be changed with the "set" command.

9.9 Version Reply

A string value. The string is a the "build version" of graphd. The detailed syntax depends on the build system; currently, it is "gd/trunk/graph/src:8439:8454M", that is, the significant parts of the svn URL, followed by the svnversion output for the graphd build root.

9.10 Replica Reply

```
status-replica-reply:
        "("
                "(" master-address master-peer ")"
                "(" write-address write-peer ")"
                "(" replica-peer-list ")"
        ")"
master-address:
        "address url"
        / ""
master-peer:
        "peer address"
        / ""
write-address:
        "address url"
        / ""
write-peer:
        "peer address"
        / ""
replica-peer-list:
        "peer address" replica-peer-list
        / ""
```

Any empty peer address string indicates that the corresponding connection does not exist. An empty address url string indicates that the corresponding address has not been configured.

10. Dump

A dump request saves contents from the local database in a textual form, fit for use with a later "restore" command.

```
dump-request:
        "dump" [request-modifiers] "(" dump-constraints ")"
dump-constraints:
        dump-constraint dump-constraints
        / ""
dump-constraint:
        "start" "=" startstate
        / "end" "=" endstate
        / "pagesize" "=" localstate
startstate:
        localstate
endstate:
        localstate
localstate:
        number
dump-reply:
        "ok" [reply-modifiers] database-state
database-state:
        "(" dump-version startstate endstate dump-tuples ")"
dump-version:    <"> "2" <">    ; the string "2".
dump-tuples:
        dump-tuple dump-tuples
        / ""
dump-tuple:
        error-tuple
        / record-tuple
error-tuple:
        "(" string ")"
record-tuple:
        "(       guid
                 guid                    ; typeguid
                 ("null" / string)       ; name
                 datatype
                 ("null" / string)       ; type
                 ("0" / guid)            ; scope
                 bool                    ; live
                 bool                    ; archival
```

```
            timestamp
            ("0" / guid)          ; left
            ("0" / guid)          ; right
            ("0" / guid)          ; previous
        ")"
```

11. Restore

The restore request feeds state generated by the dump request back into the database.

If a restore request starts at startstate of zero, the existing database state in the server is destroyed prior to the restore. If a restore request doesn't start at zero, its startstate must be less than or equal to the highest endstate of the server into which the data is being restored. If the start state is less the highest endstate (server's horizon) then the restored values will be compared to what is in the database and the restore will fail if they are different. This allows one to retry a failed incremental restore.

(In this context, "zero" is the first startstate returned by a dump command—it doesn't matter how it is encoded.)

```
restore-request:
    "restore" [request-modifiers] database-state
    ; for details of the database-state, see the "dump"
    ; comand in section 10.
restore-reply:
    "ok" [reply-modifiers]
```

12. Set

Set requests control operations of the database at runtime.

```
set-request:
        "set" [request-modifiers] "(" set-options ")"
set-reply:
        "ok" [reply-modifiers]
set-options:
        set-option set-options
    / ""
set-option:
        "access" "=" access-option
    / "loglevel" "=" loglevel-option
    / "sync" "=" sync-option
    / "core" "=" core-option
```

Setting the "access" of a server causes requests that don't fit in with the access model to be rejected.

```
access-option:
        "restore"        ; reject write, read
    / "replica"          ; operate as a replica
    / "replica-sync"     ; read-only replica
    / "read-only"        ; reject write
    / "read-write"       ; allow all
    / "shutdown"         ; reject all
```

When setting a loglevel, the command accepts either a single loglevel or a parenthesized list of loglevels. The server loglevel is set to the union of all the listed loglevels.

```
loglevel-option:
        "(" loglevel-option-list ")"
    / loglevel-option-item
loglevel-option-list:
        loglevel-option-list loglevel-option-item
    / ""
loglevel-option-item:
    / loglevel
    / loglevel-option-session
```

Mixed in with the loglevels can be at most one session displayname, as listed e.g. in the response to status (conn).

```
loglevel-option-session:
        ip-address ":" port   ; identifying a session
```

If there is a session displayname present, the debuglevel set is not that of the global server system, but only of that session. In other words, while that session serves its requests, the loglevel is temporarily set to the level indicated.

To remove the special session loglevel, run a set loglevel command with only a session level, no specific loglevel.

The "sync" option is a server-wide value that controls whether an "ok" response from the server immediately followed by a server shutdown or crash still guarantees that the data can be recovered from disk.

```
sync-option:
        "true"         ; make sure values hit disk (default)
    / "false"          ; no, just store as fast as you can
```

The "core" option controls whether the server will dump core when crashing.

```
core-option:
        "true"         ; yes, drop a core file if you can
    / "false"          ; no, just crash.
```

13. Replica, Replica-Write

A replica request starts the replication protocol. The request is sent by the replication client (a replica database) to the the replication server (the master database).

```
replica-request:
        "replica" [request-modifiers] "(" replica-options ")"
replica-options:
        replica-option replica-options
    / ""
replica-option:
        "version" "=" version-option
    / "start-id" "=" start-id-option
    / "check-master"
version-option:
        "1"            ; Replication Protocol version 1
version-option:
        number         ; the id of the first primitive to send
```

A replica response consists of a protocol version and the url of the write-master:

```
replica-response:
    "ok" [response-modifiers]
        "(" "version" "=" version-option "master" "=" url ")"
/ error-reply
```

After a positive replica-request/response, the replication server will emit replica-write commands.

```
replica-write-request:
    "replica-write" [request-modifiers] "(" dump-tuples ")"
```

Each replica write command contains the primitives written by one or more write commands. The first primitive in the dump tuples will always have the TXSTART bit set.

13.1 Protocol Versioning

The general principle is: "client makes it right."

The client sends the server the highest protocol version it is capable of understanding. The server responds with the protocol version it will use, or an error if it determines that it cannot talk with the client.

13.2 Connection

Either side of the replication protocol may drop the connection at any time. If the replication connection is dropped, the client is expected to try to re-establish it at "sensible" intervals.

13.3 Write Master

Replica databases use the master url returned in the replica response to forward write requests on to the master graphd. If the connection between a replica and the master graphd fails, the replica is expected to drop the replication connection and re-establish it with the check-master option.

14. Sync

A "sync" request performs a database checkpoint and returns the new horizon of the database:

```
sync-request:
    "sync" "(" ")"
sync-response:
    "ok" horizon
```

When coupled with the "replica-sync" access mode, the "sync" command produces a stable disk database that can be easily copied to a backup store.

If multiple "sync" commands are issued simultaneously, they will be executed serially, each possibly returning a different horizon.
vim: ts=8 sw=8

APPENDIX "3" TUPLE SYNTAX

Tuple Syntax

When sending tuples back and forth, they are encoded as a space-separated, parenthesized list of values.

This document describes the syntax used for those values.

Which value goes where in the tuple is determined by the application in the request and outside of the scope of this document.

```
tuple-component:
    guid
    / name
    / type
    / typeguid
    / datatype
    / valuetype
    / value
    / left
    / right
    / live-status
    / archival-status
    / timestamp
    / scope
```

1. Syntactical Elements
1.1 Strings

Many of the tuple elements are rendered as strings.

A string is enclosed in double quotes. (Single quotes have no special meaning to graphd.)

```
string: <"> *string-char <">
string-char:
    "\\"
    / "\" <">
    / "\n"
    / "\" <any character other than n>
/ <any character other than \ or ">
```

In a string, the following characters are always quoted by escaping them with \:

```
\ (backslash, ASCII 0x5c)    quoted as \\
" (double quote, ASCII 0x22) quoted as \"
```

The following character is quoted in all strings sent by graphd. It can be quoted or written literally in strings sent to graphd:

```
\n (newline, ASCII 0x0a)    as \n
```

(In other words, graphd output does not contain literal \n within strings, but they're acceptable on input.)

In addition,

```
\a is read as a for all a other than "n"
``` on input.

There are no hex or octal escapes. (\0 evaluates to the digit 0, ascii 0x30, not to NUL, ascii 0x00.)

1.2 GUIDS

GUIDs are rendered as 32-byte hex strings:

```
guid:
    32hex
hex:
    "0" / "1" / "2" / "3" / "4" / "5" / "6" / "7"
/ "8" / "9" / "a" / "b" / "c" / "d" / "e" / "f"
```

Graphd always renders GUIDs in lower-case, but accepts them case-insensitively.

2. Tuple Components

2.1 GUID

The 128-bit GUID of a primitive, rendered as a 32-byte hex string.

(See 1.2 for the syntax.)

2.2 Name

The primitive's name as a quoted string, or the word "null" as an atom, to indicate that the primitive had no name.

```
name:    string
      / "null"
```

2.3 Type

In some older notations, a primitive type is rendered as a string. In modern notations, it is rendered as a GUID.

2.3.1 Type String

The name of the primitive's type as a quoted string, or the word "null" as an atom, to indicate that the primitive had no type.

```
type:
    string
  / "null"
```

2.3.2 Typeguid

The GUID of the primitive's type, or the word "null" (without quotes) to indicate that the primitive has no single type.

```
typeguid: guid
        / "null"
```

2.4 Datatype

The name of the primitive's datatype as an atom.

```
datatype:
    "string"
  / "Boolean"
  / "integer"
  / "float"
  / "timestamp"
  / "url"
  / "guid"
  / "bytestring"
  / "null"
```

This is obsolete and replaced by the VALUETYPE, a small integer in the range 1 . . . 255.

2.5 Value

```
value: string
     / "null"
```

The value is rendered as a string.

No value is rendered as the atom "null" (without the quotes).

2.6 Left

The guid of the left-hand node of a link, or the word "null" (without quotes) if the link has no left-hand node, or if we're not talking about a link.

```
left:  "null"
    / guid
```

2.7 Right

The guid of the right-hand node of a link, or the word "null" (without quotes) if this isn't a link.

```
right: "null"
     / guid
```

2.8 Live-Status

The atom "true" or "false" (without the quotes), depending on whether this primitive has the "live" flag set or not.

```
live-status:
    Boolean
Boolean:
    "true"
  / "false"
```

2.9 Archival-Status

The atom "true" or "false" (without the quotes), depending on whether this primitive has the "archival" flag set or not.

```
archival-status:
    "true"
  / "false"
```

2.10 Timestamp

The primitive's full timestamp.

On output, the timestamp is rendered with 16 bits of sub-second precision. On input, shorter timestamps are accepted.

```
timestamp:
    y?yyyy ["-" mm ["-" dd ["T" hh [":" mm [":" ss ["." +n ]]]]]] ["Z"]
```

The timezone is optional; if it is supplied, it must be "Z", standing for UTC.

2.11 Scope

The 128-bit GUID of a primitive's scope, rendered as a 32-byte hex string, or the word "null" (without quotes) to indicate that the primitive has no scope.

```
scope:
    32hex
  / "null"
```

2.12 Valuetype

A small integer in the range 1 . . . 255. If unspecified, the valuetype assigned to primitives with a value is 2; without a value, 1.

valuetype: number

Valuetype and datatype (see 2.4) are the same underlying value. When accessed as a datatype, integers in range 1 . . . 9 are printed as the name of their corresponding datatype; datatypes outside that range are printed as numbers. When accessed as a valuetype, all values print as numbers.

APPENDIX "4"—TEMPLATE EXPRESSION GRAMMAR

This grammar is part of interface requests that match networks of links and nodes in some manner. They're used with the "read" command to access primitives; a variation is used with the "write" command to create new primitives.

Reading this document will give you an idea of the expressive power of the graph repository interface.

1. Template Expression

A template expression is a parenthesized, comma-separated list of zero or more constraints.

```
template-expression:
    "(" [ constraints ] ")"
constraints:
    constraints constraint
    / constraint
```

Most of the constraints define what primitives match the query; some are more properly thought of as "instructions" that detail what information is passed back once the query matches, or how that information is sorted and formatted.

When a query executes, each parenthesized nesting level of templates evaluates to a list of primitive components—GUID, name, value, and so on—that matched the query.

If a constraint holds subconstraints, the subconstraints, too, evaluate to nested lists of the primitives that matched that particular subconstraint. To read more about that, see section 8, primitive constraints.

Multiple constraints combine disjunctively: the combination matches primitives that match all of the subconstraints.

```
constraint:
    or-constraint
        / constraint "|" or-constraint
        / constraint "||" or-constraint
or-constraint:
    meta-constraint
        / linkage-constraint
        / guid-constraint
        / timestamp-constraint
        / generational-constraint
        / valuetype-constraint
        / string-constraint
        / value-constraint
        / primitive-constraint
        / live-constraint
        / flag-constraint
        / count-constraint
        / next-previous-constraint
        / instruction
        / "{" constraints "}"
```

2. Meta Constraints

Meta constraints other than →← are deprecated.

The words "node" and "any" are skipped without meaning.

```
meta-constraint:
    "→"
    / "←"
    / "node"    ; deprecated
    / "any"     ; deprecated
```

→ If there's a surrounding constraint expression, and there is no link between the surrounding constraint and the one that contains the "→", then a "←left"

is implicitly assumed.

If there are contained constraint expressions, and there is no link between the contained subconstraints and this one, then a "right→"

is implicitly assumed (in front of the first contained subexpression that has no other link to the container with the "→").

← The inverse of "→". The mapping of outside and inside onto link "right" and "left" is reversed.

Matching link primitives have in their "right" field the GUID of a primitive that matches the surrounding node expression, if any. Subordinate node primitive constraints must be matched by primitives whose GUIDs appear in the link's "left" field.

3. Valuetype Constraint

A valuetype constraint restricts by the "valuetype", a small integer in the range 1 . . . 255 that nominally refers to the data type of the value string, but actually has almost no semantics inside graphd.

For read accesses, "valuetype" and "datatype" accept the same strings—one of nine symbols or a small number. If you're writing new code, use the numbers and use your own dictionary.

Null is 1, string is 2. There are names assigned to the rest, but they don't influence graphd's behavior in any way, and I hope for us to be phasing them out.

```
valuetype-constraint:
    "valuetype" "=" number
    / obsolete-datatype-constraint
obsolete-datatype-constraint:
    "datatype" "=" (
        "string"
        / "integer"
        / "float"
        / "timestamp"
        / "url"
        / "guid"
        / "bytestring"
        / "Boolean"
        / "null")
```

3.1 Examples 3.1.1 URL

Imagine a server that validates URLs the maintenance of a blog; it could ask for (any datatype=URL)

and get back all nodes or links in the system that contain a URL, regardless of context.

4. GUID Constraint

A GUID constraint addresses the matching primitive directly:

```
guid-constraint:
    "guid" "=" guidset
    / "guid" "~=" guidset
    / "guid" "!=" guidset
guidset: guid
    / "(" guidlist ")"
guidlist: guidlist guid
    / guid
guid:   32hex
```

In the overwhelming majority of cases, the caller knows which primitive they would like to access, and simply supplies the primitive's id, as a hex byte string.

In the ~= case, the caller is looking for something that is has the same underlying identity as the specified GUID. Without further flags on the query, that amounts to "the newest version" of the object; by specifying "newest>=0" and "live=dontcare", the query can be broadened to include old versions and tombstones, respectively.

With !=, the caller excludes the listed GUID or GUIDs from the matching set.

4.1 Examples

4.1.1 Exact GUID Match

The single most common request will look something like (guid=1234567890abcdef1234567890abcdef)

retrieving the node with a given UID.

4.1.2 Current Version of a Primitive

To just get the current version of a primitive, an application could ask:

(guid~=1234567890abcdef1234567890abcdef)

By default, queries only return the newest, existing version of an object in the repository. Therefore, this search will find either the newest version of the object that shares application-defined identity with 1234567890abcdef1234567890abcdef, or fail because the object has been deleted.

If the returned node has the same guid as the query, the version the application knows about is current.

If the returned node is different, a comparison against its timestamp will determine whether the application's or the store's version is the more recently created node.

5. Timestamp Constraint

A timestamp constraint matches primitives created at, before, or after a certain time.

A virtual time constraint is a particular form of timestamp that matches primitives created before (virtual time<" ") or after (virtual time>" ") a certain virtual time, as returned with the virtual time=" " request modifier.

```
timestamp-constraint:
    "timestamp" numop timestamp
    / "virtual time" diffop virtual time
numop:
    "="
    / ">="
    / "<="
    / ">"
    / "<"
    / "!="
timestamp:
    y?yyyy ["-" mm ["-" dd ["T" hh [":" mm [":" ss ["." 1*n ]]]]] [Z]
```

-continued

```
diffop:
    ">"
    / "<"
virtual time:
    string
    / GUID
```

Omitted timestamp parts default to the minimum value possible (0 for minutes, seconds, and hours; 1 for months and days.)

The virtual time can be specified as a string or a GUID. A virtual time that is a GUID is the time just after the creation of the specified GUID.

5.1 Example:

5.1.1 What's Been Done Today?

What primitive versions were created today?

(timestamp>=2004-02-16 timestamp<2004-02-17 newest>=0)

6. Generational Constraint

A generational constraint matches versions of a primitive.

```
timestamp-constraint:
    "newest" genop number
    / "oldest" genop number
genop:
    "="
    / ">="
    / "<="
    / ">"
    / "<"
number:
    <a sequence of digits no larger than 2^32−1>
```

The generation of the primitive, starting with 0 at the end point implied by the keyword ("newest"/"oldest") is compared to the specified number according to the operator, starting with 0.

```
original                current
primitive               version
    |                      |
[ 0  1  2  3 ....  3  2  1  0 ]
oldest                  newest
```

For example, "newest<=2" matches the three most newest generations in the repository; "oldest<=1" matches the original and the first new version after that.

By default, queries have a generational-constraint of "newest=0". An explicit "newest" or "oldest" overrides that default.

There is no guarantee that the results of a generational query is consistent over different access points.

6.1 Example:

6.1.1 Initial Version of a Node

How did an existing node start out?

(guid~=1234567890abcdef1234567890abcdef oldest=0 newest>=0)

6.1.2 The Previous Version of this Primitive?

The "newest=1" constraint matches the primitive just before the current one.

(guid~=1234567890abcdef1234567890abcdef newest=1)

7. String Constraint

A string constraint matches against a string, as a case-insensitive literal.

```
string-constraint:
    literal
    / stringexpression "=" string
stringexpression:
    "type"
    / "name"
```

For type and value searches, there's no attempt to implement pattern matching or substring searches.

Strings are compared as US-case-insensitive UTF-8 strings. (That is, "A" and "a" are considered the same character, but the match algorithm makes no attempts to normalize characters outside the US-ascii set.)

The "name" of a primitive is the text contents of the primitive's "name" field.

The "type" of a primitive is the unique label is either null or the string value of the link connecting the primitive's typeguid to the global type name space primitive (a node with name "metaweb:global-type-namespace".

These strings are intended to be application programmer visible, but they're not user-visible.

```
                                        +node-------+
+-----------+    +node------------+ "has-name" | Global |
| primitive +---->| primitive type |------------>| Type   |
+-----------+    +----------------+ value=TYPE  | Namespace |
                                        +-----------+
```

As a special case, a literal without a prefix is interpreted as a type identity match. So,

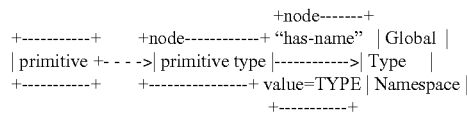

is the same as

```
(type="Person"
    (-> type="drives-car"
        (type="car"
            (-> type="has-license-plate"
                (value="ZYN-206")))))
```

8. Value Constraint

Values, whatever their underlying type (in the sense of section 3), are matched as strings.

```
value-constraint:
    "value" valop stringset
valop:      "="
            / "~="
            / "!="
            / "<"
            / "<="
            / ">"
            / ">="
stringset:  "null"
            / "(" stringlist ")"
            / string
stringlist: string
            / stringlist string
string:     <"> *(quoted-pair / string-char) <">
quoted-pair:        "\" quoted-string-char
quoted-string-char: <any UTF-8 character but NUL>
string-char:        <any UTF-8 character but NUL or ">
```

A value is equal to null if it is null (unset, or explicitly set to the unquoted atom null).

A value is equal to a string if it compares equal to it using the comparator (by default, a case-insensitive comparison for US-ascii, bytewise comparison for everything else.)

The globbing semantics implemented by the default comparator are described in detail in gr-simple-search.txt. Briefly, "foo" searches for the word "foo" anywhere in the text; anchoring, if needed, uses ^ to mean beginning and $ to mean end. An "*" at the end of a word means "starting with"—so "foo*" finds all words starting with foo..—and, if used alone, means "any word" (but just one word, not two). Adjacent words in the query match adjacent words in the document; whitespace and punctuation are ignored other than to delimit words (with punctuation in the query meaning an optional word boundary).

The application can expect matches with a trailing * to be reasonably fast.

A "comparator constraint" can be specified to change the way strings are compared, both for a value comparison and for sorting; see 7.3 for details.

8.1 Example:

These queries are going to be less frequent than string queries, but will occur in the same context of using the graph repository like a database.

8.1.1 Ratings Filtering

Get contributions to a message board rated as funnier than 1.5 yuks:

(type="Message"  (←(type="Rating"  name="yuk"  value>1.5)))

(This assumes that "ratings" are stored as links with a destination of the rated primitive.)

8.3 Comparator Constraint

The comparator constraint controls the comparisons between values. It controls identity—when are two values considered the same?

matching—what is the meaning of regular expressions, etc.

sorting—what is the lexical ordering of multiple values?

The identity and matching constraints are controlled by a value-comparator; the sorting constraints are controlled by a sort-comparator.

The sort-comparator is a list; each Nth element of the sort comparator list controls the matching for the Nth sort key. The last element of the list is used for all following keys.

Operationally, comparators have names, and one changes the default by mentioning the name of the desired comparator Default case:

read (value="foo")

Case-insensitive octet comparison case:

read (value="foo" value-comparator="octet")

Comparators can be changed per-access, and do not affect the way primitives are stored in the database.

```
comparator-constraint:
    "value-comparator" "=" comparator-name
    / "sort-comparator" "=" "(" comparator-list ")"
    / "sort-comparator" "=" comparator-name
comparator-list: comparator-name
    / comparator-list comparator-name
comparator-name:
    string
```

Internally, comparator names have two parts: an optional locale specifier (separated by a ";") and the comparator's locale-independent name. The locale-independent names are matched exactly; the locale-prefixes in a query can be more specific than the ones they match.

For example, an "en-UK;casemap" comparator requested by a user may match an "en;casemap" comparator installed in the system.

8.3.1 Octet Comparator

The "octet" comparator (no locale prefix) simply compares strings octet-by-octet. No case mapping and no number parsing takes place. A string compares lexically greater than another if the octet value of the first byte the two strings disagree on is greater than the corresponding octet in the second string.

value-comparator="octet"

This does *not* mean that the strings are octet strings; all strings that pass through the graphd interface must have UTF-8 encoding.

The "octet" comparator is useful for strings that are not human readable, e.g. base-64 encoded byte strings.

8.3.2 Default Comparator

The default comparator (which need not be set explicitly, but could be called "default" if it were) performs two services:

- US-ASCII characters are mapped to their lowercase equivalent prior to comparison
- numeric substrings (including a decimal point) are compared as numbers, rather than as strings.

So, by default, 83<8200, even though that would not be true for an octet-by-octet comparison.

9. Primitive Constraint

Primitive constraints match against a list of primitives, specified either as GUIDs or as recursive template-expressions.

```
primitive-constraint:
    "(" "<-" linkage [constraints] ")"
    / linkage "->" "(" [constraints] ")"
linkage: "left"
    / "right"
    / "scope"
    / "typeguid"
```

The primitives matching the contained expression are connected to those matching the container. The "linkage" describes how the two are connected.

Either, the subconstraint matches primitives that point to the outside in one of their four connecting fields;
   (←right)
or the outside points to the primitive in the subconstraint with one of its connecting fields:
   right→( )

10. Flag Constraint

Flag constraints regulate flags set for the primitive; right now, there are two: "live" and "archival". In addition, there is a monadic constraint "false" that causes the read constraint it appears in not to match.

For each flag, we can filter to allow only true, only false, or allow either of them ("dontcare").

```
flag-constraint:
    archival-constraint
    / live-constraint
    / "false"
archival-constraint:
    "archival" "=" tristate
live-constraint:
    "live" "=" tristate
tristate:
    "true"
    / "false"
    / "dontcare"
```

10.1 Live

Records with the "live" flag set to "false" are markers that indicate the deletion of a previously existing record. By default, they are not returned in query replies.

If the "live" flag is set to "dontcare", the query response will include primitives that are deletion markers. If it is set to "false", only deletion markers will match the record. If it is set to "true" (the default), only live (non-deleted) primitives match the query.

10.1.1 Example: Live=Dontcare

A true mirror of a database needs to listen to deletions (that is, additions of primitives with the "live" flag set to 0) as well as additions. So, the revised first example for a real mirror should be
   (any live=dontcare)
(Note that the mirror owners can make a separate choice to mirror old versions, perhaps further constrained by their number or time range.)

The "archival=true" modifier matches only primitives with the "archival" bit set (i.e., ones considered valuable because they were entered by a user). Its negative matches only primitives that do not have the archival bit set. By default, the archival bit does not affect whether a query matches ("archival=dontcare").

10.2 Archival

Records with the "archival" flag set to "true" are primary sources of the information they carry. Records with the flag set to "false" are deemed ephemeral, and can either be regenerated or are just generally not considered important.

By default, the system does not filter responses based on the archival flag ("archival=dontcare").

10.2.1 Example:

A concurrent backup could subscribe to everything deemed important by the system:
   (any archival=true, live=dontcare)

11. Count Constraint

```
count-constraint:
    "count" numop number
    / "atleast" "=" number
    / "optional"
numop:
    "="
    / ">="
    / "<="
    / ">"
    / "<"
```

If a count constraint has been specified, the containing template-expression only matches if its total match count is (depending on numop) less than (<), less or equal to (<=), equal to (=), greater or equal than (>=), or greater than (>) the given number.

The form "atleast=number" is equivalent to "count>=number". (Use count; "atleast" was an early attempt to implement something less powerful than count.)

The form "optional" is equivalent to "count>=0".

If no count (or atleast or optional) is specified, it defaults to "count>0".

Note that a constraint that contains "count=0" only matches if the rest of its subconstraints don't match anything; that's a way of implementing "not".

11.1 Example 11.1.1 Optional Attributes

The overwhelming use of the "atleast" constraint will be in specifying networks that participate in the match results if they're present, but aren't required to match.

Match all people. If they have links to children, tell me about those links.

(type="person" (→name="has-child" optional))

11.1.2 Minimum Counts

Find people who hold more than one job (type="person" (→name="works-for" atleast=2))

Note that atleast constraints other than "atleast=0" really don't make much sense on nodes—there can be more than one link affixed to a node, but there's only at most one node at either end of a link.

12. Next/Previous Constraint

The next and previous constraints specify GUIDs of a predecessor or successor primitive.

```
next-previous-constraint:
        "next" guidop guidset
        / "prev" guidop guidset
    guidop:  "=" / "!=" / "~="
    guidset:   guid
             / "null"
             / "(" guids ")"
    guids:    guid
            / guids guid
```

When writing, the "next" constraint is always null. One cannot write a primitive that is outdated at its time of creation.

When writing, the "previous" constraint behaves exactly like the "GUID" constraint. If a single GUID is specified with "=", the GUID must be the current version of its lineage at time of writing. If a GUID is specified with "~=", the current version of that lineage is versioned. It is an error to specify more than one "previous" GUID when writing.

When reading with a "next" constraint and no "newest" generational constraint, an implicit "newest>0" is assumed. (Without that, no constraint with a "next" pointer is ever visible.)

When reading with a "previous" constraint, no such assumptions are made. Without an added "newest>=0," the successor of the GUID specified with a "previous=" will only be returned if it is the current version.

13. Linkage Constraint

Other than its own ID, there are four GUIDs embedded in each primitive. Collectively, they're known as the primitive's "linkage" or "linkage fields". They can be tested for identity, identity to null, set membership, and for cross-version identity.

```
linkage-constraint:
        linkage guidop guidlist
    guidop:         "=" / "~=" / "!="
    guidlist:       "null"
                  / "(" guids ")"
                  / guid
    guids:        guid guids
                / guids
```

The semantics of "=", "~=", and "!=" are like those of the GUID constraint.

In addition to the typeguid markers, types can also be specified as strings, using the "type" parameter.

If they are specified as strings, nonexistent types are implicitly created (on write queries), and the types are implicitly translated from the string form into the GUID form (mostly, to make a transition possible from the old-style name-based system to the new-style GUID-based system.)

Linkages can also be specified as primitive constraints, with type→( ) see section 8.

14. Instructions

Instructions concern details of how the results of a match are sorted, paginated, and returned.

They don't affect what matches, just what happens to it. (Nevertheless, they can be used for optimizations while the match is going on.)

```
instruction:
        result-instruction
      / tag-instruction
      / sort-instruction
      / pagination-instruction
```

14.1 Result

Abstractly speaking, each parenthesized template expression (a "constraint") results in a list of matches. (Often, that list only has one element; it can have zero elements if a match used the "atleast" modifier.) Each "match" in that list is one instance of a sub-graph that matches the template.

The "result" instruction controls how that list of matches is mapped to the tuple returned by a READ request. (Result instructions are not allowed in any other kind of request.)

A result list is nested at most two parentheses deep, and contains at most one such nested list.

The outer list, or an outer scalar, is returned once per matching list. The inner list is repeated once for each matching list element.

For example, consider a graph (name="n1" value="v1")

(name="n2" value="v2")

then a match of (result=(cursor count (value name))) might yield ("#1234" 2 ("v1" "n1") ("v2" "n2"))

and (result=((value name))) yields (("v1" "n1") ("v2" "n2"))

If an element item (like "value" or "type") appears in the outermost list, it is assigned a value from some matching subgraph.

result=(value)

results in ("v1")

or ("v2")

If an element item (like "value" or "type") appears as a scalar (there are no lists), the system will similarly select one of the matching subgraphs as a source for returned value.

result=value results in

"v1" or "v2"

This is useful because frequently subgraphs are by definition limited to only one match—whenever a simple link is being followed, for instance.

```
result-instruction:
        "result" "=" "(" [result-instruction-toplevel] ")"
    / "result" "=" result-instruction-item
    result-instruction-toplevel:
        [result-instruction-items]
        [result-instruction-sublist]
        [result-instruction-items]
    result-instruction-sublist:
        "(" [result-instruction-items] ")"
    result-instruction-items:
        result-instruction-item result-instruction-items
    / result-instruction-item
    result-instruction-item:
        tuple-instruction-item
    / contents-instruction-item
    / cursor-instruction-item
    / literal-instruction-item
    / count-instruction-item
    / estimate-count-instruction-item
    / tag-instruction-item
```

For each result-instruction-item, the corresponding result-response-item is rendered in order of appearance in the result instruction, as described below.

```
result-response:
        "(" [result-response-items] ")"
    / result-response-item
    result-response-items:
        result-response-item result-response-items
    / result-response-item
    result-response-item:
        tuple-response-item
    / contents-response-item
    / cursor-response-item
    / literal-response-item
    / count-response-item
    / estimate-count-response-item
    / tag-response-item
```

The following sections will pair some x-instruction-item with some x-response-item. In the result list of a read request, the x-response-item appears in the response in a position corresponding to that of the x-instruction-item in the read request.

14.1.1 Tuple Components

```
tuple-instruction-item:
    "guid"
    / "meta"
    / "name"
    / "type"
    / "datatype"
    / "valuetype"
    / "value"
    / "left"
    / "right"
    / "live"
    / "archival"
    / "scope"
    / "typeguid"
    / "timestamp"
    / "previous"
    / "next"
    / "generation"
```

These generally yield straightforward renderings of the corresponding primitive data, as described in gr-tuple.txt.

```
tuple-response-item:
    guid
    / meta
    / name
    / type
    / datatype
    / valuetype
    / value
    / left
    / right
    / live-status
    / archival-status
    / scope
    / typeguid
    / timestamp
    / previous-response-item
    / next-response-item
    / generation-response-item
meta: "->"
    / "<-"
    / "node"
previous-response-item:
    guid / "null"
next-response-item:
    guid / "null"
generation-response-item:
    number
```

Whether "→" or "←" is used when displaying a meta literal depends on the relationship of the link to the surrounding expression. If there is neither a surrounding expression nor a directional meta constraint in the search query, links default to "→".

(See gr-tuple.txt for the details of the other data types.)

14.1.2 Contents

In the reply, the token "contents" is replaced with a comma-separated list of the results for dependent links or nodes that were matched by the query.

Each element of the "contents-response-item" is the result for one potential query-satisfying subgraph, sorted and paged (if specified) according to the sorting and paging criteria in the subgraph.

```
contents-instruction-item:
    "contents"
contents-response-item:
    [result-responses]
result-responses:
    result-response
    / result-response result-responses
```

A link or node is part of the content result set if it returns a result. If it doesn't return a result—if its instructions include result=null—the content still exist, but remain empty.

14.1.3 Count and Estimate-Count

In the reply, the token "count" is replaced with the number of matching records that would be returned if records would be returned.

```
count-instruction-item:
    "count"
count-response-item:
    number
```

The token "estimate-count" is replaced with an internal iterator estimate of the number of available records. This estimate will usually exceed the actual count.

```
estimate-count-instruction-item:
    "estimate-count"
estimate-count-response-item:
    count-response-item
    / "null"
```

If no estimate is available, the estimate count may be returned as "null", meaning "we don't know".

14.1.3.1 Interaction Between Count and Pagesize or Countlimit

If the query specifies a countlimit or pagesize, the count will not exceed the countlimit or pagesize.

This is not true for the estimate-count; it has no interaction with the pagesize or countlimit.

14.1.3.2 Example: Friends of Carlotta

Given the graph:

```
("Person" guid="1234" value="Carlotta"
    ("←-" "friend" value="Pat")
    ("←-" "friend" value="Chris")
    ("←-" "friend" value="Connor"))
```

A query to list Carlotta's friends
(guid="1234" result=contents (←"friend" result="((value))")) returns:
(("Pat") ("Chris") ("Connor"))
Whereas a query to merely count them
(guid="1234"   result=(contents)   (←"friend" result="count")) returns
(3)

Note that the result parameters "value" and "count" operate on two different levels—the "count" affects the result list as a whole (just like sort and page do), while other result parameters determine individual, repeated elements of the list.

To both count Carlotta's friends and list them in detail, one could ask for
(guid="1234" result=contents
    (←"friend" result=((value) count)))
getting
((("Pat" "Chris" "Connor") 3))
in response.

14.1.3.2 Example: Counting and Sorting

Count works with tags and sort, too. To print a list of people sorted by descending popularity:
("Person" result=$value sort=-$popularity (←"friend" $popularity=count))

14.1.4 Cursor

If the query instructions (see section 13.4) specify a pagination mechanism, or if the query is paginated because of a timeout, the "cursor" result instruction marks a place for an opaque string literal returned as part of the query response.

```
cursor-instruction-item:
    "cursor"
cursor-response-item:
    string
    / <""> null: <"">
```

This cursor string can be submitted by the application in a pagination instruction (see below) as an aid to the graph store to efficiently regain its place in a sorted, paged query.

A special cursor value of "null:" (as a quoted string) indicates that the cursor is at the end of the iteration, and that the next call will return either an EMPTY error or an empty list, depending on the count constraints of the query. If, conversely, the returned cursor does not match the string "null:", then there is at least one more value pending in the enumeration.

(This is a special string and not the atomic value "null" because that value is a legitimate value for starting a query—we didn't want clients that are unaware of the special case to run in an endless loop when re-inserting the cursor result.)

14.1.5 Literal

If the template matches, include an application-defined tag in the results. This allows an application to preserve details about exactly how and where something was matched in a transparent manner without having to parse structures of the complexity of its own search query.

```
literal-instruction-item:
    "literal" "=" string
literal-response-item:
    string
```

14.1.6 Tag Reference

Queries can assign results to a named tag. (See "tag-instruction", below.) Queries can then reference the tag's contents and include them in their results in a controlled fashion.

```
tag-instruction-item:
    "$" name
tag-response-item:
    result-response
```

```
name:          name-startchar [ *name-char name-endchar ]
name-startchar:    <one of a-z A-Z _>
name-endchar:      <one of a-z A-Z _ 0-9>
name-char:     <one of a-z A-Z _ 0-9 ->
```

When a query returns a tag, either it or a subquery must assign to the tag. When a query assigns to a tag, either it or a parent query must use the tag.

When the use and the assignment happen in the same query, the tag works like macro substitution—it's just a shorthand for something that could have been expressed directly.

14.1.6.1 Example 1: Virtual Columns

Tag references are important for the efficient translation of graph structure into relational table structures.

Let's say we want to make a list of Firstname Lastname pairs.

```
(result=($first $last)
    (<- name="firstname" $first = value)
    (<- name="lastname" $last = value))
```

This would simply return a tuple of first/last pairs

```
(("Kim" "Jones")
 ("Pat" "Smith")
 ("Chris" "Miller"))
``` rather than the complicated nested structure we'd be dealing with otherwise.

14.1.6.2 Example 2: Aliasing
These three queries

```
(result=$foo $foo=((value)))
(result=($foo) $foo=(value))
(result=(($foo)) $foo=value)
``` return exactly the same result; the same as
(result=((value)))

14.1.7 Iterator

An iterator result is an internal mechanism for analyzing the query optimizer. It allows the query sender to see which internal mechanism the server picked to answer the query.

```
iterator-instruction-item:
    "iterator"
iterator-result-item:
    (iterator-expression iterator-statistics)
iterator-statistics:
    (iterator-statistics-value*)
iterator-statistics-value:
    "(" string [number] ")"
iterator-expression:
    "(" string parameters .. ")"
```

Supported statistics values are

| | |
|---|---|
| "n" | the number is the expected number of iterator results |
| "check-cost" | the cost of checking against iterator membership |
| "production-cost" | the cost of pulling another sequential value from the iterator |
| "traversal-cost" | the cost of positioning the iterator prior to sequential calls |
| "forward", "backward", "unsorted" | the iterator's sort order (This doesn't have a numeric argument). |

Unlike the cursor string, the iterator string doesn't have a use as a client-specified argument to graphd—it is intended just as documentation of optimizer choices, not as guidance.

14.1.8 Default

In templates used by read requests, the result instructions for read requests default to Node: ((guid type name datatype value scope live archival timestamp contents))

Link: ((meta guid type name datatype value scope live archival timestamp right left contents))

for constraints with subconstraints, and to

Node: ((guid type name datatype value scope live archival timestamp))

Link: ((meta guid type name datatype value scope live archival timestamp right left))

for constraints without subconstraints.

In other words, everything there is to know about a node or link is listed. If there are subconstraints, that includes the contents of the subconstraints. Links have their meta type listed explicitly (as "→" or "←"); nodes don't.

Several aspects of these defaults are by now anachronistic (the string type, the artificial distinction between nodes and links). Don't use defaults; specify what you want instead.

14.2 Tagging

The tag instruction assigns a value to a scoped tag in the containing query environment.

```
tag-instruction:
    tag-name "=" "(" result-instruction-items ")"
    / tag-name "=" result-instruction-item
tag-name:
    "$" name
```

The tagged values can be used by containing result- and sort-instructions to reach into their sub-expressions.

14.2.1 Restrictions on Tags

14.2.1.1 Use for Result Selection Only, Not to Constrain Queries.

Tags can only be used in result-item expressions, not in constraints outside result-item expressions.

This does *not* work:

```
("Person"
    ("<-" "has-first-name" $firstname=value),
    ("<-" "is-parent-of"
        ("Person"
            ("<-" "has-first-name" value="$firstname"))))
```

(Failed attempt to find people who have the same first name as their parents.)

14.2.1.2 Use in Containing Expressions Only.

Tags can only be used in template-expressions that contain the template-expression they're set in.

This does *not* work:

```
("Person"
    ("<–" "has-first-name" $firstname=value result=null),
    ("<–" "has-last-name" result=($firstname value)))
```

(Failed attempt to return a first/last pair from within part of it.)

Obviously, the required assembly from parts can easily be done in the parent expression.

14.2.1.3 No Defined Order

If multiple contained expression of the tag-using expression match and set the same tag, it is unspecified which of the values gets used.

```
( "Person"
    ("<–" optional "has-nickname" $displayname=value),
    ("<–" optional "has-first-name" $displayname=value)
    result= ($displayname))
```

This is legal, but if a user both has a nickname and a first name, the application cannot rely on either of these having precedence—it is much better off receiving both names in separate tuple elements and just throwing one away.

14.3 Sorting

The sort-instructions determine how the items that match the containing template expression are ordered within their list.

```
sort-instruction:
    "sort" "=" "(" sort-criteria ")"
    / "sort" "=" sort-criterion
sort-criteria:
    sort-criteria sort-criterion
    / sort-criterion
sort-criterion:
    [ ("–" / "+") ] tuple-instruction-item
    / [ ("–" / "+") ] "$" name
```

The default sort orders for the tuple values are as follows:

14.3.1 Sorting by Meta

Nodes sort before links.

14.3.1 Sorting by Guid

Null sorts before present GUIDs. (This doesn't matter for the "guid" criterion—that GUID is never null—but does matter for left, right, and scope.)

Non-null GUIDs are sorted in a consistent, but opaque sort order defined by the graph repository.

14.3.2 Sorting by Name

Null names sort before non-null names.

Non-null names are sorted lexically by case-insensitive typename, A-Z.

14.3.3 Sorting by Type

Null types sort before present types.

Non-null types are sorted lexically, by case-insensitive typename, A-Z.

14.3.4 Sorting by Datatype

Null datatypes sort before non-null datatypes.

Non-null datatypes sort lexically by name of datatype.

bytestring
float
guid
integer
string
timestamp
url

14.3.5 Sorting by Value

Null values sort before non-null values.

Non-null values are compared depending on their datatype:

| | |
|---|---|
| bytestring | as unsigned chars; earliest higher byte ends. If they have identical prefixes, short byte strings compare as smaller than longer ones. |
| float | numerically |
| integer | numerically |
| string | lexically, case-insensitively, A-Z |
| timestamp | oldest to newest (The most frequently used sort order is "-timestamp".) |
| url | lexically, case-insensitively, A-Z |

14.3.6 Sorting by Left or Right Link

Sorted like GUIDs.

14.3.7 Sorting by Live-Status

True before false. That is, live primitives sort before deleted ones.

14.3.8 Sorting by Archival-Status

True before false. That is, primitives marked as "archival" sort before ephemeral ones.

14.3.9 Sorting by Timestamp

Lower (earlier) timestamps sort before higher (recent) ones.

14.3.10 Sorting by Scope

Sorted like GUIDs.

14.3.11 Sorting by Valuetype

Sort by numeric value of the datatype, which happens to be exactly identical to the sort by datatype.

14.3.12 Example

To sort our previous results by name:

```
(node result=(GUID $first $last) sort=($last $first)
    (<– name="firstname" $first = value)
    (<– name="lastname" $last = value))
```

Note that the "sort" instruction is in the surrounding context of the thing that is being sorted; on the topmost level, it is outside of the parentheses.

14.4 Pagination

Pagination-instructions ask for a cursor to be returned if not all items could be transmitted, specify a previous cursor, if any, and specify how many matching primitives to return.

```
pagination-instruction:
    "start" "=" number
    / "pagesize" "=" number
    / "countlimit" "=" number
```

```
/ "resultpagesize" "=" number
/ "cursor" "=" string
```

Note that these instructions can be given at any level of the hierarchy, not just the toplevel. (From a data perspective, paging at each level of a tree makes sense; from a user perspective, it can be confusing. The application will have to solve that.)

The "start" parameter is optional; it defaults to 0. It specifies a zero-based count into the list of matching primitives at the cursor's level of hierarchy.

The "countlimit" is the number up to which the caller wants graphd to report an accurate count. Even if the true count of matching primitives is greater than the countlimit, the countlimit is returned.

The "resultpagesize" is the number of results to return. Unlike the countlimit, it interacts with the "start" parameter–the last returned result is result number start+resultpagesize–1. (But the highest count returned is always countlimit, regardless of the "start" parameter.)

If there is no resultpagesize, the system assumes 1024. If the resultpagesize is greater than 64*1024, it is truncated to 64*1024 (use a cursor instead). Note that no such truncation happens for the count—this constraint has to do with result size, not about runtime.

A "pagesize" parameter, if present, sets the "resultpagesize" to its value, and the "countlimit" to start (default: 0) plus its value. Use of "pagesize" is deprecated; use "resultpagesize" or "countlimit" instead.

If the "cursor" parameter is present, its string was returned by a previous paginating query. The string is an efficient encoding of where the previous instance of this same query left off.

If a cursor is present, it overrides any start parameter.

A cursor is only valid for the exact query it was generated for. It's an error to use it with a different query.

It is possible to resume at a specified offset rather than at a previously returned cursor position, but it's faster to use a cursor.

15. Or Constraints

```
or-constraint:
  "{" constraint "}"
  / or-constraint "|" constraint
  / or-constraint "||" constraint
```

A constraint with an or constraint matches if the first or second side of the "or" match. If the "or" is ||, the first part takes preference; if the or is "|", the preference is unspecified.

Subconstraints in an "or" occupy slots in the "contents" result set, even if their branch is unused; if they do not match, their result slot is null. (To avoid this, use variables rather than the built-in "contents".)

Or-constraints always match per-individual primitive, not per complete set. It is a syntax error to use set-level constraints in an "or".

APPENDIX "5" SIMPLE SEARCH EXPRESSIONS

This document describes the search expression language for the graph repository's string~=operator during "read" queries.

| EXPRESSION | MEANING | EXAMPLE |
|---|---|---|
| foo | The word "foo", anywhere in a document. Words are consecutive sequences of one or more characters that are not punctuation or space characters. | "bar" matches in "foo bar baz" and "foo/bar", but not in "bark". |
| foo bar | The word "foo", followed by one or more white space or punctuation characters, followed by the word "bar". In other words, one "~="-expression matches one phrase. If you'd like to match words positionally independent of each other, use multiple "~="-expressions. | "big fat" matches "big fat wedding" but not "big taste, low fat". |
| foo* | Any word beginning with "foo". | "foo*" matches both "foo" and "foot", but not "fooey" |
| * | Any single word | "12 * men" matches "12 angry men" but not "12 men" nor "12 tired, hungry men" |
| ^ | The beginning of the text | "^ bar" matches "bar fly" but not "foo bar". |
| $ | The end of the text | "bar$" matches "foo bar" but not "foo bar baz" |
| space | A break between words. | "foo bar" doesn't match "foobar". |
| punctuation ! @ # $ % & * ( ) _ = \| / ~ < > , ; : " ' [ ] { } . + - | An optional break between words. | "heart-stopping" matches "heart stopping", "heartstopping", and "heart-stopping". |
| | Like punctuation, unless it could be part of a number—in that case, it is compared as a number (see next section.) | "7.5" does not match "75", even though "S.F." match "SF". |
| \x | The character x, even if x would otherwise have special meaning. | "\*\(\-\:\$" matches a smiley that looks like Kurt. *(-:$ |

In simple search, numbers are compared twice—once as written, once with the text in normalized form.

This "number-match" kicks in only if the pattern and the text both have, or could match, the format of a number. Numbers for our purposes are written as an optional sign, followed by digits, followed optionally by a decimal point and more digits; if there are digits after the decimal point, there need not be digits in front of the decimal sign.

Prior to the match, the destination is "normalized" as follows:

Leading zeros are deleted, except for a single zero (in front of a decimal point, after a sign, if any) that stands alone.

| | | |
|---|---|---|
| 0001 | -> | 1 |
| 00.234 | -> | 0.234 |

Leading positive signs are deleted.

| | | |
|---|---|---|
| +5 | -> | 5 |

Trailing zeroes behind the decimal point are deleted, and a decimal point with nothing behind it is also deleted.

|  |  |  |
|---|---|---|
| 2.50 | -> | 2.5 |
| 2.000 | -> | 2 |
| 0.000 | -> | 0 |

Finally, a 0 is added in front of any decimal point that does not have a number in front of it.

|  |  |  |
|---|---|---|
| −.5 | -> | −0.5 |
| .0001 | -> | 0.0001 |

If the normalized form of the text doesn't match, the match is retried on the unnormalized form. In other words, if you write a strange pattern, you only match strange numbers; but a normal pattern matches both normal numbers and strange ones.

So, "7" matches "7", "007", "7.000", but not "7.00000000001". (Note that the *text* 7 *would* match "7.00000007", since it contains "7" as a subword—just like it would match "1000.7".)

The re-scan against the unnormalized text means that "007" matches "007", but neither "7" nor "1.007".

The normalization takes place only temporarily, at the time of comparison—the data actually stored in the database (and retrieved as the resuly) is unaffected.

Backquoting the search pattern turns off normalization in the corresponding part of the source—\7 matches only the literal string 7, not 007. (It will match 7.0, because 7.0 contains 7, but \7$ will match "7", but not "7.0".)

Asterisks in valid number expressions match any sequence of zero or more digits and an optional leading sign. If the asterisk is used alone, it also matches an optional punctuation mark—"*" matches "3.14", even though "*4" does not. In a number expression only, the sequence ".*" matches an optional floating point punctuation mark followed by zero or more digits—so 3.0, 003.1, and 3 all match 3.*.

APPENDIX "6" THE UNCOPYING SERVER/TOKENIZER

Design Note: The Uncopying Server

We're executing queries that have lots of strings in them. The Uncopying server is written in such a way to almost never copy the data in those strings. This makes things fast, because it doesn't shuffle information about quite as much; it uses less memory; and it uses memory mostly in more efficient fixed block sizes, rather than allocating many small objects.

This documents details a server design I've thought about for a while, but am using in graphd for the first time.

It's purely an implementation detail and not part of the interface specification.

1. The Buffer Carousel

Data arrives at an interface, and is read into buffer pages. That's the only copy that happens to the request data.

The buffer pages each have a link count associated with them. Two things count for a buffer link count: being in the input queue, and being in a request.

More than one request can refer to the same buffer page. Buffer pages are linked in a singly linked list. Requests have a pointer to their first and last buffer page.

The sequence of buffers on input is the same as the sequence of requests—that's why one "next" pointer per buffer suffices, as long as the input queue and the requests remember where their individual end pointers are.

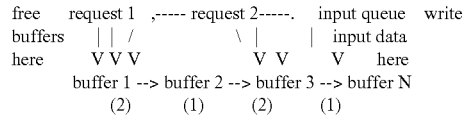

Note that a request can point to one buffer only (request 1) or span more than two buffers (request 2). Note also that requests frequently share a buffer with the input queue or with other requests—the buffers are so large that they often hold multiple requests.

As requests execute, they keep a link to the input buffers that they were parsed from. A whole buffer is only free'ed (read, recycled in a buffer free list) when all the requests that refer to it have been answered.

2. The Uncopying Tokenizer

Because it can rely on the data to stay in place during the whole lifetime of a request, the Uncopying Tokenizer doesn't need to copy token data into separate memory areas. Instead, it works with start- and end-pointers to the strings in their incoming buffer.

Generally, pointers to the beginning of a '\0'-terminated string—or the self-contained "String" objects higher-level programming languages offer—are a terrible idea when tokenizing text. They look elegant because one gets to move information about through a small single-pointer interface, but modifying or copying the underlying data just to delimit it is neither a good use of modification nor a good representation of size information.

I tend to use s . . . e pointers instead (s—the beginning of the string, e—pointer just after the end of the string); s[n] notation would probably work just as well; just stick with one.

In the tokenizer of the Uncopying Server, the s . . . e pointers into an existing buffer break down in two places:

(a) Tokens that span request boundaries.
    (The interface is written in such a way that this is rare, but it's of course possible—for starters, tokens can be longer than a request size.)
(b) Tokens that require decoding of some sort, e.g. strings with escape characters in them.

Those tokens are assembled in traditional malloc( )d buffers and then hooked into the parser mechanic with the existing start- and end pointers.

Each request has its own memory heap that such buffers can be allocated in; they're free( )d automatically when the request is free( )d. That means that after the initial buffer stage, these assembled strings can be treated exactly as if they lived in one of the buffers. They're a little less efficient, but they don't complicate the back-end logic.

APPENDIX "7" A CONCENTRIC REPLICA GRAPH

A concentric replica is a graph database which contains another graph database. Our current sandbox graph is a close approximation: it contains OTG as of some time. Unfortunately, the copy of OTG in sandbox is static: the only way to get writes from OTG to sandbox is to create a new sandbox but that loses the modifications made to the sandbox.

A concentric replica could be used to store any relatively long-lived data which relates to OTG but should not be in OTG. Example applications:
- a durable sandbox/workspace
- private data associated with OTG Although a (the!) trivial example of a federated database, a concentric replica doesn't provide any relief from the scalability limits of graphd. The concentric replica contains all of OTG, and requires an additional property for some portion of OTG.

Some Notation:
- O.x—an OTG guid, local id is x
- C.x—a concentric store guid, local id is x Mapping from C to O We assume that C starts life as a replica of O, with a different database id. Call the last primitive in this replica C.branch.

When we copy a new identity from, O.x O to C, we need to record the mapping from O.x to C.y:

```
write ( (<-left typeguid=#equivalent-to value="O.x") ...)
ok (C.y (C.z))
```

We do this with a special property, #equivalent-to. The following algorithm will map from an identity in C, say C.y, to the equivalent identity in O, if there is one:

```
if (C.y <= C.branch)
    return O.y
else
    read (result=$o (<-left typeguid=#equivalent-to $o=value))
```

Yes, this burns one extra primitive per identity. It might be reasonable to use the name field for this purpose as such usage would not conflict with the graphd or MQL bootstrap.

Keeping C Up to Date

C is kept up to date with respect to changes in O by a small program which pretends to be a replica of O. For each transaction in the replica stream (delimited by the TX_START bit in a primitive record) the program produces an equivalent set of writes and applies them to C. New identities (nodes) are simply created (with the mapping back to O). Fundamentally, links are created by value, that is, a link is created if an equivalent link doesn't already exist (ie. we use key=when writing). If a link versions another link, we need to version the equivalent link in C. If the versioned primitive (O.x) is old (ie. C.x<=C.branch) we use "guid~=" to install a new link in C which will overwrite all primitives in that lineage (including any local modifications to C.x).

If the versioned primitive is new then we look up the predecessor and, using the contents of the predecessor, look up the equivalent primitive in C and version that. This has the (desirable) effect of making writes to OTG take precedence over writes to the concentric store.

Handling links that way is fine from a graph standpoint, however, links are the implementation of MQL properties, so we need to do a bit more work to make sure that MQL property semantics are preserved. Specifically:

uniqueness
Writes to a unique property (unique according to C's schema) should always version any existing property.

assertion of identity

While in most respects an ordinary MQL property (of a namespace) keys are used to relate an identity to the outside world. If O.x is a HAS_KEY link, and we discover that a duplicate link exists in C, we overwrite the HAS_KEY link as usual but we should mark the identity thus displaced as being a duplicate of the identity referenced by the new HAS_KEY link in C. Concretely, if the user of C creates an identity, C.y, and names it /foo/bar, and some time later a user of O names an identity, O.x (==C.z), /foo/bar, when the "bar" HAS_KEY link arrives at C, we should mark O.x as being a (possible) duplicate of (C.z==O.x).

APPENDIX "8" OPTIMIZER

Abstract

Relational databases such as Postgres or Oracle require that a database schema exist prior to data entry and require manual optimization (via CREATE INDEX) for best performance. We describe the query optimization techniques used by graphd, a schema-last, automatically indexed tuple-store which supports freebase.com, a world-writable database. We demonstrate that the techniques described deliver performance that is generally comparable with traditional cost-based optimization techniques applied to the relational model.

Optimizing Tuple-Store Queries

Our tuple-store, graphd, manages an append-only collection of tuples. Tuples are assigned sequential ids as they are written. The first tuple is 0, the second, 1 and so forth. Fundamentally, tuples carry two sorts of data, immediate scalars (strings) and references (by id) to other tuples.

Our database consists of tuples having some statically defined mixture of reference and scalar fields. In our specific case this happens to be 4 references named "left," "right," "type" and "creator", and several scalar fields the most important of which are known as "name" and "value" As you might surmise, "left" and "right" are used to link things together, the type categorizes such a link, and creator identifies the user creating the tuple. Of the scalar fields, value is the most common and is used to store all user-written values. The name field is used to locate primitives.

By convention, these tuples are employed in a stylized manner. "Nodes" have only a "creator" and serve as identities only, and "Links" have some combination of left, right, type, value, and name and are used to describe the identities they reference. The result may be viewed as an object-oriented system in which objects are nodes and properties are links, or as a relational system in which relations are collections of links, usually those having a type in common. While understanding the convention eases comprehension of what the optimizer is actually doing, the optimizer is entirely independent of these structural conventions.

| 0 | | (#instance_of) | |
|---|---|---|---|
| 1 | | (#name) | |
| 2 | | (#en) | |
| 3 | type=1 left=0 right=2 value="instance of" | | - name for 0 |
| 4 | | (#person) | |
| 5 | | | - an identity |
| 6 | type=0 left=5 right=4 | | - 5 is an instance of person |
| 7 | type=1 left=5 value="Bob" | | - 5 is named Bob |
| 8 | | (#parent_of) | |

Query Language

A complete description of the query language is beyond the scope of this paper. For the most part we will concern our selves with the following query which asks for parents of people named "Bob":

```
read (
    (<-left type=8 right->(
        (<-left value="bob" type=1 right=2)
        (<-left type=0 right=4))))
```

For ease of reading, we will replace literal tuple ids with symbolic names in the remainder of the paper:

```
read (
    (<-left type=#parent_of right->(
        (<-left value="bob" type=#name right=#en)
        (<-left type=#instance_of right=#person))))
```

A parenthesized expression indicates a set of primitives. The simplest possible query is:
read ( )
which returns every primitive in the database. Interesting queries constrain primitives in various ways. Intrinsic constraints, such as value="bob", constrain the content of the set primitives. Linkage constraints, for example ←left, specify a relationship between primitives. So, the following constraint specifies a primitive which is referred to by the left of a primitive whose value field is "bob", whose type is #name (1) and whose right is #en (2)

```
(
    (<-left value="bob" type=#name right->(guid=#en)))
```

Nested Loop Evaluation

The basic join algorithm used by graphd is the nested loop join. Working through the syntax tree from the top down, we try candidate primitives one at a time. Without optimization, the set of candidates is identical to all primitives in the database. Query execution becomes intractable quite rapidly as query complexity or database size increases.

In contrast to conventional query optimizers which search for the optimal join order and employ a variety of join techniques, the graphd optimizer does not manipulate the join order or technique, rather, it seeks to minimize the size of the set of candidate primitives considered by the nested loop join.

Thus far, moving computation from the domain of values into the domain of index sets has been hugely profitable.

Index Sets

Fundamentally, the graphd index exploits the append-only nature of the database and the sequential nature of tuple ids (guids). As tuples are appended to the database, we can accumulate sorted sets of ids at very modest expense. We are fortunate in that sorted sets are well studied.

While some such sets are naturally exact, even approximations are fine as long as the reduce the size of the result set sufficiently. Invalid candidates returned by the optimizer will be weeded out by the nested loop evaluator. As a practical matter we typically spend about 90% of our execution time in the optimizer.

Indexing Elementary Constraints

If we're just looking for things with the English name "bob" we might see a constraint like this:
. . . (value="bob" type=#name right=#en) . . .

Each constraint maps pretty much directly to a set which accumulates naturally in sorted order as primitives are written. For example writing such a link might look like this:

```
write (left=5 value="bob" type=#name right=#english)
ok (7)
```

The returned primitive, 7, would be added to the following sets:
+ the set of primitives whose left is 5 (#bob)
+ the set of primitives named "bob"
+ the set of primitives whose type is 1 (#name)
+ the set of primitives whose right is 2 (#en)

Conceptually, the index is a large dictionary whose keys are (type,value) pairs, for example (VALUE,"bob"), or (LEFT,5) and whose values are sorted sets of integers, for example {23, 145, 167, 169}. We'll use the functional notation, I( ) to describe any individual set in the index. The intersection:
I(VALUE,"bob")X I(TYPE,#name)X I(RIGHT,#en)
yields the set of candidate primitives which might satisfy our constraint.

Concretely, the implementation of the index dictionary is a large hash table tuned to deliver near-constant-time access to any set, or in the case of some of the less sparse domains such as linkage, a segmented array of sets indexed by id.

The size of index sets is useful in its own right. The sum of left and right linkages to a node is a good indication of that node's importance relative to others.

Word Indexes

Just as with a full text index, names and values can be broken into words and indexed by word. The set
I(WORD, "bob")X I(WORD,"williams")
Corresponds to the, relatively small set of primitives containing the words "bob" and "williams". In practice, relying on the evaluator to check the results for "bob williams" seems to deliver adequate performance for phrase matching.

Prefix Indexes

For prefixes, we exploit the fact that index results need not be exact.

VIP Indexes

Since some sets grow quite large (for example, I(RIGHT, #en), the set of all things referring to English) and set storage is compact, it is worthwhile to precompute some common intersections at index time. We set a threshold value, currently 100, and any set which grows larger than that is eligible for VIP treatment. Since names are quite common, I(TYPE, #name) is larger than 100, and thus every english name that is added to the system will also be added to VIP(TYPE,RIGHT, #name,#en)

With a VIP index, the intersection becomes
I(VALUE,"bob")X VIP(TYPE,RIGHT,#name,#en)

The VIP indexes provided a surprising increase in performance. The basic intuition is that if you have a large collection of something it is probably important, hence the subject of many queries, hence worth extra indexing expense at write time. While we don't currently do so, it seems reasonable to extend the VIP indexing concept at least one more level to keep track of instances of people in addition to links defining instances of people. Maintaining the set of instance of people requires a primitive set representation which supports insertion as identities can be added to that set in any order.

Uniqueness

Names are unique in the sense that an object has only one name, one link with type=#name. This property isn't enforced by graphd, but by the MQL language object model used to interact with the graph. However, uniqueness can be discovered by noting that the cardinality of VIP(TYPE, LEFT, #name, x)

is 1 for all x.

Uniqueness is just a special case of the more general problem of estimating the cardinality of a join result. By collecting statistics for VIP set cardinalities other than 1, we can make better estimates for the size of a join result along across a given relation.

Sorting

While traditional index structures naturally present keys in sorted order at the expense of N*log N access time, our structures are all sorted by guid with near constant access time. This is a fabulous bargain until the user asks for output sorted by something other than guid. With no index support we have no choice but to scan the complete result set. This is fine with relatively small result sets but intractable with large sets.

Locality of Reference

Unlike the data they index which may be spread arbitrarily around the primitive store, index sets have extremely good locality of reference. And, they correspond closely to the semantic sets that the user believes himself to be manipulating. For example, the set of all links defining instances of people is a contiguous data structure available to the optimizer in near constant time. Even the simplest set data structure, (an array), is compact and algorithmically amenable to current processor cache architectures. From this structure, we can easily locate the set of identities which are people, and that set corresponds directly to the user's idea of data. Furthermore combining this set with other sets has uniform and predictable performance characteristics. Unlike standard relational structures, there's none of the structural liability which allows seemingly innocent schema or query modifications to have dire performance consequences.

Traditional Index Structures

Star Schema

The most common form of relational index is some sort of tree structure which naturally accesses keys in sorted order. This is very handy for things like string prefix queries as all prefix matches will follow the first match sequentially. Using compound keys, for example (type,right,left), (type,left,right), etc., extends this prefix matching game to tuples.

There are two drawbacks:

1. Size of the Data Structures

Unless you index all permutations of tuple fields, queries involving un-indexed joins will be considerably slower. Of course, tuple-size is a matter of considerable flexibility. Arguably, pairs are all that is needed, but practical systems seem to start with triples and most add at least one additional field. The trade-off is basically a large number of simple primitives and more complex conventions for their use against a smaller number of more complex primitives and simpler conventions for their use.

2. Asymmetry of Primary Key

To compute an intersection, say,

I(TYPE,#name)X I(RIGHT,#en)

you must choose a primary key, either type or right, and then scan for the secondary. The corresponding set intersection is completely symmetrical and the argument sets are contiguous.

Compare this situation the relational star schema typically used to store tuple data.

Column Store—Vertical

Note the schema difficulty—"show me everything about X" requires that you first discover the schema, "what is knowable" then ask the question.

Linkage From Constraints (ISA)

This is all very nifty, but real queries typically involve joining different constraints together, and thus far, we have only demonstrated how to find individual primitives.

It is easy enough to compute sets for the name and type constraints, but what do we do for the identity which connects them? Identities have no left or right fields, a fact that we could index, but that still would leave us with millions of candidates for every identity.

Conversely, the name "bob" is quite unique (In fact there are only 97 instances of the value "bob" in our current graph of nearly 200M primitives, and, this information is available to us in constant time). What is needed is a way to propagate small sets derived from elementary constraints up (or down) to the otherwise unconstrained identities which join them. To our basic vocabulary of sets, we introduce "linkage functions" like so:

LF.left(I(VALUE,"bob")X I(TYPE,#name)X I(RIGHT, #english))

LF.left is the set of the lefts of primitives in the input set. To compute this set, we use the memory mapped primitive store itself, essentially an array of offsets to primitive structures. As with the index dictionary, access to the primitive store is constant time.

While a bitmap-based pigeonhole sort provides a constant-time upper bound on the expense of sorting, the constant is large. Unless we actually need to scan the entire set, it is more efficient to cope with the unsorted nature of the results.

Linkage to Constraints (LINKSTO)

```
read (
    (<-left type=#parent_of right->(
        (<-left value="bob" type=#name right=#en)
        (<-left type=#instance_of right=#person))))
```

If we consider a set of links to be a relation, linkage constraints implement only half of it. We need a way to move from a set of identities, Ci, to the set of links which link to them. This is the set union:

I{RIGHT, C1} U I{RIGHT, C2} U . . .

We'll introduce the linkage-to function, LT.right(Ci), to express this as a shorthand. For our specific example, candidates for people named "bob" are given by the following intersection:

```
LF.left( I(VALUE,"bob") X I(TYPE,#name) X I(RIGHT,#english) ) X
LF.left( I(TYPE,#instance_of) X I(RIGHT,#person) )
```

So, candidates for the #parent_of link are given by the following set:

```
I(TYPE,#parent_of) X LT.right(
    LF.left( I(VALUE,"bob") X I(TYPE,#name) X I(RIGHT,#english) ) X
    LF.left( I(TYPE,#instance_of) X I(RIGHT,#person) ))
```

Parent Constraints

We start iterating through constraints of the top-level set and sub-constraint iterators are always anded with those candidates Looking at the constraints thus far, there's an odd Asymmetry which reveals itself if we were to "re-dangle" it with the person named "bob" at the root:

```
read (
    (<-left value="bob" type=#name right=#en)
    (<-left type=#instance_of right=#person)
    (<-right type=#parent_of left->( )))
```

In this case, our set of candidates for "bob" would be:

```
LF.left( I(VALUE,"bob") X I(TYPE,#name) X I(RIGHT,#english) ) X
LF.left( I(TYPE,#instance_of) X I(RIGHT,#person) ) X
LF.right( I(TYPE,#parent_of) )
``` which might be considerably smaller (ie. better). By including parent constraints in the candidate set, we can, in effect, re-dangle just the candidate set, without changing the structure of query as evaluated and then mapping results back into the users requested structure.

Constrain Ranges

We know that the id of any link must be greater than the ids of everything it references. The id of a primitive whose type field references 1001,

I(TYPE,1001)

must necessarily be 1002 or greater.

"As of"

Cost-Based Set Iteration

Primitive index sets, Intersection, Union, Linkage from, and Linkage to: this basic vocabulary is sufficient to describe the sets of interest to the optimizer. Unfortunately, describing the sets is actually the easy part. If we try and compute these sets we discover three unpleasant facts:

1. Some ways of computing sets are much more efficient than others

2. Even assuming that we resolve 1 perfectly (hard) computing complete sets when only a fraction is needed is prohibitively expensive. Quite frequently we need only a tiny fraction of "the complete answer." Algorithms which are adept at producing a fraction of a result set rapidly, are often suboptimal when computing the complete result set.

To pursue our example, candidates for the identity at the root of this query:

```
read (
    (<-left value="bob" type=#name right=#english)
    (<-left type=#instance_of right=#person))
``` are the results of an intersection of two sets, the set of things named "bob" and the set of all people. There are 97 things named "bob", and 800,000 people. Iterating over people and checking names is probably much slower than iterating over things named "bob" and checking those (97) results against people.

The Set Iterator API

We structure the computation of sets with an iterator abstraction. For any set, we construct a hierarchy of iterators which is capable of producing members of the set, or checking for membership in an interruptible manner. Sets may be sorted by id, sorted by some other criterion, or they may be in arbitrary order. Sets can be iterated forwards or (from low id or sort criteria to high) or backwards.

Set Iterators support 4 basic operations:

statistics

Compute relative cost of find, next and check and estimate the number of elements in the set. Since relative costs are used to determine how to compute find and next, statistics must be computed before find and next can be used.

find(id)

find the closest id greater than (or less than if iterating backwards) the argument and position the iterator on it.

next

Return the next id in the direction of iteration check(id)

Check to see if the passed id is present

Using Iterators to Evaluate Queries

Graphd evaluates queries top down so the first iterator that we need is the one which provides candidates for the top-level primitive, in the case of our example, we iterate over the following set:

```
LF.left(
    I(TYPE,#parent_of) X
    LT.right(
        LF.left( I(VALUE,"bob") X I(TYPE,#name) X
        I(RIGHT,#english) ) X LF.left( I(TYPE,#instance_of) X
        I(RIGHT,#person) )))
```

Since we will be iterating through all the candidates by calling next, we first ask for statistics to be computed, which descends the tree recursively. At the leaves, for example, I(VALUE,"bob") we know exactly how items there are in a set (97) and how much each of the various operations will cost. Computing statistics amounts to propagating those leaf costs towards the root using complexity models for each operation.

What basic things cost:

1 a function call (PDB_COST_FUNCTION_CALL)

2 retrieve an element from a set (PDB_COST_GMAP_ELEMENT) next 10 look up an index set (PDB_COST_GMAP_ARRAY)

12 lookup a primitive (PDB_COST_PRIMITIVE)

24 creating an iterator (PDB_COST_ITERATOR)

Index Sets

Index sets are precomputed sorted sets stored in the index. Physically, they are arrays of integers or bitmaps.

n stored with set next function call+element find function call+set+element*log 2(size)

Finding a particular element in a set is modeled as a bsearch check same as find for an index set such as I(VALUE,"bob") the actual costs as follows:

2 next
25 find bsearch (function call+set+element*log 2(137))
25 check same as find Simple Intersections However, one level up, where we're computing the intersection of three index sets, I(VALUE,"bob")X I(TYPE,#name)X I(RIGHT,#english)

the cost modeling is more complex. The basic idea is to pick the smallest set as the "producer" and check candidates against the remaining sets in order of selectivity. If we know that all results will be required, it may be more efficient to perform a complete intersection directly on the underlying set data structures rather than via the iterator interface. In the case of produce-and-check, the resulting cost model is:

n
P.n*C0.sel*C1.sel . . .
where: P.n is the cardinality of the producer, C0.sel is the measured selectivity (a selectivity of 0.75 implies that three quarters of the candidates are accepted) of the first checker, SC1, the selectivity of the second checker, and so forth.

next
((P.next+C0.check)*1/C0.sel+C1.check)*1/C1.sel . . .

find
P.find+next
where P.find is the find cost of the producer, and next is the next cost of this iterator check
P.check*1/SC0
where CP is the check cost of the producer There are some 15M name links, so many that it is more efficient to represent them as a bitmap which yields costs of next=3, find=3, and check=1. There are some 50M things whose right is #english, a set which are also stored as a bitmap. For intersections involving sets of known size, we always take candidates from the smallest set, and check results against the others in increasing order of set size.

The next-cost of the intersection is thus the cost of the producing a candidate from I(VALUE, "bob") plus the cost of checking that candidate against I(TYPE,#name) multiplied by the number of times we have to repeat this process in order to get a candidate, plus the cost of checking that candidate against I(RIGHT, #english) multiplied by the number of times we have to repeat this process to get a candidate.

We could try to estimate the selectivity of the checkers, but, as a practical matter it turns out to be simpler and more reliable to produce a small number of values and measure the next cost directly. This technique extends easily to complex intersections where some of the operand sets are produced by other iterators.

We can compute the check cost based on the next cost or based on approximations of checker selectivity, the chance that a given checker will accept a candidate.

Lastly, the find cost for a simple intersection is the find cost of the producer plus the next cost of the intersection.

Links From

At the next level up, we're looking for tuples referred to by the lefts of candidates from our simple intersection:

LF.left(I(VALUE,"bob")X I(TYPE,#name)X I(RIGHT,#english))

Here, the primary variables are the fan-in, the cardinality of the result relative to the cardinality of the argument, and the cost of duplicate checking.

next cost
(arg.next+primitive_lookup+duplicate_check)*fan_in
In order to find the next result, we must get the next from the argument set, lookup that primitive and extract the left, and verify that we have not returned find cost
none
Since the links-from iterator isn't sorted, there's no way to find a position in it other than scanning the entire result set.

check cost

Duplicate Detection

In addition to looking up the left of each member of the input set, the links from iterator must ensure that its output is a set: duplicates must be removed. There are two ways of doing this:
1. Keep a set of ids that have already been returned.
2. Given, X=LF.left{C}, for each argument-result pair, (Ci, Xi) verify that the first result of I{LEFT,Xi} X C is in fact Ci.

In some cases, we may be able to determine that no duplicate checking is required. This situation occurs when the type is used to represent a unique property such as name and we only interested in results at a single point in time, usually the present.

Complex Intersection

In complex intersections such as,

---

LF.left( I(VALUE,"bob") X I(TYPE,#name) X I(RIGHT,#english) ) X
LF.left( I(TYPE,#instance_of) X I(RIGHT,#person) )))

--- which computes identities named "bob" who are also people, there is no obvious choice for a producer.

describe the contest, budgets
restartable iterators.
Links to

---

LT.right(
　　LF.left( I(VALUE,"bob") X I(TYPE,#name) X I(RIGHT,#english) ) X
　　LF.left( I(TYPE,#instance_of) X I(RIGHT,#person) )))

--- next cost
find cost
check cost

Unlike sets, iterators incorporate a as much knowledge of their environment as possible. So, for example, while LF.right (Ci) describes a pure set, the corresponding iterator might know that from Ci it generates a series of sorted sets and thus that:

A X LF.right(Ci)
can be sometimes advantageously be transformed to:
(A X I(RIGHT,C1)) U (A X I(RIGHT,C2)) U . . . U (A X I(RIGHT,Cn))

Iterator Intersect (AND)

While the idea of intersection is so basic that this paper doesn't even dignify it with an explanation, the actual implementation of intersection is the most complex in the iterator system.

Performance Tests

```
[{
    "type": "/film/actor",
    "name": null,
    "/people/person/place_of_birth": {
       "name": null,
       "type": "/location/statistical_region",
       "population": [{
          "number": { "value<": 40000 }
       }]
    }
}]
```

Top Properties of People

```
(/type/object/type 2811466)
(/type/object/name 1302486)
(/type/object/permission 872874)
(/common/topic/article 614299)
(/people/person/gender 567313)
(/people/person/nationality 328887)
(/people/person/date_of_birth 321797)
(/people/person/profession 266142)
(/book/author/book_editions_published 178823)
(/common/topic/image 171157)
(/people/person/place_of_birth 158025)
(/people/deceased_person/date_of_death 120828)
(/book/author/works_written 113632)
(/common/topic/alias 94695)
(/common/topic/webpage 44084)
(/people/person/height_meters 35059)
(/music/artist/genre 32544)
(/people/deceased_person/place_of_death 31926)
(/people/person/religion 28771)
(/soccer/football_player/position_s 25081)
(/people/deceased_person/cause_of_death 19906)
(/music/artist/instruments_played 18852)
(/base/nascar/nascar_driver/nascar_races 17000)
(/people/person/parents 14950)
(/american_football/football_player/position_s 14572)
(/music/artist/label 14540)
(/influence/influence_node/influenced_by 10704)
(/music/artist/origin 8922)
(/people/person/weight_kg 8578)
(/baseball/baseball_player/position_s 7967)
(/music/artist/home_page 6430)
(/sports/pro_athlete/career_start 5594)
(/visual_art/visual_artist/art_forms 5553)
(/military/military_person/service 5130)
(/architecture/architect/structures_designed 5023)
(/user/juggleapp/juggle/juggle/juggleid 3940)
(/base/saints/saint/venerated_in 3419)
(/people/deceased_person/place_of_burial 3372)
```

APPENDIX "9" HANDLING POISON QUERIES

Dev Note 060: Handling Poison Queries

A "poison query" is any of query that reliably causes graphd to crash. As it stands, a poison query, if retried sufficiently by either our own middle tier or a user program can crash all graphds in a particular pod. If the retries are frequent enough, graphd gives up restarting itself and our service grinds to a halt.

We need a way of identifying poison queries and preventing graphd from trying to execute them.

Short of a complete solution, which I'll sketch out, there are some things that we can do to make the situation better in the very near term:

Band Aids

1. Have replica graphs restart themselves indefinitely unless they detect database corruption. Currently, graphd shuts down after three crashes in quick succession. The rational for this behavior is to avoid data corruption. This is still the right behavior for master or archive graphs, but wrong for replicas where the only value of a valid database is the quick restart that it allows.
   See https://bugs.freebase.com/browse/GD-652

2. Handle ECONRESET consistently in the middle tier/client. When a graph crashes, all sockets connected to it will receive an error, usually ECONRESET. Unless the client is sure that the currently active query is known to be good (fx, the bootstrap) it should treat a dropped connection as a potential poison query.

A complete solution involves identifying poison queries and creating set of poison queries shared by all instances of graphd. A graph would check each query against the set prior to executing it and fail any matching query with an error.

Identifying Poison Queries

We can identify poison queries by storing a hash of the currently executing query into the shared memory that we currently (when configured with transactional=false) use to determine that graphd has crashed in a write. When the parent process determines that the child has crashed, it can read the hash identifying the query that was running at the time of the crash.

We don't need to distinguish the poisonous from the unlucky. Our most common failure mode involves a long running query which has been interrupted by a write at just the wrong place. Retrying such a query when we're under heavy write load might be so unlucky as to be indistinguishable from poisonous.

Messages

Traffic between clients and the poison server consists of two messages:

poison hash version deaths
    hash a string
        the hash of the query which was running when graphd crashed
    version a string
        the version of (graphd) software currently running.
    deaths a positive integer
        the number of deaths caused by this query, 0 means that the query is no longer considered poisonous. Usually this is 1, but if we're pretty sure that the query would crash again, say because it crashed in the first timeslice (100 ms) we might boost it to 2.
    Sent from client (graphd) to the poison server (possibly graphd) to indicate that a the query identified by hash is poisonous to the given version of the client (graphd).

antidote hash version
    hash a string
        the hash of the query to be ignored
    version a string
        the version of software which should ignore the query
    deaths a number
        0 means that this query is no longer considered to be poisonous, otherwise ignored.
    Sent to the client (graphd) to cause it to ignore the query identified by the hash.

The poison server maintains a dictionary which maps (hash,version) to (death-count,date) where date is the date of the most recent death. As poison messages arrive, the (death-count,date) records are adjusted as follows:

```
if death-count < threshold
    if date > now - window
        increment death-count
    else
        reset death-count
```

Where window is some length of time, probably several hours. When an entry's death count exceeds a threshold (probably 3) the server broadcasts antidote messages to all connections. New connections receive antidote messages for all poison queries immediately after connecting.

The use of the compound key, (hash,version), has the effect of "clearing" poison queries when client software is updated, usually the right thing to do. If need be an operator can connect to the server, and, by transforming the initial block of antidote messages into poison featuring the new software version, re-instate antidotes for poison queries against the new software.

When a connection between client and poison server is re-established, the client should forward all currently active antidotes as poison.

This preserves the current set of antidotes against individual crashes.

Possible Implementations separate server
  We build a separate poison server and communicate with it via a simple line-oriented protocol, for example:
  poison "hash" "version" deaths\n
  antidote "hash" "version" deaths\n
  graphd (or any other client) is configured with the address of a poison server.
  This is the easiest to code, might be useful to other services, but creates another configurable component of the overall metaweb service.
  Integration with graphd is easiest if we can request an antidote message format when we connect. This is a third message, but allows graphd to request a format like:
  antidote (hash="% h" version="% v" deaths=% d)
  which could be processed as a command. The alternative would be to create a new "application".

part of graphd
  The messages would be two new graphd commands:
  poison (hash="hash" version="version" deaths=N)
  antidote (hash="hash" version="version" deaths=N)
  A write master graphd would process poison commands sent by replicas (via the write-master connection) and create a cm_hash of poison queries. When a query reached the poison threshold, the antidote message would be broadcast down the replica chain.
  This is somewhat harder to implement, not easily usable by other components, has implications for replication protocol snoops, but "just works" from the standpoint of operations.

APPENDIX "10" AN SMP GRAPHD

We've got powerful N-core servers running graphd. We can serve, theoretically, N times as many queries at a time as we currently do, if all processors were working in concert.

Assumptions ##
  Reading is easy—so long as no one's writing at the same time.
  Writes are, however, assumed to be much less popular than reads.
  This (for the most part) only needs to work on replicas—the master graph can be single-process, if the replicas are the real workhorses.
  The number of incoming queries >>> the number of processors
  Transactional mode is off, sync is off (the graph is in shared memory)

First Pass—Read Only ##

Well, let's make a version that works in the read-only case—let's fork a bunch of child processes. Since we're in shared memory, everybody can read the graph. As forking causes the open file descriptors to be open in the forked copy, everybody is listening on the graph port, waiting for commands and queries. Whoever gets the connection is unimportant; it's whoever gets there first.

Test this by firing a bunch of queries against the graph simultaneously. The multi-process case works pretty well; however, because the test has an endpoint, the greatest pipeline of queries that a single process happens to grab becomes the limiting factor in the throughput of the test. (ie, queries are atomic)

Protocol ##

So now we want to do writes. If we limit the ability to go SMP to replicas, then we can limit the point-of-entry for writes. We don't know who will get an incoming write from the outside, but we don't care—every process can forward an incoming write to the master. We allow one special process to handle the returning replica-write stream, the "leader" process.

We fork the given number of processes—each one opens one end of a connection back to the leader, and adds it to their es_loop, and drop their forked copy of the replica write stream. The leader picks up all the other ends of the follower connections.

Leader ####

When a replica-write comes in, it sends an

'smp (pre-write)'

To the followers, and waits for an "ok" from all of them. It does the write as usual (perhaps also any that come in the queue at the time), and sends an 'smp (post-write)'

To all the processes, for them to pick up and continue. Standard response to this is also "ok" but This is the easier role to code—it's the doing usual thing with an extra step (signaling the followers)

Follower ####

The follower is a standard process, until it's connection to the leader yields the 'smp (pre-write)'

A command which receives an exclusive ticket, so as to clear up the running sessions. When executed, it responds with an "ok"

At which time, the follower attempts to do any number of useful things that do not involve memory. The simplest thing to do is to spin and do nothing, but this becomes one of the first places to optimize—figure out what we *can* do in the short time it takes to do a replica write When it receives 'smp (post-write)'

At which time it makes proper state updates, such as getting the new horizon numbers. In this step, if need be, further instructions can be sent across in a small struct in shared memory—basically, all followers reflect the write update and proceed to do their reads, and signals "ok"

At this point, we should be back to a standard read state.

The invention claimed is:

1. A method performed by a system of one or more computers, the method comprising:
    receiving a transaction representing an update to a master graph database, the transaction including a new primitive and a first unique identifier for the new primitive in the master graph database;
    updating a concentric graph database with the new primitive, wherein the concentric graph database includes a first plurality of primitives and a second plurality of primitives, wherein each of the first plurality of primitives is also included in the master graph database and none of the second plurality of primitives are included in the master graph database, and wherein updating the concentric graph database with the new primitive comprises assigning a different, second unique identifier to the new primitive in the concentric graph database; and
    storing a mapping from the second unique identifier to the first unique identifier in the concentric graph database.

2. The method of claim 1, further comprising:
    monitoring a replica stream, wherein, for each primitive added to the master graph database, the master graph database publishes a transaction over the replica stream, the transaction including the primitive added to the master graph database.

3. The method of claim 1, wherein, for each of the first plurality of primitives, the concentric graph database includes a respective mapping from a second unique identifier for the primitive to a first unique identifier associated with the primitive.

4. The method of claim 3, wherein, for each primitive of the first plurality of primitives added to the concentric graph database before any of the second plurality of primitives, the respective second unique identifier associated with the primitive is equivalent to the respective first unique identifier associated with the primitive.

5. The method of claim 4, wherein, for each primitive of the first plurality of primitives added to the concentric graph database after an earliest primitive in the second plurality of primitives, the respective second unique identifier for the first primitive is different from the respective first unique identifier for the first primitive.

6. The method of claim 1, wherein the new primitive includes a particular first identifier of a particular primitive in the first plurality of primitives that the new primitive is modifying, and wherein updating the concentric database with the new primitive comprises:
    identifying a particular second identifier for the particular primitive; and
    replacing, in the new primitive in the concentric graph database, the particular first identifier with the particular second identifier.

7. The method of claim 1, further comprising:
    storing the mapping as a link primitive in the concentric graph database, wherein the link primitive includes the first unique identifier, the second unique identifier, and data indicating that the link primitive defines an identifier for the new primitive in the concentric database that is equivalent to the second identifier for the new primitive.

8. A system comprising one or more computers and one or more storage devices storing instructions that, when executed by the one or more computers, cause the one or more computers to perform operations comprising:
    receiving a transaction representing an update to a master graph database, the transaction including a new primitive and a first unique identifier for the new primitive in the master graph database;
    updating a concentric graph database with the new primitive, wherein the concentric graph database includes a first plurality of primitives and a second plurality of primitives, wherein each of the first plurality of primitives is also included in the master graph database and none of the second plurality of primitives are included in the master graph database, and wherein updating the concentric graph database with the new primitive comprises assigning a different, second unique identifier to the new primitive in the concentric graph database; and
    storing a mapping from the second unique identifier to the first unique identifier in the concentric graph database.

9. The system of claim 8, the operations further comprising:
    monitoring a replica stream, wherein, for each primitive added to the master graph database, the master graph database publishes a transaction over the replica stream, the transaction including the primitive added to the master graph database.

10. The system of claim 8, wherein, for each of the first plurality of primitives, the concentric graph database includes a respective mapping from a second unique identifier for the primitive to a first unique identifier associated with the primitive.

11. The system of claim 10, wherein, for each primitive of the first plurality of primitives added to the concentric graph database before any of the second plurality of primitives, the respective second unique identifier associated with the primitive is equivalent to the respective first unique identifier associated with the primitive.

12. The system of claim 11, wherein, for each primitive of the first plurality of primitives added to the concentric graph database after an earliest primitive in the second plurality of primitives, the respective second unique identifier for the first primitive is different from the respective first unique identifier for the first primitive.

13. The system of claim 8, wherein the new primitive includes a particular first identifier of a particular primitive in the first plurality of primitives that the new primitive is modifying, and wherein updating the concentric database with the new primitive comprises:
    identifying a particular second identifier for the particular primitive; and
    replacing, in the new primitive in the concentric graph database, the particular first identifier with the particular second identifier.

14. The system of claim 8, the operations further comprising:
    storing the mapping as a link primitive in the concentric graph database, wherein the link primitive includes the first unique identifier, the second unique identifier, and data indicating that the link primitive defines an identifier for the new primitive in the concentric database that is equivalent to the second identifier for the new primitive.

* * * * *